(12) United States Patent
Hanaoka et al.

(10) Patent No.: US 8,797,485 B2
(45) Date of Patent: Aug. 5, 2014

(54) LIQUID CRYSTAL DISPLAY

(71) Applicant: Sharp Kabushiki Kaisha, Osaka (JP)

(72) Inventors: Kazutaka Hanaoka, Osaka (JP); Seiji Tanuma, Osaka (JP); Yohei Nakanishi, Osaka (JP); Kazuya Ueda, Osaka (JP); Shingo Kataoka, Osaka (JP); Takahiro Sasaki, Osaka (JP); Arihiro Takeda, Osaka (JP); Hideaki Tsuda, Osaka (JP); Takatoshi Mayama, Osaka (JP); Yuichi Inoue, Osaka (JP); Norio Sugiura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/956,006

(22) Filed: Jul. 31, 2013

(65) Prior Publication Data

US 2014/0028935 A1    Jan. 30, 2014

Related U.S. Application Data

(60) Continuation of application No. 12/951,630, filed on Nov. 22, 2010, now Pat. No. 8,531,634, which is a continuation of application No. 12/261,788, filed on Oct. 30, 2008, now Pat. No. 7,872,719, which is a division of application No. 11/029,965, filed on Jan. 5, 2005, now Pat. No. 7,499,132, which is a division of application No. 10/095,626, filed on Mar. 12, 2002, now Pat. No. 6,977,704.

(30) Foreign Application Priority Data

Mar. 30, 2001 (JP) ................ 2001-098455

(51) Int. Cl.
*G02F 1/1337* (2006.01)
*G02F 1/139* (2006.01)
*G02F 1/137* (2006.01)

(52) U.S. Cl.
CPC .......... *G02F 1/1337* (2013.01); *G02F 1/13725* (2013.01); *G02F 1/1393* (2013.01); *G02F 1/133707* (2013.01); *G02F 1/133753* (2013.01)
USPC ........................................... 349/129

(58) Field of Classification Search
USPC .................................. 349/142–146, 129
See application file for complete search history.

(56) References Cited

U.S. PATENT DOCUMENTS 5,872,611 A    2/1999 Hirata et al.
6,040,885 A    3/2000 Koike et al.
(Continued)

FOREIGN PATENT DOCUMENTS

CN    1211745 A    3/1999
CN    1264844 A    8/2000
(Continued)

*Primary Examiner* — Richard Kim
(74) *Attorney, Agent, or Firm* — Greer, Burns & Crain, Ltd.

(57) ABSTRACT

A liquid crystal display including first and second substrates arranged opposite to each other to form a gap, with first and second alignment films provided on the first and second substrates, respectively. A cured material is provided on at least one of the first and second alignment films, and a liquid crystal layer of liquid crystal molecules is provided in the gap. The display includes a pixel electrode with a plurality of elongated members arranged with spaces therebetween, wherein the plurality of elongated members are electrically connected to each other, and a common electrode configured to apply a voltage to the liquid crystal layer in cooperation with the pixel electrode. The plurality of elongated members include first, second, third and fourth elongated members extending, respectively, in first, second, third and fourth directions in plan view. The cured material regulates alignment directions of the liquid crystal molecules.

7 Claims, 52 Drawing Sheets

(56) References Cited

U.S. PATENT DOCUMENTS

| | | | |
|---|---|---|---|
| 6,081,315 | A | 6/2000 | Matsuyama et al. |
| 6,157,425 | A | 12/2000 | Kuo et al. |
| 6,177,972 | B1 | 1/2001 | Held et al. |
| 6,177,973 | B1 | 1/2001 | Lee et al. |
| 6,297,866 | B1 | 10/2001 | Seo et al. |
| 6,344,883 | B2 | 2/2002 | Yamada et al. |
| 6,437,845 | B1 | 8/2002 | Yamada et al. |
| 6,459,467 | B1 | 10/2002 | Hashimoto et al. |
| 6,466,291 | B1 | 10/2002 | Ham |
| 6,466,293 | B1 | 10/2002 | Suzuki et al. |
| 6,567,144 | B1 | 5/2003 | Kim et al. |
| 6,642,981 | B1 | 11/2003 | Ohmuro et al. |
| 6,661,488 | B1 | 12/2003 | Takeda et al. |
| 6,671,019 | B1 | 12/2003 | Petschek et al. |
| 6,671,025 | B1 | 12/2003 | Ikeda et al. |
| 6,710,837 | B1 | 3/2004 | Song et al. |
| 7,414,688 | B2 | 8/2008 | Kim |
| 7,872,718 | B2 | 1/2011 | Inoue et al. |
| 2001/0006410 | A1 | 7/2001 | Yamada et al. |
| 2004/0119924 | A1 | 6/2004 | Takeda et al. ............ 249/129 |

FOREIGN PATENT DOCUMENTS

| | | |
|---|---|---|
| JP | 5-216014 | 8/1993 |
| JP | 06-160814 | 6/1994 |
| JP | 6-214218 | 8/1994 |
| JP | 8-015707 | 1/1996 |
| JP | 8-292423 | 11/1996 |
| JP | 09-179101 | 7/1997 |
| JP | 9-269472 | 10/1997 |
| JP | 10-153802 | 6/1998 |
| JP | 10-260427 | 9/1998 |
| JP | 11-149093 | 6/1999 |
| JP | 11-212093 | 8/1999 |
| JP | 11-223814 | 8/1999 |
| JP | 11-242225 | 9/1999 |
| JP | 11-326927 | 11/1999 |
| JP | 2000-056305 | 2/2000 |
| JP | 2000-075297 | 3/2000 |
| JP | 2000-098393 | 4/2000 |
| JP | 2000-122044 | 4/2000 |
| JP | A 2000-267101 | 9/2000 |
| JP | 2000-347189 | 12/2000 |
| JP | 2001-249340 | 9/2001 |
| KR | 1996-015028 | 5/1996 |
| KR | 1999-006951 | 1/1999 |

FIG.2

| MODE | TN | a-TN | ECB (HORIZONTAL) | OCB | IPS | ASM | FLC | MVA |
|---|---|---|---|---|---|---|---|---|
| INTERFACE ALIGNMENT PROCESSING | PERFORMED | NOT PERFORMED | PERFORMED | PERFORMED | PERFORMED | NOT PERFORMED | PERFORMED | NOT PERFORMED |
| MAIN EFFECT | FIXATION OF DISCRIMINATION (AT A TIME OF ALIGNMENT DIVISION) HIGH PRE-TILT | SUPPRESSION OF REVERSE TILT | IMPARTING OF TILTING POWER TOWARD RISING DIRECTION | FIXATION OF BEND ORIENTATION | IMPARTING OF TILTING POWER TOWARD SWITCHING DIRECTION | FIXATION OF AXIS SYMMETRY ALIGNMENT ERASURE OF PROPAGATION OF TILT | DISAPPEARANCE OF BISTABILITY (MULTI-GRADATION DISPLAY) SUPPRESSION OF CHEVRON STRUCTURE | APPEARANCE OF BULK TILT ·ERASURE OF DEVIATION IN ORIENTATION ANGLE DIRECTION ·ERASURE OF PROPAGATION OF TILT |
| RESPONSE SPEED IMPROVEMENT | ×~△ | △ | △~○ | × | △ | ○ | × | ◎ |
| PRODUCED PROBLEM | DROP IN OPTICAL ROTATORY POWER DROP IN CONTRAST | DROP IN OPTICAL ROTATORY POWER DROP IN CONTRAST | DETERIORATION IN BLACK LUMINANCE | DROP IN RESPONSE SPEED DROP IN TRANSMITTANCE SCATTERING | DETERIORATION IN BLACK LUMINANCE DROP IN TRANSMITTANCE | (DIFFICULT IF THERE IS NO PS) | DROP IN RESPONSE SPEED DECREASE OF TILT ANGLE | ALIGNMENT DISTURBANCE AROUND SINGULAR POINT |
| USE VALUE | × | △ | △ | × | × | ◎ | × | ◎ |
| TOTAL PERFORMANCE OF PS | × | △ | △ | × | × | ◎ | ○ | ◎ |

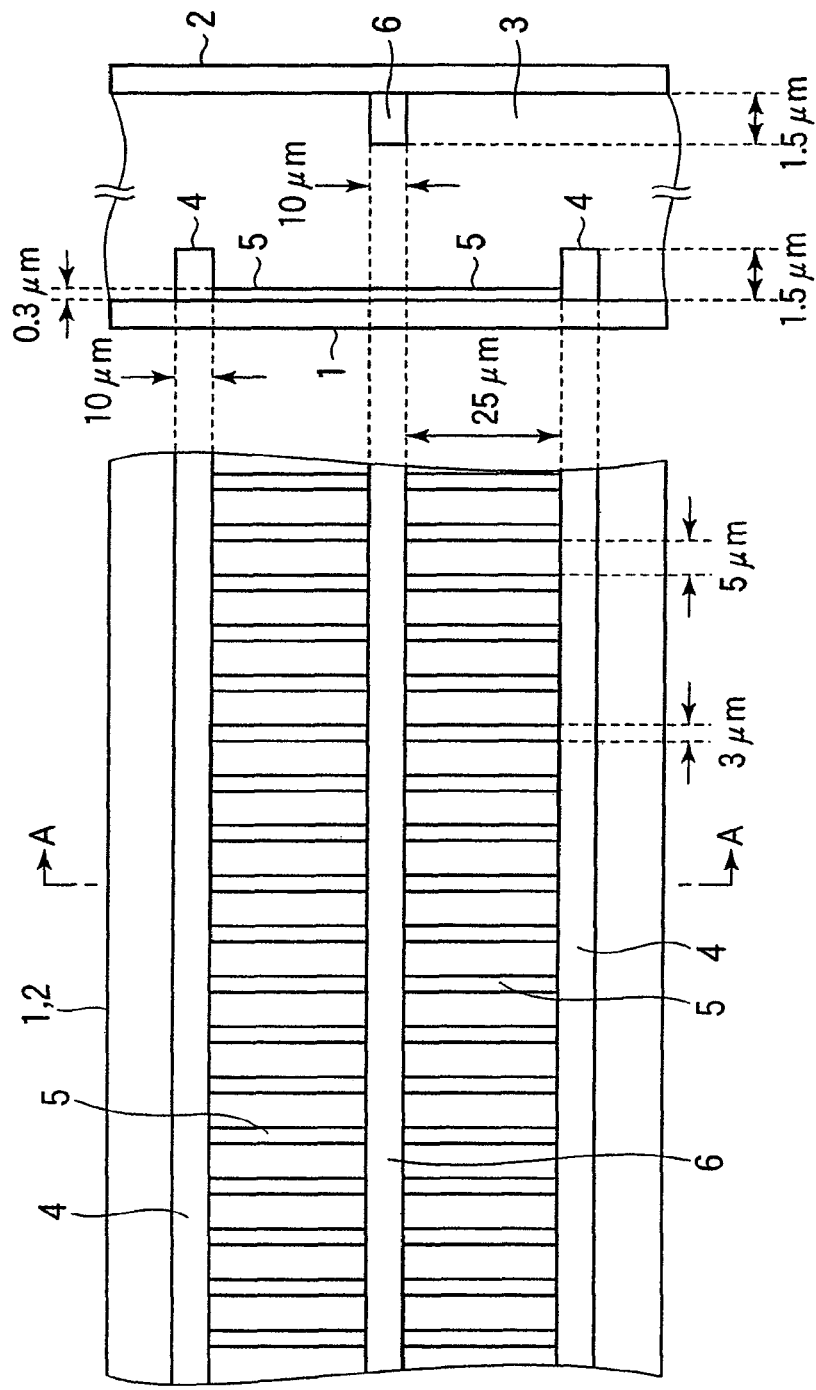

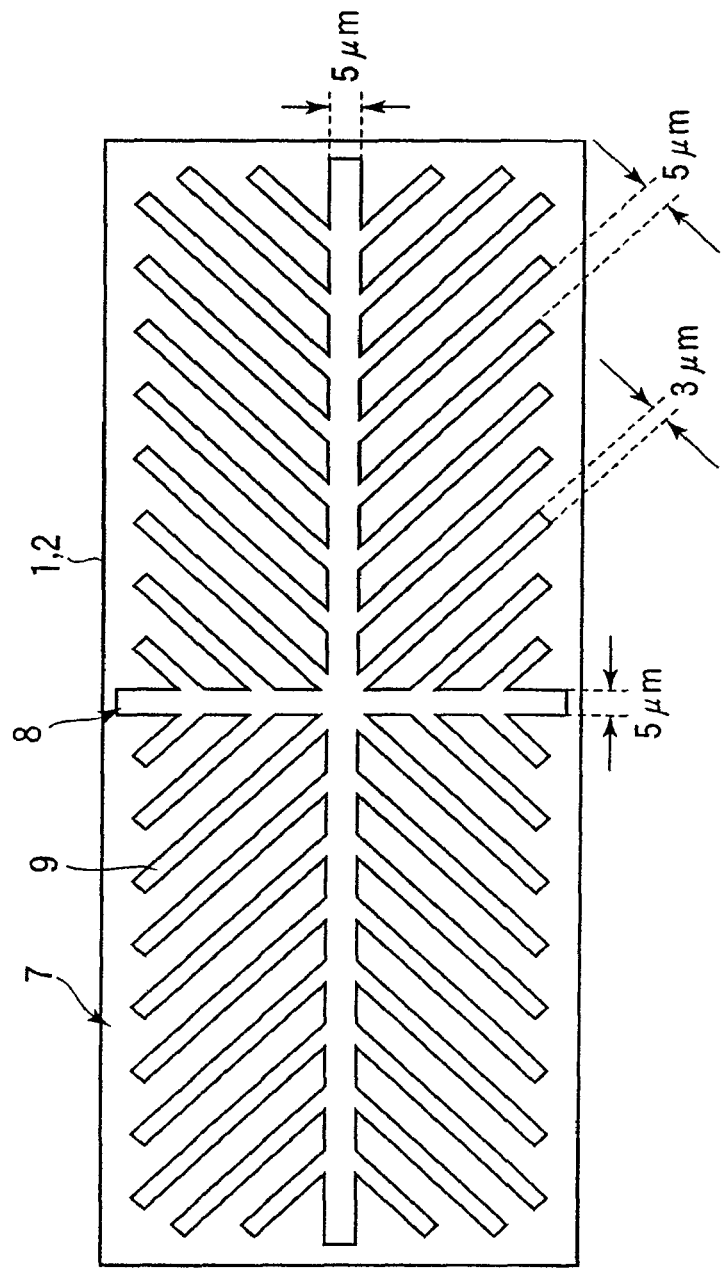

FIG.14A     FIG.14B
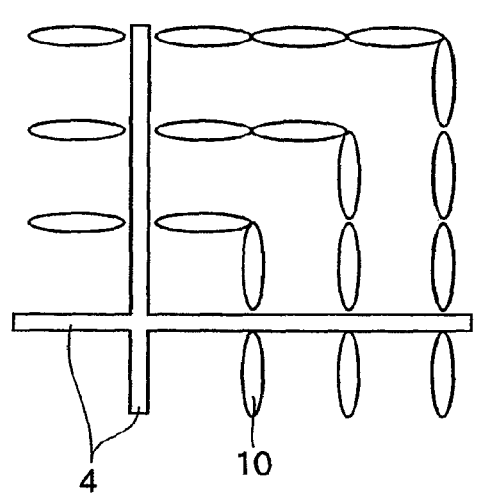
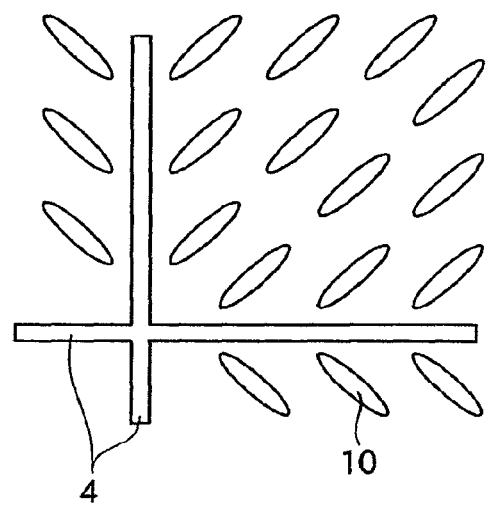
FIG.15
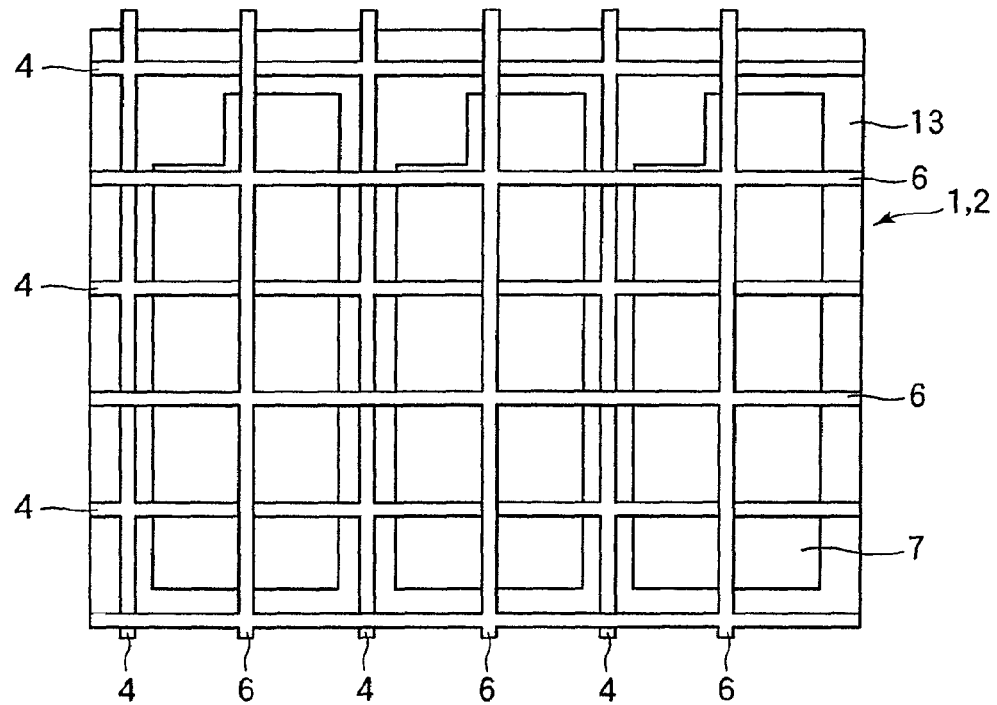

FIG.43
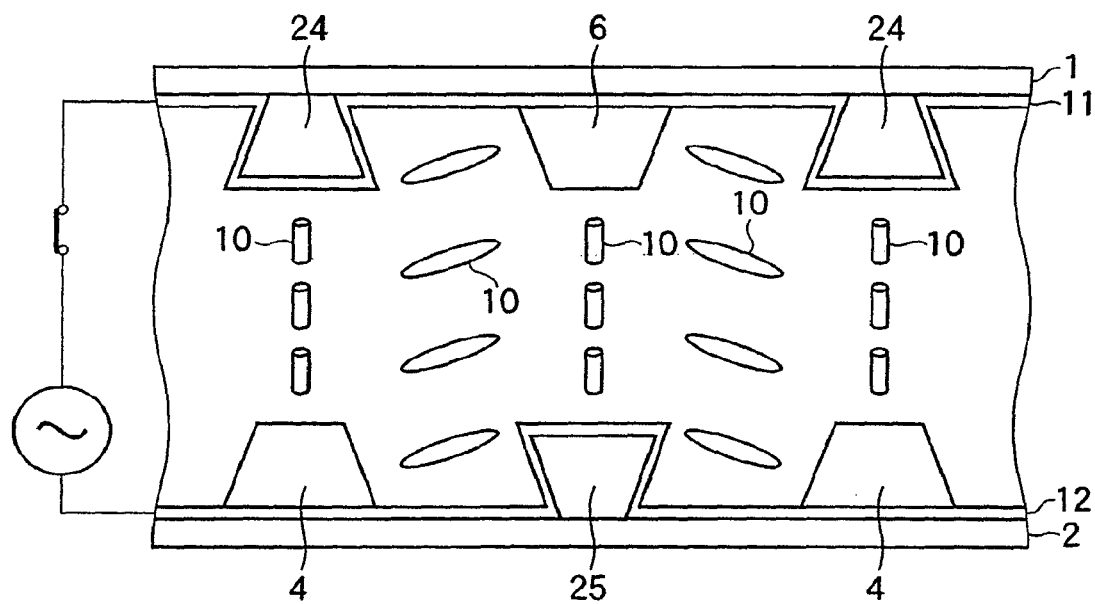
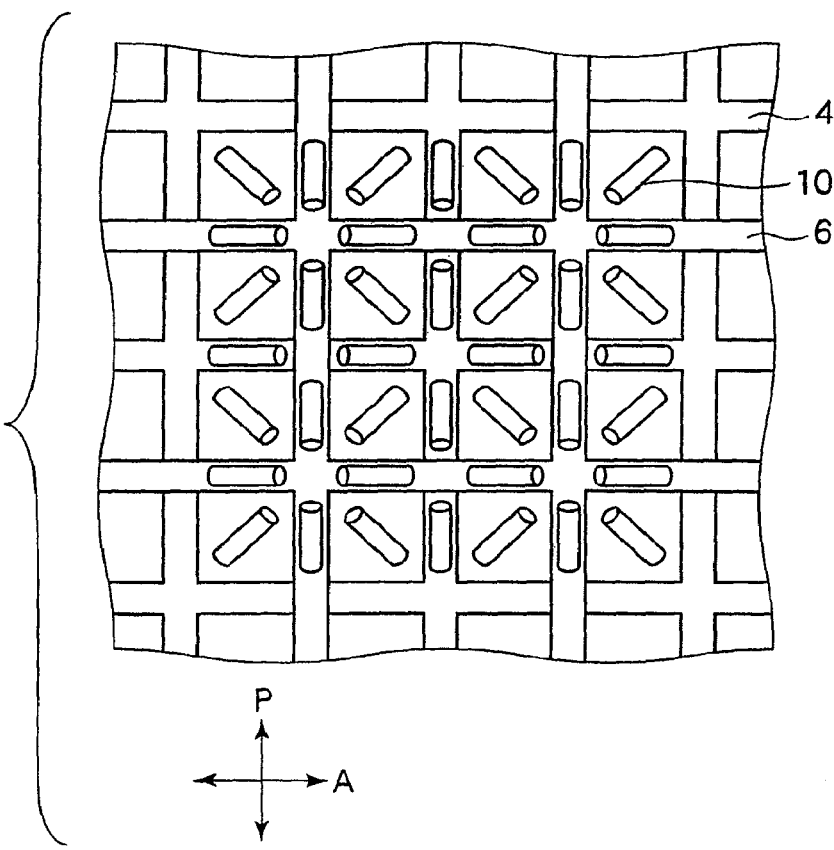
FIG.44

FIG.45A 0ms 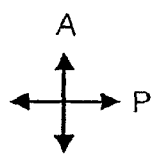

FIG.45B 12ms 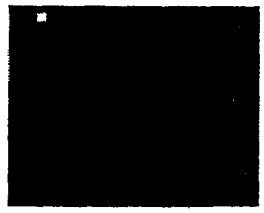

FIG.45C 16ms 
FIG.45F 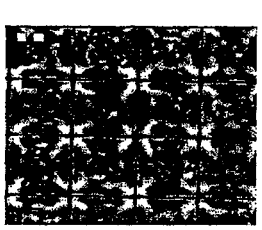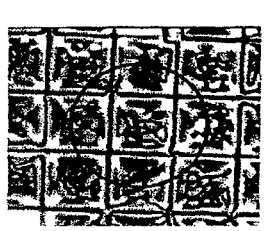

FIG.46A
PROBLEM 1
20ms
PROBLEM 2
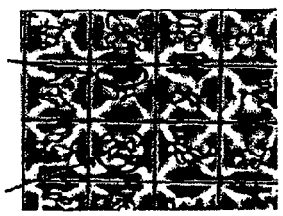
FIG.46E
FIG.46B
PROBLEM 3
40ms
FIG.46F
FIG.46C
100ms
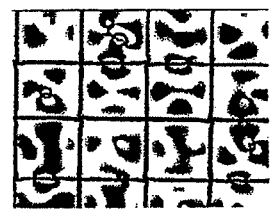
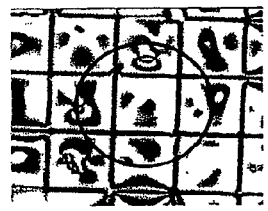
FIG.46G
FIG.46D
200ms
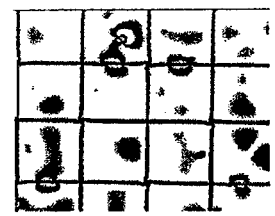
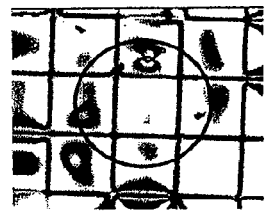
FIG.46H FIG.47A 400ms 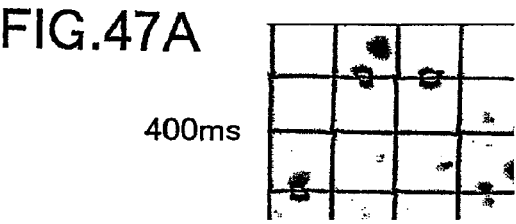 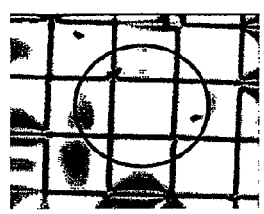 FIG.47D
FIG.47B 500ms 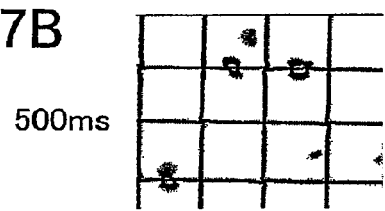 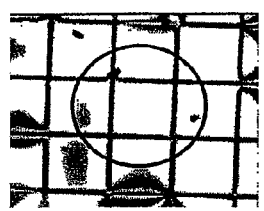 FIG.47E
FIG.47C 700ms 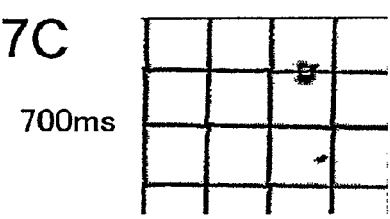 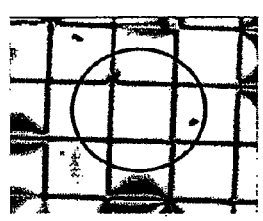 FIG.47F

| RELATIVE TRANSMITTANCE (%) | T on(ms) | |
|---|---|---|
| | COMPARATIVE EXAMPLE | EXAMPLE |
| 2.5 | 260.961 | 224.045 |
| 5 | 295.161 | 162.052 |
| 10 | 260.515 | 125.445 |
| 15 | 229.929 | 118.874 |
| 25 | 228.541 | 92.427 |
| 50 | 259.264 | 90.806 |
| 75 | 363.894 | 119.771 |
| 100 | 876.173 | 251.183 |

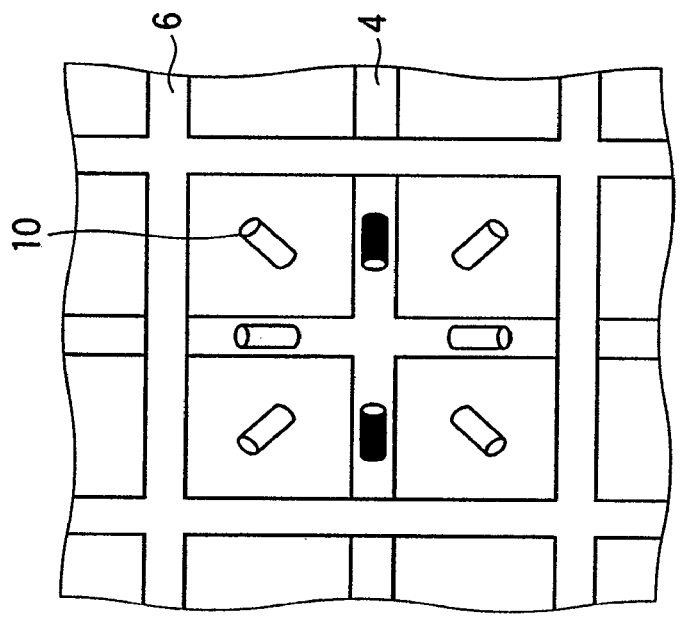
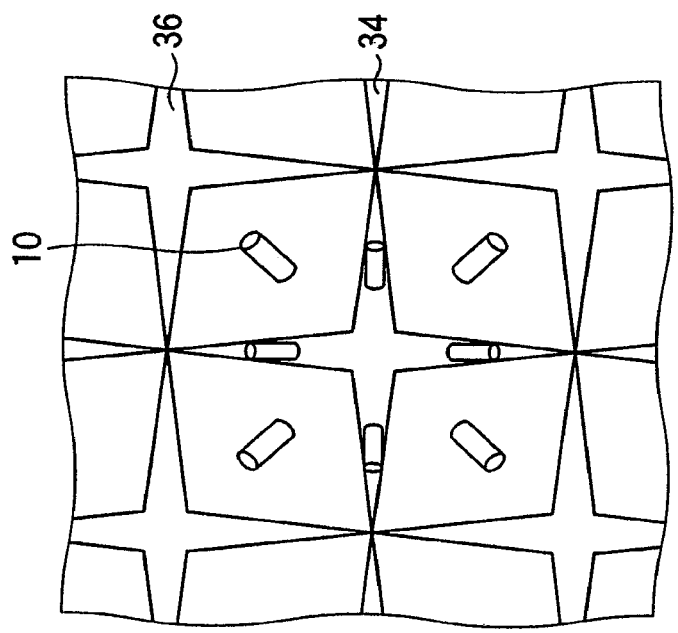

FIG.51A
FIG.51B
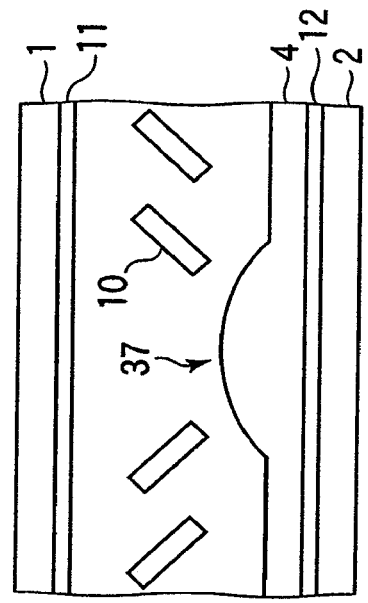
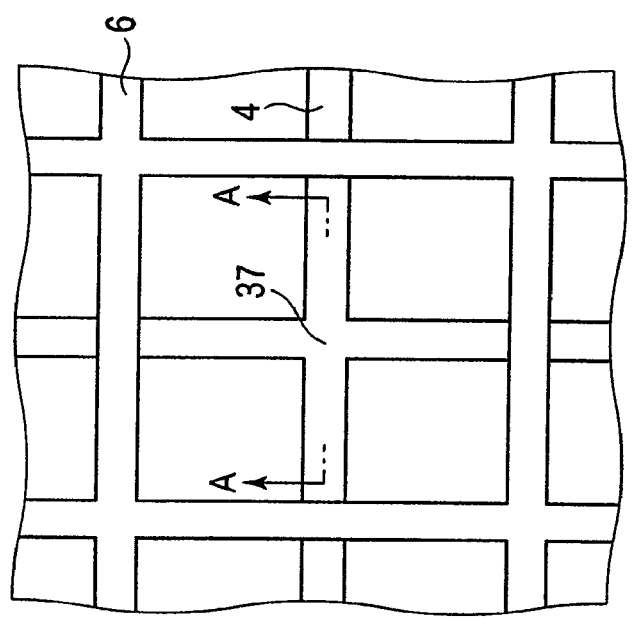

LIQUID CRYSTAL DISPLAY

This application is a continuation of application Ser. No. 12/951,630, filed Nov. 22, 2010, which is a continuation of application Ser. No. 12/261,788, filed Oct. 30, 2008, now U.S. Pat. No. 7,872,719, which is a division of application Ser. No. 11/029,965, filed Jan. 5, 2005, now U.S. Pat. No. 7,499,132, which is a division of application Ser. No. 10/095,626, filed Mar. 12, 2002, now U.S. Pat. No. 6,977,704.

BACKGROUND OF THE INVENTION

1. Field of the Invention

The present invention relates to a liquid crystal display (LCD), and particularly to a liquid crystal display based on an MVA (Multi-domain Vertical Alignment) mode of multi-division alignment in which alignment states of liquid crystal molecules having a negative dielectric anisotropy are made different from each other.

2. Description of the Related Art

An LCD is regarded as the most promising substitute for a CRT among various flat panel displays. It is expected that the LCD has an extended market by being applied to not only a display monitor of a PC (Personal Computer), a word processor, or an OA equipment, but also a display portion of a consumer (household electric) appliance such as a large screen television or a portable small-sized television.

A display operation mode of the LCD, which is most frequently used at present, is a normally-white mode using a TN (Twisted Nematic) liquid crystal. This LCD includes electrodes respectively formed on opposite surfaces of two glass substrates arranged opposite to each other, and horizontal alignment films formed on both the electrodes. The two horizontal alignment films are subjected to an alignment processing by rubbing or the like in the directions perpendicular to each other. Besides, polarizing plates having polarization axes adjusted to be parallel to the rubbing directions of the alignment films of the inner surfaces of the substrates are respectively arranged at the respective outer surfaces of the substrates.

When a nematic liquid crystal having a positive dielectric anisotropy is sealed between the substrates, liquid crystal molecules in contact with the alignment film are aligned in the rubbing direction. That is, the alignment directions of the liquid crystal molecules being in contact with the two alignment films cross at right angles. At the same time as that, the liquid crystal molecules between both the substrates are lined up in the direction vertical to the substrate surface while the alignment direction is successively rotated in a plane parallel to the substrate surface, and the liquid crystal is twisted with a twist angle of 90° between the substrates and is lined up.

If light is made incident on one of the substrate surfaces of the TN type LCD of the above construction, when linearly polarized light having passed through the polarizing plate at the side of the one substrate passes through the liquid crystal layer, the polarization orientation rotates in an arc of 90° along the twist of the liquid crystal molecules, and the light passes through the polarizing plate at the side of the other substrate having the polarization axis orthogonal to the polarizing plate at the side of the one substrate. By this, a bright state display can be obtained at the time of no voltage application (normally-white mode).

When a voltage is applied between the opposite electrodes, since major axes of the nematic liquid crystal molecules having the positive dielectric anisotropy are aligned perpendicularly to the substrate surface, the twist disappears. The liquid crystal molecules do not have birefringence (refractive index anisotropy) relative to the linearly polarized light incident on the liquid crystal layer of this state. Accordingly, since the incident light does not change its polarization direction, it can not pass through the other polarizing plate. By this, a dark state display is obtained at the time of predetermined maximum voltage application. When the state is again made the no voltage application state, it is possible to return the display to the bright state display by alignment regulating force. Besides, a gradation display becomes possible by changing the applied voltage to control the tilt of the liquid crystal molecule and to change the intensity of transmitted light from the other polarizing plate.

An active matrix TN type TFT-LCD in which a TFT (Thin Film Transistor) is provided in each pixel as a switching element for controlling an applied voltage between opposite electrodes for each pixel is widely used for a PC display monitor, a portable television or the like since it is thin and lightweight, and a large screen and high quality can be obtained. A manufacturing technique of the TN type TFT-LCD is remarkably advanced in recent years, and the contrast, color reproduction property and the like when looking at the screen front ways are superior to a CRT. However, the TN type TFT-LCD has a fatal defect that a viewing angle is narrow. Especially, the viewing angle in the vertical direction is narrow in panel observation directions. The luminance of a dark state increases in one direction and an image becomes whitish, and a dark display is obtained as a whole in the other direction, and a luminance inversion phenomenon of an image occurs at a halftone. This is the biggest defect of the TN type LCD.

As an LCD which has dissolved the problem of the viewing angle characteristics of the TN type LCD, there is an MVA-LCD disclosed in Japanese Patent No. 2947350. An example of the construction of the MVA-LCD will be described. First, electrodes are respectively formed at the sides of opposite surfaces of two substrates having a predetermined gap and arranged opposite to each other. Vertical alignment films are formed on both the electrodes, and a liquid crystal having a negative dielectric anisotropy is sealed between the two vertical alignment films. A plurality of linear projections made of insulators are periodically formed between the electrodes and the vertical alignment films of both the substrates. The linear projections opposite to each other between the two substrates are arranged while they are shifted by a half pitch from each other when viewed from the substrate surface. The linear projections are used for alignment control to divide the liquid crystal in a pixel region into plural alignment orientations. Incidentally, even if slit portions are provided on the electrodes instead of the linear projections, the alignment division can be controlled.

Two polarizing plates having polarization axes orthogonal to each other are provided at the outer surfaces of the two substrates. The attachment directions of the polarizing plates are adjusted so that the orientations of the major axes of the liquid crystal molecules tilted on the substrate display surfaces at the time of voltage application become approximately 45° with respect to the polarization axes of the polarizing plates when viewed from the substrate surface.

When a nematic liquid crystal having a negative dielectric anisotropy is sealed between the substrates, the major axes of the liquid crystal molecules are aligned in the vertical direction with respect to the film surface of the vertical orientation film. Thus, the liquid crystal molecules on the substrate surface are aligned vertically to the substrate surface, and the liquid crystal molecules on the tilted surfaces of the linear projections are aligned obliquely to the substrate surface.

When light is made incident on one of the substrate surfaces in the state where a voltage is not applied between both the electrodes of the MVA-LCD of the above construction, the linearly polarized light having passed through the one polarizing plate and incident on the liquid crystal layer travels in the directions of the major axes of the vertically aligned liquid crystal molecules. Since birefringence does not occur in the directions of the major axes of the liquid crystal molecules, the incident light travels without changing the polarization orientation, and is absorbed by the other polarizing plate having the polarization axis orthogonal to that of the one polarizing plate. By this, a dark state display is obtained at the time of no voltage application (normally-black mode).

When a voltage is applied between the opposite electrodes, the major axes of the liquid crystal molecules are aligned parallel to the substrate surface while the alignment orientations of the liquid crystal molecules on the substrate surface are regulated in accordance with the alignment orientations of the liquid crystal molecules tilted by the linear projections in advance.

The liquid crystal molecule has birefringence relative to the linearly polarized light incident on the liquid crystal layer of this state, and the polarization state of the incident light is changed according to the tilt of the liquid crystal molecule. At the time of predetermined maximum voltage application, since the light passing through the liquid crystal layer becomes, for example, linearly polarized light in which the polarization orientation rotates in an arc of 90°, it passes through the other polarizing plate and a bright state display is obtained. When the state of no voltage application is again produced, the display can be returned to the dark state display by the alignment regulating force. Besides, a gradation display becomes possible by changing the applied voltage to control the tilt of the liquid crystal molecule and to change the intensity of transmitted light from the other polarizing plate.

According to the active matrix MVA system TFT-LCD in which a TFT is formed in each pixel, since the alignment orientation of the liquid crystal in the pixel can be divided into plural ones, as compared with the TN type TFT-LCD, an extremely wide viewing angle and high contrast can be realized. Besides, since a rubbing processing is not required, the manufacturing process becomes easy and the manufacturing yield can be improved.

However, the conventional MVA system TFT-LCD can be improved in the response time of a display. That is, a high speed response can be made in the case where black is again displayed after a black display was changed to a white display. However, a response time when a halftone is displayed from another halftone is rather inferior to the TN type TFT-LCD.

Besides, also with respect to the transmittance of light, although the conventional MVA system TFT-LCD is substantially twice as excellent as a wide viewing angle LCD of an IPS (In-plane Switching) system of a horizontal electric field system, it is inferior to the TN type TFT-LCD.

As stated above, although the MVA system TFT-LCD has dissolved the problem of the conventional LCD with respect to the viewing angle, contrast, and response time of black-white-black display, it does not exceed the conventional TN type LCD with respect to the response time at a halftone display and the transmittance.

Here, the reason why the halftone response of the conventional MVA-LCD is slower than the conventional TN type LCD will be described with reference to FIGS. 73A to 74C. FIGS. 73A to 73C show a schematic construction of a section obtained by cutting an MVA-LCD panel in the direction vertical to a substrate surface. FIG. 73A shows an alignment state of liquid crystal at the time of no voltage application, and FIG. 73B shows an alignment state of the liquid crystal at the time of voltage application. FIG. 73C is a conceptual view showing an alignment control state. FIGS. 74A to 74C show a schematic construction of a section obtained by cutting a TN type LCD panel in the direction vertical to a substrate surface. FIG. 74A shows an alignment state of liquid crystal at the time of no voltage application, and FIG. 74B shows an alignment state of the liquid crystal at the time of voltage application. FIG. 74C is a conceptual view showing an alignment control state.

First, a TN type LCD 100 will be described with reference to FIGS. 74A to 74C. As shown in FIG. 74A, at the time of no voltage application, a liquid crystal 102 of the TN type LCD 100 is twisted with a twist angle of 90° and is aligned between an electrode 108 at the side of an upper substrate 104 and an electrode 110 (either alignment film is not shown) at the side of a lower substrate 106 arranged opposite to each other. When a voltage is applied between the electrodes 108 and 110, as shown in FIG. 74B, liquid crystal molecules rise almost vertically to the surfaces of the substrates 104 and 106 and the twist disappears. If the voltage application is removed, the liquid crystal molecules rotate in the direction substantially parallel to the original surfaces of the substrates 104 and 106 and return to the twist alignment. As stated above, in the case of the TN type LCD 100, as shown by an oblique line portion 112 of FIG. 74C, we can consider that not only the liquid crystal molecules in the vicinity of the interfaces of the not-shown alignment films on the electrodes 108 and 110 are alignment-controlled by the regulating forces of the alignment films, but also the liquid crystal molecules in the center region of the liquid crystal layer 102 are also alignment-controlled to a certain degree by a twist alignment due to addition of a chiral agent or the like.

On the other hand, as shown in FIG. 73A, at the time of no voltage application, in a liquid crystal 124 of an MVA-LCD 114, liquid crystal molecules other than those in the vicinity of linear projections 126, 128, and 130 are almost vertically aligned between an electrode 120 at the side of an upper substrate 116 and an electrode 122 (either alignment film is not shown) at the side of a lower substrate 118 arranged opposite to each other. The liquid crystal molecules in the vicinity of the linear projections 126 to 130 are aligned almost vertically to the surfaces of the not-shown alignment films on the oblique surfaces of the projections and are tilted with respect to the substrate surfaces. When a voltage is applied between the electrodes 120 and 122, as shown in FIG. 73B, the tilt of the liquid crystal is successively propagated in the tilt directions of the liquid crystal molecules in the vicinity of the linear projections 126 to 130 for alignment regulation. Thus, a time lag occurs until the liquid crystal in a portion between a linear projection and an adjacent linear projection, that is, in the center of the gap portion finishes tilting. Especially, in the gradation change from black to a dark halftone, the change amount of applied voltage is small and the change of the intensity of an electric field in the liquid crystal is small, so that the propagation speed of the tilt of the liquid crystal molecule is lowered.

Falling directions of the liquid crystal molecules existing in the space portions of the linear projections 126 to 130 are not determined if the tilt direction is not propagated from the linear projections 126 to 130. That is, as shown by oblique line portions 132 of FIG. 73C, the alignment of the liquid crystal in the MVA-LCD is regulated by only the distortion of an electric field in the vicinity of the interfaces of the alignment films to which the regulating forces of the alignment films on the substrate surfaces reach, and at the alignment films on the linear projections 126 to 130 and their vicinity, and the liquid crystal alignment of the other region is only indirectly controlled.

Even in the conventional MVA construction, if the space distance (pitch) of the linear projections of the upper and lower substrates is made short, the response time can be made short. However, as described above, in a general MVA-LCD, since the tilt orientation of liquid crystal is determined by the projection oblique surface of an insulator, the tilt portion must have a certain degree of width, length and height. Thus, the pitch of the upper and lower projections cannot be made very short.

FIG. 75 shows an alignment state of liquid crystal molecules at the time of voltage application when the MVA-LCD shown in FIGS. 73A to 73C is viewed from the side of the lower substrate 118. Among the three linear projections 126, 128 and 130 extending horizontally in the drawing, the upper and lower two projections 126 and 128 are formed on the lower substrate 118, and the center one projection 130 is formed on the upper substrate 116.

The liquid crystal molecules, which are aligned substantially vertically to the substrates 116 and 118 at the time of no voltage application, are alignment-divided, as shown in FIG. 75, at the time of voltage application into an alignment region A in which they are aligned in the direction (upward direction of the paper plane) toward the linear projection 128 at the side of the lower substrate 118 from the linear projection 130 at the side of the upper substrate 116, and an alignment region B in which they are aligned in the direction (downward direction of the paper plane) toward the linear projection 126 at the side of the lower substrate 118 from the linear projection 130.

That is, at the time of voltage application, the liquid crystal molecules over the adjacent alignment regions A and B at both sides of the linear projection 130 are alignment-divided so that the orientation of the major axis of the liquid crystal of the alignment region A becomes substantially +90° with respect to the extending direction of the linear projection 130, and the orientation of the major axis of the liquid crystal of the alignment region B becomes substantially −90° with respect to the extending direction of the linear projection 130. On the other hand, at the time of voltage application, the liquid crystal molecules in the vicinity of tops of the linear projections 126 to 130 are tilted in the directions in which the respective projections extend, and they are aligned so that the alignment orientation becomes substantially 0° or 180° (parallel) with respect to the extending directions of the respective linear projections 126, 128 and 130.

As stated above, at the time of voltage application, with respect to the alignment orientations (substantially 0° or 180° with respect to the extending directions of the linear projections 126 to 130) of the liquid crystal molecules in the vicinity of the tops of the linear projections 126, 128 and 130, the alignment orientations of the liquid crystal molecules of the display region on the substrates 116 and 118 come to have a state in which they rotate in an arc of 90°. Thus, as shown in FIG. 75, the liquid crystal molecules aligned in the orientation of 45° with respect to the extending directions of the respective linear projections 126, 128 and 130 are arranged at both sides of the tilt surfaces of the linear projections 126 to 130. However, polarization axes P and A of polarizing plates indicated by orthogonal arrows in the drawing are arranged to be tilted with an angle of 45° with respect to the alignment orientations of the liquid crystal molecules of the display regions A and B on the substrates 116 and 118.

Accordingly, since the alignment orientations of the liquid crystal molecules aligned in the orientation of 45° with respect to the respective linear projections 126, 128 and 130 become parallel to and orthogonal to the polarization orientations of the polarization axes P and A of the polarizing plates, as shown by broken lines in the drawing, two dark lines (discrimination lines) 140 and 142 are generated at both sides of the tilt surfaces of the linear projections 126 to 130. Incidentally, the two dark lines 140 and 142 are formed for every interval between a first singular point (indicated by (+1) in the drawing) and a second singular point (indicated by (−1) in the drawing) of alignment vector fields formed on the linear projections 126 to 130. At the first singular point (+1), the orientations of the major axes of the liquid crystal molecules are directed toward substantially the same point, and at the second singularity point (−1), part of the liquid crystal molecules are directed in different directions.

In the conventional MVA-LCD like this, if an attempt to shorten the response time of a halftone is made by shortening the pitch of the upper and lower projections to increase the formation density, not only the occupied area of the projections in the pixel region is increased, but also the formation density of the two dark lines 140 and 142 formed at both sides of the projection is also increased, and a drop in transmittance becomes so large that it can not be neglected. Accordingly, there arises a problem that if the formation density of the linear projections is made high in order to improve the response characteristics of the liquid crystal, the transmittance is lowered. As stated above, the conventional MVA-LCD construction has a problem that the improvement of the response characteristics of the liquid crystal and the improvement of the transmittance have a trade-off relation.

SUMMARY OF THE INVENTION

An object of the present invention is to provide a liquid crystal display in which a drop in transmittance is suppressed and response characteristics are improved.

Another object of the present invention is to provide a liquid crystal display in which a drop in response characteristics is suppressed and transmittance is improved.

The above objects are achieved by a liquid crystal display characterized by comprising a pair of substrates having a predetermined cell gap and arranged opposite to each other, vertical alignment films formed between the pair of substrates, a liquid crystal layer sealed between the vertical alignment films and having a negative dielectric anisotropy, an alignment regulating structural member arranged at least one of the pair of substrates, for regulating a total alignment direction of liquid crystal molecules in the liquid crystal layer at a time of voltage application, and a cured material provided in the liquid crystal layer and including a liquid crystal skeleton for tilting the liquid crystal molecules.

BRIEF DESCRIPTION OF THE DRAWINGS

FIG. 2 is a view showing application effects of example 1-1 according to the first embodiment of the present invention;

FIGS. 6A and 6B are views showing the schematic construction of an MVA cell according to example 1-3 of the first embodiment of the present invention;

FIG. 7 is a view showing the schematic construction of an MVA cell according to example 1-4 of the first embodiment of the present invention;

FIGS. 14A and 14B are views showing a state in which a liquid crystal panel including a cruciform projection structural member 4 formed on one substrate 1 is viewed in the direction of a normal of a substrate surface;

FIG. 15 is a view showing a state in which a liquid crystal panel according to example 2-1 of a second embodiment of the present invention is viewed in the direction of a normal of a substrate surface;

FIG. 43 is a view showing a liquid crystal panel construction according to example 6-6 of the sixth embodiment of the present invention;

FIG. 44 is a view for explaining a problem to be solved by a seventh embodiment of the present invention;

FIGS. 45A to 45F are views for explaining the problem to be solved by the seventh embodiment of the present invention;

FIGS. 46A to 46H are views for explaining the problem to be solved by the seventh embodiment of the present invention;

FIGS. 47A to 47F are views for explaining the problem to be solved by the seventh embodiment of the present invention;

FIGS. 50A and 50B are views showing a liquid crystal panel construction according to example 7-2 of the seventh embodiment of the present invention;

FIGS. 51A and 51B are views showing a liquid crystal panel construction according to example 7-3 of the seventh embodiment of the present invention;

DETAILED DESCRIPTION OF THE PREFERRED EMBODIMENTS

First Embodiment

A liquid crystal display according to a first embodiment of the present invention will be described with reference to FIGS. 1A to 7. This embodiment is characterized in that in a liquid crystal display for regulating the alignment of all liquid crystal molecules at the time of voltage application by local alignment regulation, as typified by the above MVA system, a propagation process of a tilt of the liquid crystal molecule at the time of a response operation by voltage application is eliminated, and the whole display region is tilted at the same time. In addition, there is provided a liquid crystal display showing very high-speed response characteristics in all gradations by improving the response property itself of the liquid crystal molecules to an electric field.

In order to improve the response speed in the MVA system or the like, it is indispensable that a time required for tilt propagation of liquid crystal molecules is made zero and the whole surface of a display region is made to tilt at the same time. In order to realize the whole surface simultaneous tilt, it is effective to form a stable state in which in the state of no voltage application, liquid crystal molecules are slightly tilted with respect to a substrate interface over the whole surface.

Figure 1A:
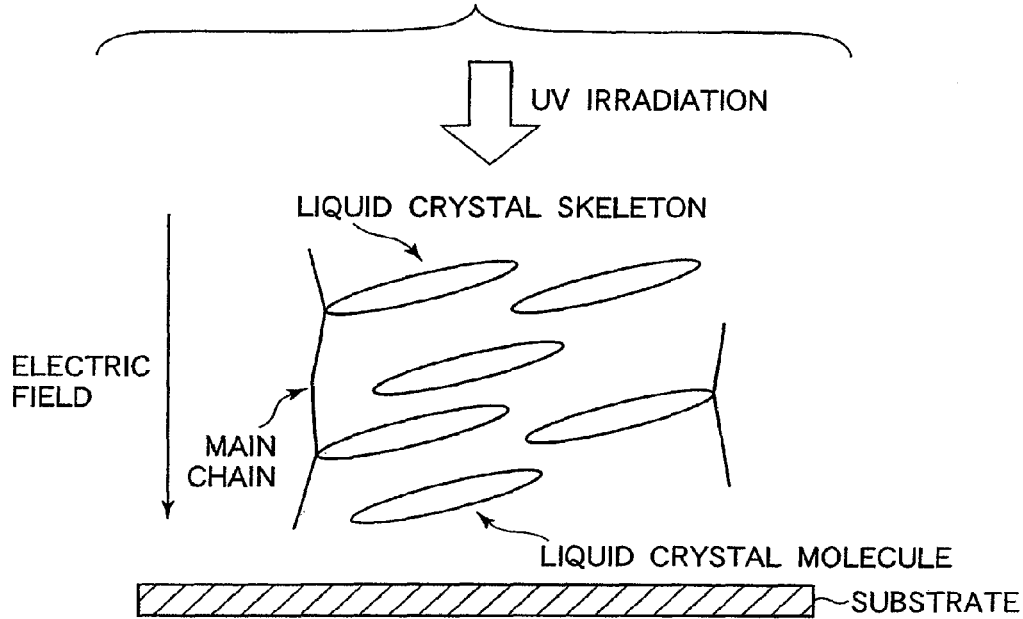
FIGS. 1A and 1B are views showing the operation principle of a liquid crystal display according to a first embodiment of the present invention.
Figure 1B:
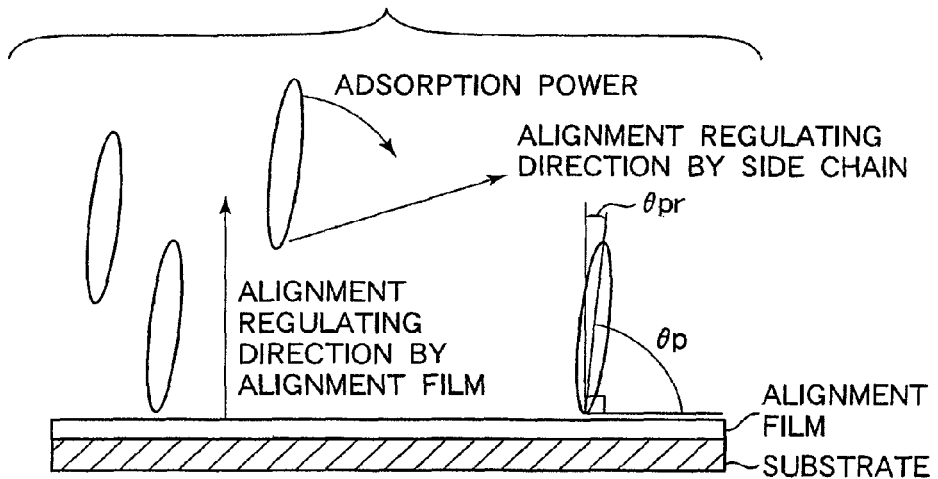

The operation principle of this embodiment is shown in FIGS. 1A and 1B. As a result of earnest trial, it has been found that the great speed-up in the response speed by the whole surface simultaneous tilt can be realized by forming, as shown in FIG. 1A, a photo-cured material of a photo-curable composition having a liquid crystal skeleton in a liquid crystal layer, and by forming the liquid crystal skeleton in a state where it is tilted with respect to a substrate. As shown in FIG. 1B, the liquid crystal skeleton is fixed at an angle different from an alignment control direction by an alignment film, and by adsorption power between the liquid crystal skeleton and liquid crystal molecules, the liquid crystal molecules are tilted toward the side of the alignment direction of the liquid crystal skeleton rather than the alignment control direction by the alignment film over the whole surface.

The magnitude of this tilt can be arbitrarily changed by a ratio of the liquid crystal skeleton to an amount of liquid crystal, and the alignment direction of the liquid crystal skeleton. Besides, at this time, since an attractive force toward the alignment direction of the liquid crystal skeleton exists for the liquid crystal molecules of the whole including the bulk, it becomes possible to realize higher speed switching than a state where a tilt alignment is caused only in the vicinity of the interface by rubbing or the like.

This function can also be realized to some degree by high polymer molecules having no liquid crystal skeleton. However, in order to fix the liquid crystal molecules uniformly in a panel without disturbing the alignment state of the liquid crystal molecules and by an addition amount of several wt %, a material showing a liquid crystal property before hardening is desirable. The material is easily mixed in a liquid crystal as a host and can be uniformly distributed, and structure formation at the time of hardening hardly disturbs the alignment of the liquid crystal molecules, so that an excellent fixing state can be obtained.

The alignment fixing technique of liquid crystal using such a high molecular material can also be applied to other existing operation systems (operation modes) in addition to the MVA system. However, it has been found that operation modes in which a great effect can be obtained by applying the alignment fixing technique in this embodiment are limited.

FIG. 2 shows main improvement effects of respective operation modes by alignment fixing using a high molecular material. As shown in FIG. 2, in the respective modes of a TN type, an a-TN type, an ECB type and an IPS type, the improvement effect of response speed at the time of voltage application can be obtained by applying this embodiment. However, in the TN type and the a-TN type, a drop in optical rotatory power and a drop in contrast are caused.

Besides, in the TN type, the a-TN type, the ECB type, and the IPS type, except for the a-TN type, it is necessary to perform an alignment processing in any modes. The alignment regulating power of the liquid crystal molecules by this interface alignment processing is very high, and controllability of a tilt angle or the like is also very excellent. However, one step is added to panel manufacturing steps by this interface alignment processing, and in addition, a polymer structure formation process is added in order to realize alignment stabilization using the high molecular material of this embodiment. Besides, in a horizontal alignment mode using a nematic liquid crystal, especially in an operation mode in which the time of a horizontal alignment is made black, a slight disturbance of the alignment order of the liquid crystal molecules or a change of a tilt greatly influences the display quality. In view of the above, it is conceivable that even if this embodiment is applied to the TN type, the ECB type, and the IPS type, there are few merits.

Although the OCB mode has features that a high speed response and a wide viewing angle can be obtained, there is a defect that a high driving voltage is required to form a bend alignment, and when the power supply is again switched on after the power supply is cut, re-alignment must be made. Since the alignment stabilization by the high molecular material can fix the bend alignment, this defect can be improved. However, for that purpose, it is necessary to add the high molecular material at a high concentration, and as a result, scattering of transmitted light occurs and transmittance is lowered. Besides, the degree of freedom of liquid crystal molecules in the space is lowered, and the response speed is lowered.

In the FLC, although a high speed operation about 1000 times as fast as the nematic liquid crystal is possible, since it has bistability, there is a defect that a halftone display is difficult to produce. Besides, since a chevron layer construction is adopted in a normally used SmC* layer, there is also a problem that a zigzag alignment defect is apt to occur. These can be improved by using the mutual action to the liquid crystal skeleton in the high molecule. However, the tilt angle is decreased by the mutual action, and a drop in response speed is also caused. Besides, there also arises a problem that a uniform alignment becomes difficult to obtain in the FLC in which alignment control is difficult from the first.

Differently from the operation modes described above, in the vertical alignment type ASM and the MVA mode, the tilt direction is regulated by an alignment regulating structural member locally provided on the surface of the substrate. Thus, an interface alignment processing process such as rubbing is unnecessary. Besides, a vertical alignment is purely made from the interface to the bulk in the state of no voltage application and a black display is produced. Thus, as compared with the other horizontal modes such as the TN mode, even if the alignment order is disturbed by forming the polymer structure according to this embodiment, a drop in contrast by the change of refractive index anisotropy is very low.

However, differently from the MVA mode, in the ASM mode, when tilting occurs in the substrate surface direction in any divided display regions, a twisted alignment state of about 90° is produced between upper and lower substrates. Thus, differently from the MVA mode, similarly to the foregoing TN mode, there is a problem that the twist state is disturbed at the time of alignment stabilization. Accordingly, there are many restrictions in the addition amount and the tilt angle given to the bulk, and it is difficult to obtain the effect of high molecule stabilization to the utmost. Besides, the twist deformation occurs at the time of tilting, which prevents a high-speed response.

From the above, when the alignment stabilization technique by the photo-cured material is applied to the MVA mode satisfying the following conditions, the maximum effect can be first obtained.

1. The tilt directions of all liquid crystal molecules are regulated by an alignment regulating structural member locally provided on the substrate surface, and the response operation is performed by the propagation of the tilt of the liquid crystal molecules; and 2. they are formed of the nematic phase, there is no twist deformation, and tilting simply occurs in the uniaxial direction to the substrate surface direction.

Figure 75:
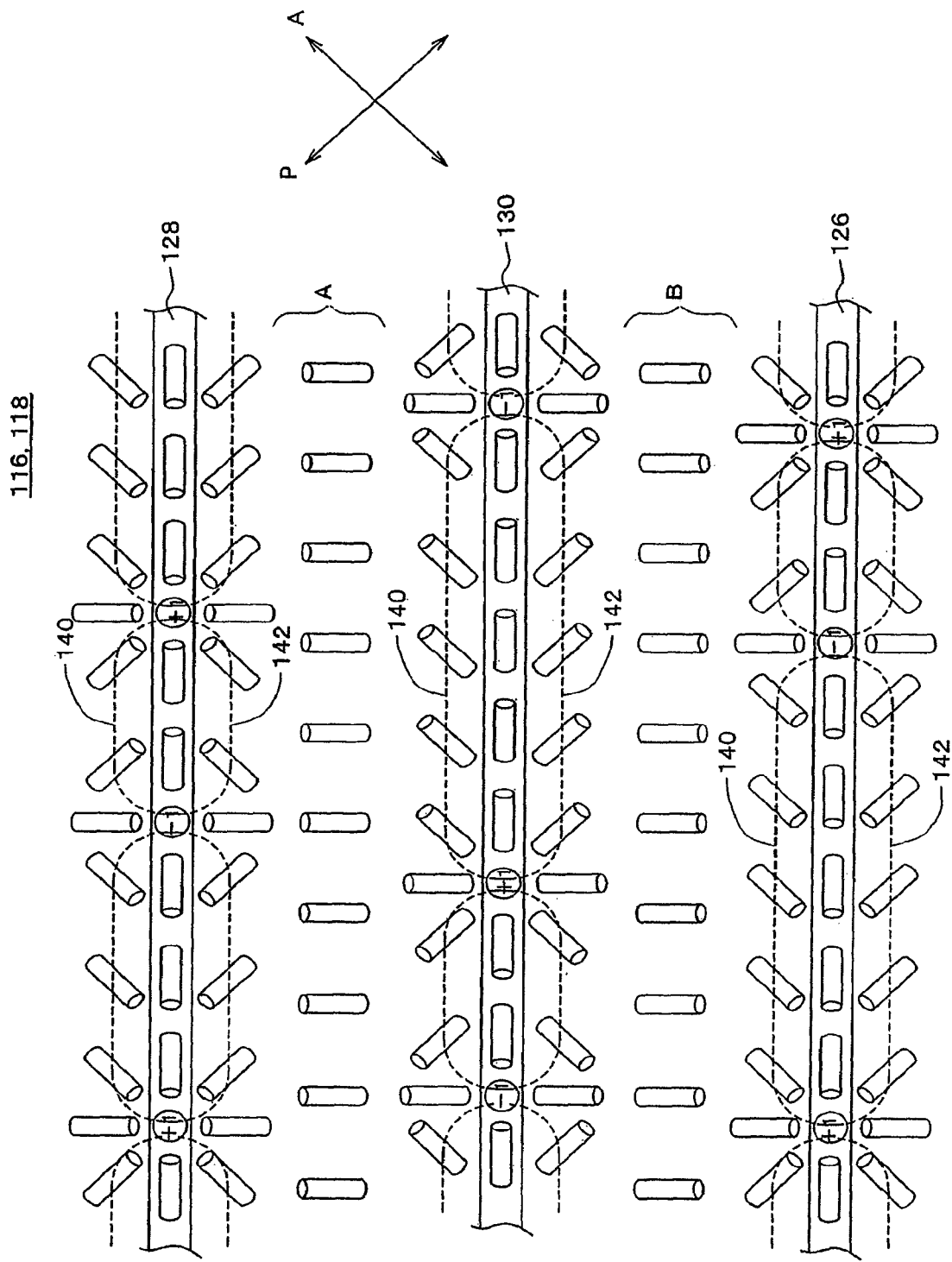
FIG. 75 is a view showing an alignment state of liquid crystal molecules at the time of voltage application when the MVA-LCD shown in FIGS. 73A to 73C is viewed from the side of a lower substrate 118.

In the case where the alignment regulating structural member is a linear projection as in the MVA mode, the liquid crystal molecules on the alignment regulating structural member are tilted along the extending direction of the linear projection. A place where the tilt directions of the liquid crystal molecules on the projection are different by 180° which is azimuth angle in the projection extending direction becomes a singular point of the alignment. In the case where the liquid crystal molecules in each domain are tilted in the vertical direction to the extending direction of the alignment regulating structural member, as shown in FIG. 75, if the influence of the singular point is high, the alignment direction of the display region is shifted in the extending direction of the alignment regulating structural member. If the photo-curing material is cured in such a state, the polymer structure is formed to be superimposed on the disturbance of the alignment, the contrast is lowered and the roughness of a display occurs.

In order to solve this, first, the photo-curing material is cured in such a way that the tilt angle of the liquid crystal molecule on the alignment regulating structural member is small, and the deformation occurring between the liquid crystal molecule on the alignment regulating structural member and the liquid crystal molecule of a space portion is made κ spray deformation shifted in a polar angle direction. That is, when the tilt angle of the liquid crystal molecule on the alignment regulating structural member is made $\theta_{pr}$, which is the tilt angle of the LC molecule from the vertical state, as shown in FIG. 1B when the photo-curing material is cured in the state satisfying $0° \leq \theta_{pr} < 45°$, an excellent alignment state can be obtained.

Second, the tilt direction of the liquid crystal molecule on the alignment regulating structural member is always made a constant direction and the generation of a singular point is suppressed. That is, if a construction is such that an angle between orientation angle directions at the time of tilting of liquid crystal molecules in regions divided by the alignment regulating structural member as a boundary does not become 180°, the alignment direction is regulated in one direction stable in energy, and the generation of the singularly point to disturb the alignment direction of the space portion is suppressed. At this time, it is desirable that the angle between the orientation angle directions at the time of tilting of the liquid crystal molecules in the regions is 90° in view of transmittance.

Third, it is appropriate that an auxiliary alignment control factor to suppress the disturbance of the orientation angle direction at the time of tilting is added in addition to the alignment regulating structural member for roughly regulating the tilt direction (propagation direction) of a display region. In the conventional MVA system, for example, a plurality of linear projections are arranged in parallel to one another, and the liquid crystal molecules of a space portion between the projections are tilted in the direction perpendicular to the extending direction of the projections by the propagation of the tilt. Accordingly, a singular point is generated, and the tilt state is propagated while the orientation angle in the vicinity of the projection edge is shifted. Accordingly, if the alignment control factor to regulate the orientation angle in the direction perpendicular to the extending direction is auxiliary provided in the space portion between the projections, an excellent alignment state can be obtained in the display region without being influenced by the alignment state on the alignment regulating structural member.

By using this embodiment, the propagation process of the tilt of the liquid crystal molecules at the time of the response operation is eliminated and the whole display region can be simultaneously tilted. Besides, the response property of the liquid crystal molecule with respect to an electric field can also be improved. Especially, in the liquid crystal display in which an alignment processing such as rubbing is not performed to the alignment film and the total alignment of the liquid crystal molecules at the time of voltage application is regulated by the locally provided alignment regulating structural member, very high speed response characteristics can be realized.

Hereinafter, specific examples will be described.

Example 1-1

Liquid crystal monoacrylate monomer UCL-001-K1 of 2.5 wt % of Dainippon Ink Co., Ltd was added to liquid crystal material A having a negative dielectric anisotropy, and after being injected into an MVA cell, it was cured by ultraviolet rays while a voltage of 5.0 V was applied. Here, polyamic-acid material X was used as a vertical alignment film, banks (projections) each having a height of 1.5 µm and a width of 10 µm are alternately provided with resist LC-200 of Shipley Co., Ltd to make a space of 37.5 µm, and a cell gap was made 4.0 µm. A driving mode is normally-black.

Figure 3:
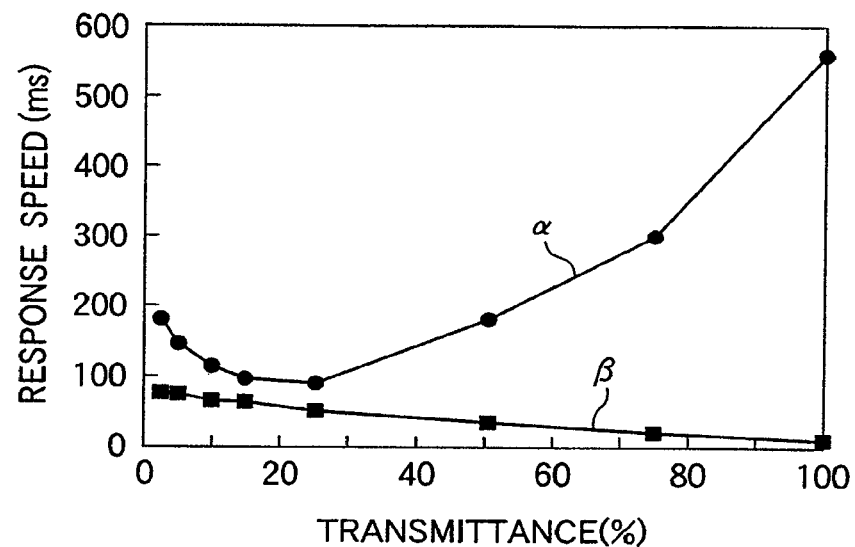
FIG. 3 is a view showing the measurement results of response speed according to the example 1-1 of the first embodiment of the present invention.

FIG. 3 shows measurement results of response speed in this example. The horizontal axis indicates the transmittance (%) obtained when a predetermined voltage is applied from an applied voltage of 0 V, and the vertical axis indicates the response speed (ms; millisecond). A polygonal line α indicates a case where a photo-curing material is not added in the liquid crystal, and a polygonal line β indicates a case where the photo-curing material of 2.5 wt % is added as mentioned above. As compared with the cell in which the photo-curing material is not added, an improvement greatly exceeding double is obtained. When transmittance in a dark state was measured by a luminance meter LCD-7000 of Otsuka Denshi Co., Ltd., it was 0.017%, and the value almost equal to the case where the photo-curing material was not added was obtained.

Comparative Example 1-1

Liquid crystal monoacrylate monomer UCL-001-K1 of 2.5 wt % of Dainippon Ink Co., Ltd was added to liquid crystal material P having a positive dielectric anisotropy, and after being injected into a TN liquid crystal cell, it was cured by ultraviolet rays while a voltage of 5.0 V was applied. Here, polyimide homogenous alignment film material Z was used for an alignment film, and a rubbing processing was performed as an alignment processing to upper and lower substrates. A driving mode is normally-white. A cell gap was made 4.0 µm. At this time, similarly to the example 1-1, when transmittance in a dark state was measured by a luminance meter LCD-7000 of Otsuka Denshi Co., Ltd., it was 0.41%, that is, the transmittance twenty or more times as high as that of the cell shown in the example 1-1 was observed. In order to make the transmittance in the dark state 0.1% or less, it was necessary to cause curing by application of about 2 V.

Figure 4:
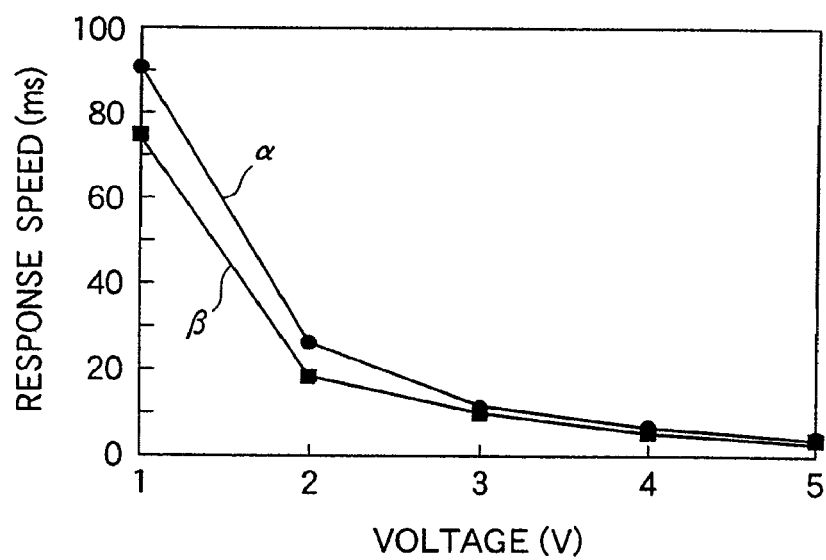
FIG. 4 is a view showing the measurement results of response speed according to comparative example 1-1.

FIG. 4 shows measurement results of response speed in this comparative example. The horizontal axis indicates the applied voltage (V), and the vertical axis indicates the response speed (ms). A polygonal line α indicates a case where a photo-curing material is not added in the liquid crystal, and a polygonal line β indicates a case where the photo-curing material of 2.5 wt % is added as mentioned above. An improvement in response speed was about 20 percent, and was considerably low as compared with the example 1-1.

Example 1-2

In the MVA cell of the example 1-1, when the alignment state at the time of voltage application of 5.0 V was observed, disturbance of alignment caused by singular points generated on the alignment regulating structural members as shown in FIG. 75 was observed in the space portion between the alignment regulating structural members. When the change of the alignment state with respect to the applied voltage at the time of photo-curing was examined, an excellent alignment was obtained till application of 3V, and the disturbance of the alignment became noticeable from the time of application of 3.5 V.

Next, the alignment film material was changed to a polyamic-acid material whose vertical alignment ability is much stronger than that of vertical alignment film material X. and when a similar experiment was carried out, an excellent alignment was obtained till application of 3.5 V.

Figure 5:
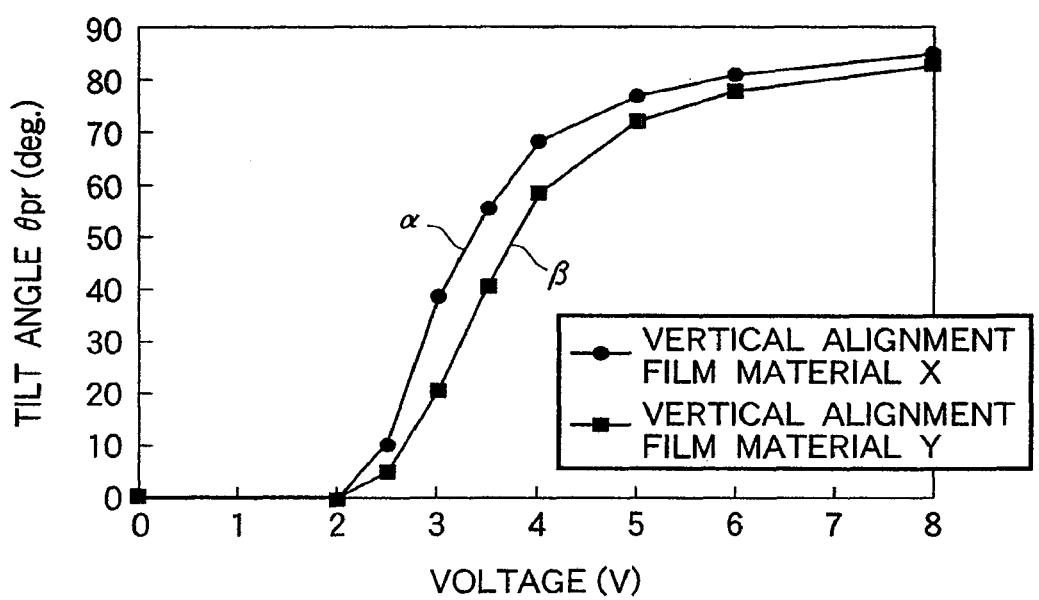
FIG. 5 is a view showing the relation between the tilt angle of liquid crystal molecules on an alignment regulating structural member and transmittance (indicated by applied voltage) before formation of polymer.

FIG. 5 shows the relation between the tilt angle of liquid crystal molecules on the alignment regulating structural members and the applied voltage before polymer formation in these cells. The horizontal axis indicates the applied voltage (V), and the vertical axis indicates the tilt angle (deg). The tilt angle $\theta_{pr}$ of 90° is the value when the maximum transmittance is got on the alignment regulating structural member using vertical alignment film material X. In the drawing, a polygonal line α indicates a case where the alignment film is made of vertical alignment film material X and a polygonal line β indicates a case where the alignment film is made of vertical alignment film material Y. As is apparent from FIG. 5, it has been confirmed that a boundary as to whether or not the disturbance of alignment is produced is about a tilt angle $\theta_{pr}$ of 45°.

Example 1-3

FIGS. 6A and 6B show a schematic construction of an MVA cell according to the example. FIG. 6A shows a state where the cell is viewed against a substrate surface, and FIG. 6B shows a section taken along line A-A of FIG. 6A. The MVA cell of this example has the construction in which auxiliary alignment control factors 5 for suppressing the disturbance of orientation angle direction at the time of tilting are added in addition to alignment regulating structural members 4 and 6 for roughly regulating the tilt direction (propagation direction) of a display region.

In FIGS. 6A and 6B, a liquid crystal layer 3 is sealed between two glass substrates 1 and 2 having a predetermined cell gap and bonded opposite to each other. Transparent electrodes (either of them is not shown) made of ITO are respectively formed on the opposite surfaces of the two opposite substrates 1 and 2. The plurality of alignment regulating structural members 4 of linear projections arranged at a pitch of 70 µm in parallel with each other are formed on the transparent electrode of the substrate 1. On the other hand, the plurality of alignment regulating structural members 6 of linear projections arranged at the same pitch as the alignment regulating structural members 4 and shifted from the alignment regulating structural members 4 by a half pitch are formed on the transparent electrode of the substrate 2. The width of each of the alignment regulating structural members 4 and 6 is 10 µm and the height thereof is 1.5 µm.

In space portions between the alignment regulating structural members 4, the alignment control factors 5 each having a height of 0.3 µm are extended at a pitch of 8 µm between the adjacent alignment regulating structural members 4. Liquid crystal monoacrylate monomer mixed liquid crystal similar to the example 1-1 was inserted in the liquid crystal layer 3, and was cured by ultraviolet rays while a voltage of 5.0 V was applied. Vertical alignment film material X is used for the not-shown alignment films, and resist LC-200 of Shipley Co., Ltd. is used for the formation material of all the alignment regulating structural members 4 and 6 and the alignment control factors 5. A cell gap is 4.0 µm.

Similarly to the example 1-1, although curing was carried out in the state where singular points were generated on the main alignment regulating structural members 4 and 6 of 1.5 µm, the alignment disturbance of the display region as shown in FIG. 75 was not produced. Incidentally, the tilt directions of the liquid crystal molecules in the space portions between the alignment regulating structural members 4 and 6 were the same as the example 1-1.

Example 1-4

FIG. 7 shows a state in which a schematic construction of an MVA cell according to this example is viewed against a substrate surface. In FIG. 7, a liquid crystal layer 3 (not shown) is sealed between two glass substrates 1 and 2 having a predetermined cell gap and bonded opposite to each other. Transparent electrodes made of ITO are respectively formed on opposite surfaces of the two opposite substrates 1 and 2. For example, slit portions 8 and 9 formed by partially removing electrode material are provided on the transparent electrode 7 at the side of the substrate 1. The cruciform slit portion 8 having a width of 5 µm and connecting the center points of respective opposite sides of a rectangular cell functions as an alignment regulating structural member 4. The plurality of slit portions 9 extending from the slit portion 8 in an oblique direction of 45° and having a width of 3 µm are formed at a pitch of 8 µm, and these function as auxiliary alignment control factors to suppress the disturbance of the orientation angle direction at the time of tilting.

A cell was formed in which this substrate 1 and the substrate 2 having ITO formed on almost all the surfaces were bonded to each other, and liquid crystal monoacrylate monomer mixed liquid crystal similar to the example 1-1 was sealed, and was cured by ultraviolet rays while a voltage of 5.0 V was applied. Vertical alignment film material X is used for the alignment film. The cell gap is 4.0 µm.

The liquid crystal molecules of the space portions at the time of voltage application are tilted in the directions parallel to the extending directions of the thin slit portions 9, and four domains are formed by the thick slit portion 8 as the boundary. At this time, one singular point was merely formed at the center portion of the cruciform shape on the slit portion 8, and a singular point was not observed at other places. After curing by ultraviolet rays, the disturbance of alignment as shown in FIG. 75 was not produced.

By using this example, very high-speed response characteristics in all gradations can be realized while an excellent alignment state is kept.

Second Embodiment

Next, a liquid crystal display according to a second embodiment of the present invention will be described with reference to FIGS. 8A to 18. This embodiment relates to a liquid crystal display in which liquid crystal molecules are tilted in a direction of 0° or 45° with respect to the extending direction of an alignment regulating structural member such as a projecting structural member or a slit portion of a transparent electrode, and alignment of the liquid crystal molecules is regulated by a liquid crystal skeleton by photo-curing or heat-curing or a non-liquid crystal skeleton.

As a vertical alignment type LCD, although an MVA-LCD using an alignment regulating construction is put to practical use, there is a problem that light transmittance is lowered by the disturbance of the alignment of liquid crystal molecules around the projecting structural member. In order to solve this defect, a singular point control type liquid crystal display is proposed in a patent application (Japanese Patent Application No. 2000-60200) filed with Japanese Patent Office. A singular point control portion is formed to control the position of a singular point of liquid crystal, so that the alignment disturbance of the liquid crystal molecules is suppressed, and a drop in light transmittance is suppressed. As an example, a singular point control portion such as a cruciform projection or an electrode slit portion is proposed. Besides, as another method for improving the light transmittance, a method is proposed in which a minute slit portion is formed on a transparent electrode, and liquid crystal molecules are tilted parallel to the slit portion to prevent alignment disturbance, so that the drop in the light transmittance is prevented.

However, according to the above cruciform projection or the electrode slit portion, or the minute projection or the minute electrode slit portion, there is a case in which there arises a problem that the response time becomes very slow though the luminance is improved as compared with the general MVA-LCD. The reason why the response time becomes slow will be described below.

FIGS. 8A to 13D show alignment states of liquid crystal molecules with respect to alignment regulating structural members or singular point control portions. FIGS. 8A, 8C, 9A, 9C, 10A, 10C, 11A, 11C, 12A, 12C, 13A and 13C show states of liquid crystal molecules 10 sealed between two substrates 1 and 2 arranged opposite to each other, in section taken in a direction of a normal of a substrate surface. FIGS. 8B, 8D, 9B, 9D, 10B, 10D, 11B, 11D, 12B, 12D, 13B and 13D show the states of the liquid crystal molecules 10 viewed in the direction of the normal of the substrate surface. FIGS. 8A, 8B, 9A, 9B, 10A, 10B, 11A, 11B, 12A, 12B, 13A and 13B show states of no voltage application in which a potential difference between transparent electrodes 11 and 12 formed on opposite surfaces of the substrates 1 and 2 is zero, and FIGS. 8C, 8D, 9C, 9D, 10C, 10D, 11C, 11D, 12C, 12D, 13C and 13D show states of voltage application.

Figure 8A:
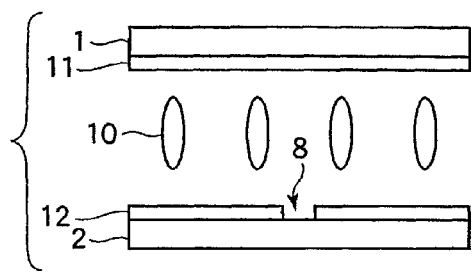
FIGS. 8A to 8D are views showing the alignment state of liquid crystal molecules with respect to an alignment regulating structural member or a singular point control portion.
Figure 8C:
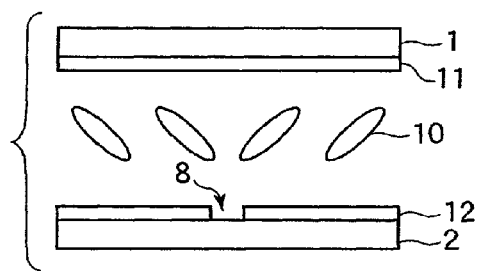
Figure 8B:
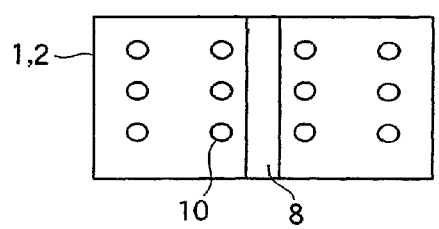
Figure 8D:
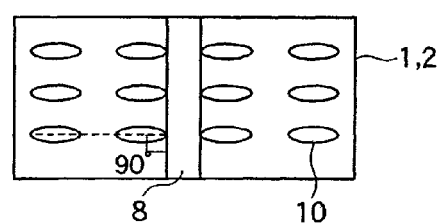

First, in FIGS. 8A to 8D, a slit portion 8 is formed on the transparent electrode 12. When a voltage is applied between the electrodes 11 and 12, the liquid crystal molecules 10 in the vicinity of the slit portion 8 start to tilt, and the tilt of the liquid crystal molecules 10 is spread over the whole (see FIG. 8C). As shown in FIG. 8D, the orientation of the tilt is substantially orthogonal to the extending direction of the slit portion 8.

Figure 9A:
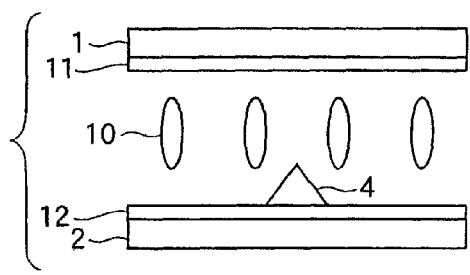
FIGS. 9A to 9D are views showing the alignment state of liquid crystal molecules with respect to an alignment regulating structural member or a singular point control portion.
Figure 9C:
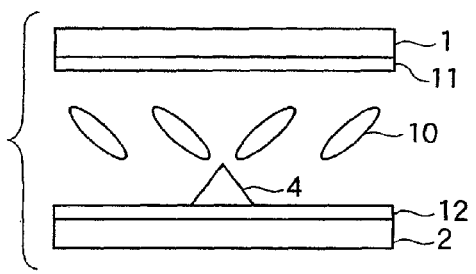
Figure 9B:
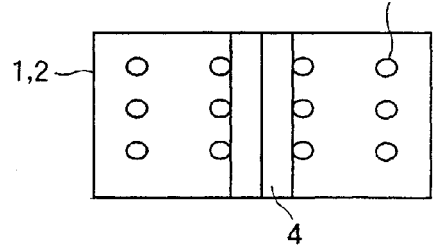
Figure 9D:
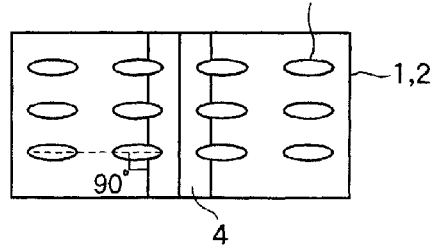

Similarly, in FIGS. 9A to 9D, an alignment regulating structural member 4 of a linear projection is formed on the transparent electrode 12. When a voltage is applied between the electrodes 11 and 12, the liquid crystal molecules 10 in the vicinity of the structural member 4 start to tilt, and the tilt of the liquid crystal molecules 10 spreads over the whole (see FIG. 9C). As shown in FIG. 9D, the orientation of the tilt is substantially orthogonal to the extending direction of the structural member 4.

Figure 10A:
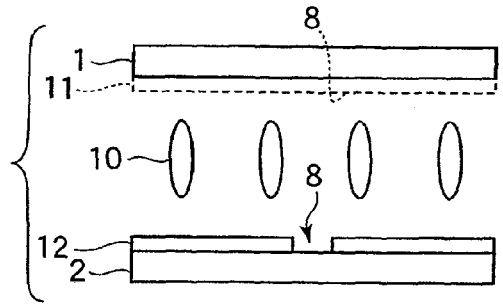
FIGS. 10A to 10D are views showing the alignment state of liquid crystal molecules with respect to an alignment regulating structural member or a singular point control portion.
Figure 10C:
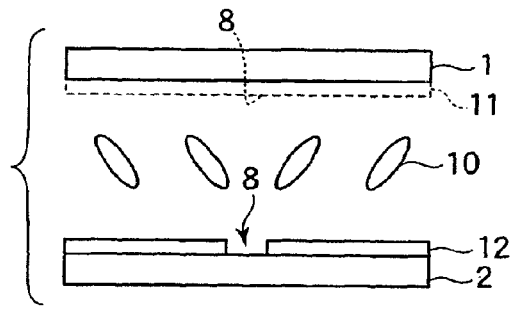
Figure 10B:
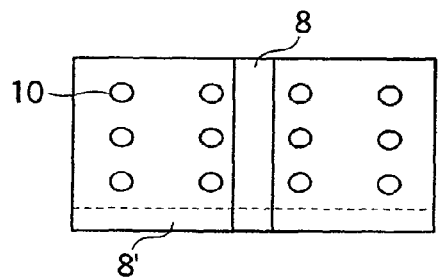
Figure 10D:
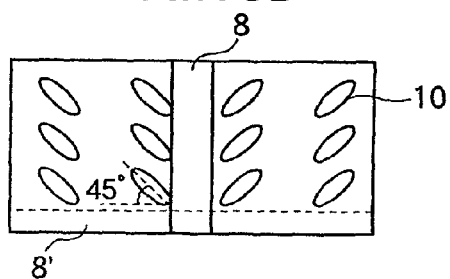

In cruciform projections or slit portions for controlling the alignment disturbance or the minute electrode slit portions, since a distance between the adjacent projections or slit portions is short, tilted liquid crystal molecules collide with each other, and the tilt direction of the liquid crystal molecule is changed. For example, in FIGS. 10A to 10D, a slit portion 8 is formed on the transparent electrode 12. A slit portion 8' orthogonal to the slit portion 8 is formed on the transparent electrode 11. When a voltage is applied between the electrodes 11 and 12, the liquid crystal molecules 10 in the vicinity of the slit portions 8 and 8' start to tilt, and the tilt of the liquid crystal molecules 10 spreads over the whole (see FIG. 10C). As shown in FIG. 10D, the orientation of the tilt of the liquid crystal molecules 10 becomes a direction of 45° with respect to the extending directions of the slit portions 8 and 8'. Since a time is required for the change of the tilt direction, the response time becomes extremely slow.

Figure 11A:
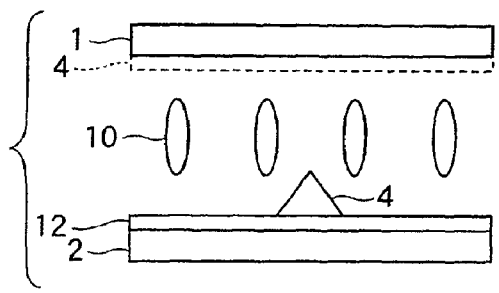
FIGS. 11A to 11D are views showing the alignment state of liquid crystal molecules with respect to an alignment regulating structural member or a singular point control portion.
Figure 11C:
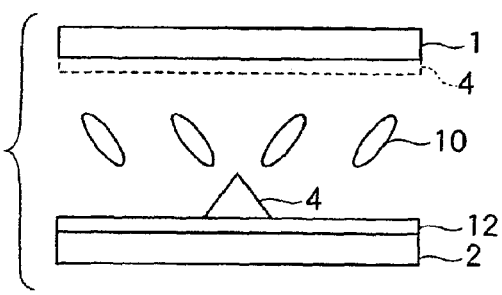
Figure 11B:
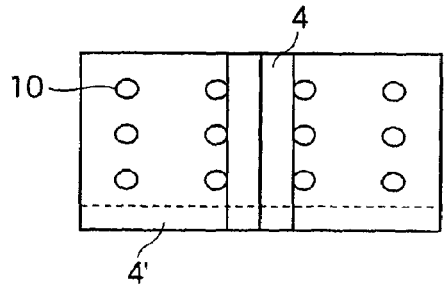
Figure 11D:
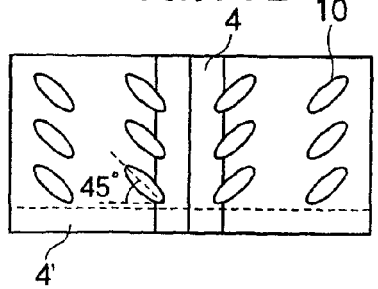

Similarly, in FIGS. 11A to 11D, a structural member 4 of a linear projection is formed on the transparent electrode 12. A structural member 4' of a linear projection orthogonal to the structural member 4 is formed on the transparent electrode 11. When a voltage is applied between the electrodes 11 and 12, the liquid crystal molecules 10 in the vicinity of the slit portions 8 and 8' start to tilt, and the tilt of the liquid crystal molecules 10 spreads over the whole (see FIG. 11C). As shown in FIG. 11D, the orientation of the tilt of the liquid crystal molecules 10 becomes a direction of 45° with respect to the extending directions of the structural members 4 and 4'. Since a time is required for the change of this tilt direction, the response time becomes extremely slow.

Figure 12A:
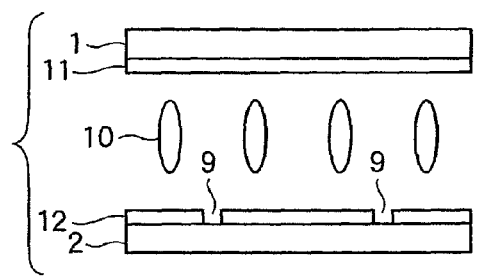
FIGS. 12A to 12D are views showing the alignment state of liquid crystal molecules with respect to an alignment regulating structural member or a singular point control portion.
Figure 12C:
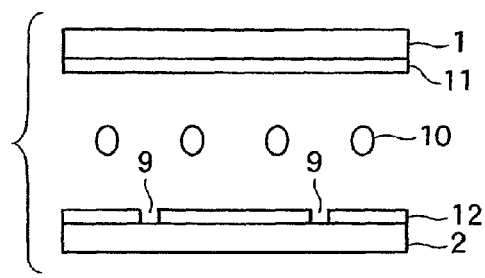
Figure 12B:
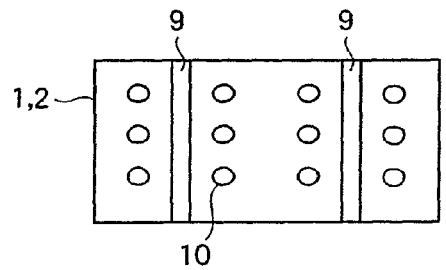
Figure 12D:
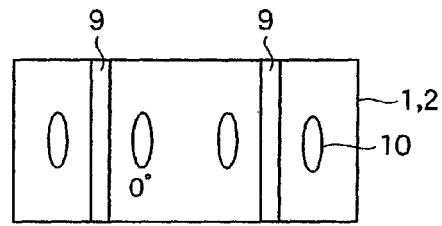

In FIGS. 12A to 12D, minute slit portions 9 are formed on the transparent electrode 12. When a voltage is applied between the electrodes 11 and 12, the liquid crystal molecules 10 in the vicinity of the slit portion 9 start to tilt, and the tilt of the liquid crystal molecules 10 spreads over the whole. As shown in FIGS. 12C and 12D, the orientation of the tilt becomes parallel to the extending direction of the slit portions 9. Since a time is required for the change of the tilt direction, the response time becomes extremely slow.

Figure 13A:
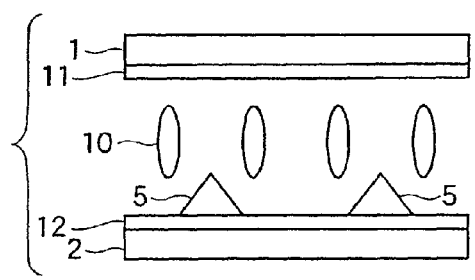
FIGS. 13A to 13D are views showing the alignment state of liquid crystal molecules with respect to an alignment regulating structural member or a singular point control portion.
Figure 13C:
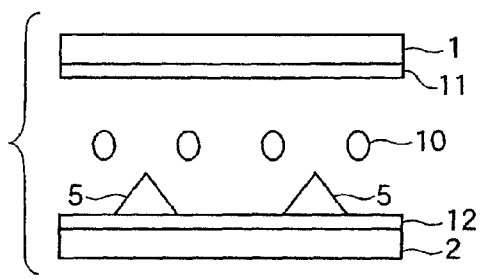
Figure 13B:
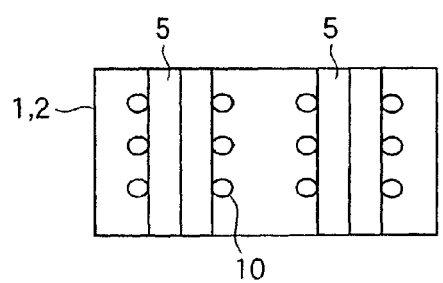
Figure 13D:
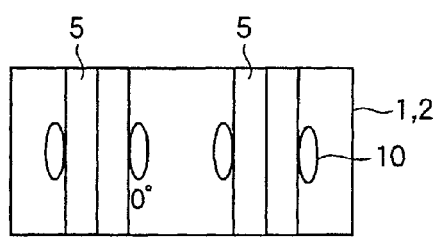

Similarly, in FIGS. 13A to 13D, alignment control factors 5 of minute linear projections are formed in the transparent electrode 12. When a voltage is applied between the electrodes 11 and 12, the liquid crystal molecules 10 in the vicinity of the alignment control factors 5 start to tilt, and the tilt of the liquid crystal molecules 10 spreads over the whole (see FIG. 13C). As shown in FIG. 13D, the orientation of the tilt becomes parallel to the extending direction of the alignment control factors 5. Since a time is required for the change of the tilt direction, the response time becomes extremely slow.

Besides, there is a case where the minute slit portions 9 or the alignment control factors 5 directed toward two different directions are provided in each pixel in order to realize a wide viewing angle. In this case, since a time is required for the liquid crystal molecules to be stably aligned at the boundaries of regions of the minute slit portions 9 or the alignment control factors 5 having different directions, the response time becomes extremely slow.

Against the above problems, in this embodiment, a photo-curing or thermosetting component is mixed in a liquid crystal composition and is injected into a liquid crystal panel, and light or heat is applied under application of a definite voltage, so that a three-dimensional construction is formed of the cured material of the photo-curing or thermosetting component in the liquid crystal.

In the MVA-LCD, except for the vicinity of the projection or electrode slit portion, the liquid crystal molecules are aligned vertically. Accordingly, at the instant when the applied voltage is changed, the falling direction of the liquid crystal molecules is not determined, and they can not fall down in any directions. On the other hand, when the projection or the electrode slit portion is provided, at the voltage application, the liquid crystal molecules in the vicinity start to tilt in the direction perpendicular to the extending direction of the projection or the electrode slit portion, and the tilt is successively propagated to the adjacent liquid crystal molecule to tilt the liquid crystal molecules in the domain in the same direction.

FIGS. 14A and 14B show a state in which a liquid crystal panel including a cruciform projection structural member 4 formed on one substrate 1 is viewed in the direction of a normal of a substrate surface. FIG. 14A shows a state of the liquid crystal molecules 10 after voltage application immediately. Although liquid crystal molecules 10 in the vicinity of the structural member 4 start to tilt (hereinafter, called a propagation process) in the direction orthogonal to the extending direction of the structural member 4, since the tilt of the liquid crystal molecules 10 is propagated from two directions different from each other by 90°, eventually, as shown in FIG. 14B, the liquid crystal molecules are tilted (hereinafter, called a re-tilting process) in the direction of 45° with respect to the extending direction of the structural member 4. Since a time is required for the change of this tilt direction, the response time becomes extremely slow.

As described above with reference to FIGS. 8A to 14B, since all the liquid crystal molecules 10 do not respond to the application of electric field to the liquid crystal with the minimum movement toward the final orientation, the response speed becomes slow. Then, the liquid crystal molecules 10 are previously slanted in the direction of an alignment after voltage application to such a degree that the contrast is not lowered. By this, the propagation process and the re-tilting process are eliminated, and all the liquid crystal molecules 10 are moved to the final alignment after the voltage application, so that the response time can be made short.

Incidentally, in order to obtain a sufficient contrast, it is desirable that this tilt angle is 85° or higher when measured from the surfaces of the substrates 1 and 2.

As a method of previously tilting the liquid crystal molecules 10, a photo-curing or thermosetting monomer is added to liquid crystal, and a cured material is formed by polymerization of the monomer. A photo-curing or thermosetting liquid crystal of 0.1 wt % (weight percent) to 3 wt % or a non-liquid crystal resin component is previously mixed in the liquid crystal, and is injected into a liquid crystal panel, and light or heat is applied to the liquid crystal panel while a definite voltage is applied, so that the resin component is cured. Since the liquid crystal molecules 10 in the vicinity of the liquid crystal resin memorize the state where the voltage is applied, the response time can be improved as described above.

In the case of the minute electrode slit portions 9, although the propagation process hardly exists, at the boundaries of the slit portions 9 directed toward the different directions, the liquid crystal molecules 10 immediately after the voltage application can be tilted in two directions, so that the alignment of liquid crystal is disturbed. Although they are finally fixed in one direction, this re-arrangement prolongs the response time. If the liquid crystal molecules 10 are previously tilted in the direction of the final state of the liquid crystal alignment by the photo-curing or thermosetting liquid crystal resin, the alignment disturbance of the liquid crystal molecules 10 immediately after the voltage application is prevented and the response can be improved.

Hereinafter, specific examples will be described.

Example 2-1

An XGA liquid crystal panel of a size of 15 inches in diagonal was made on an experimental basis. FIG. 15 shows a state in which three pixels of the liquid crystal panel are viewed in the direction of a normal of a substrate surface. For example, a not-shown TFT and a transparent electrode (pixel electrode) 7 are formed at a side of a substrate 1, and lattice-like projection structural members 4 arranged at a predetermined pitch are formed on the pixel electrode 7. A light shielding film 13, a not-shown color filter, and an opposite electrode are formed on the side of an opposite substrate 2. Besides, lattice-like projection structural members 6 having the same pitch as the lattice projection structural members 4 and shifted by a half pitch from the lattice projection structural members 4 are formed on the opposite electrode.

Vertical alignment film material X is used for a not-shown alignment film. The structural members 4 and 6 are formed of resist LC-200 of Shipley Co., Ltd. As liquid crystal, liquid crystal acrylate monomer UCL-001 of Dainippon Ink Co., Ltd. was added into liquid crystal material A having a negative dielectric anisotropy, and after injection, ultraviolet rays were irradiated while a voltage was applied.

Figure 16:
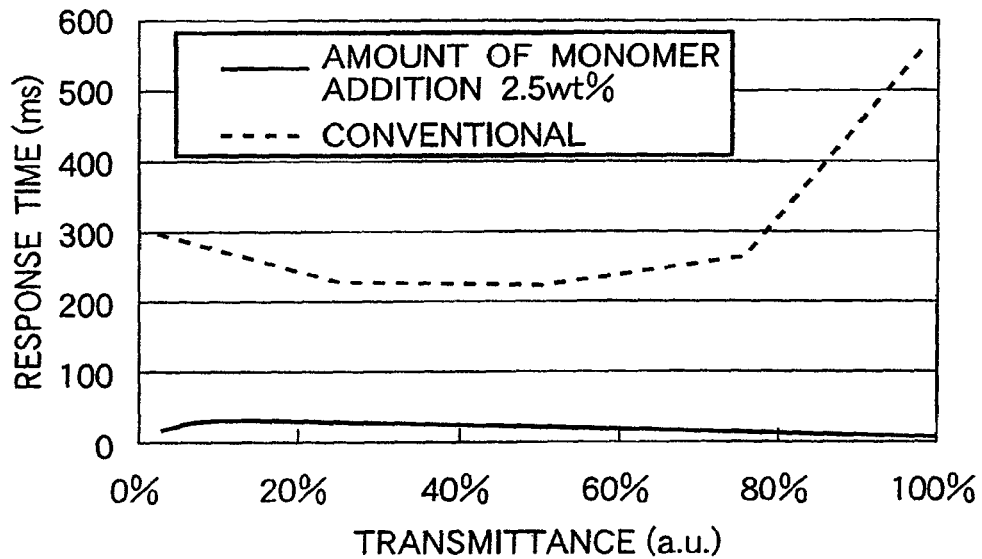
FIG. 16 is a graph for comparing the liquid crystal panel of the example 2-1 in the second embodiment of the present invention with a liquid crystal panel of a comparative example.

On the other hand, as a comparative example, a liquid crystal panel in which a photo-curing or thermosetting component was not added into liquid crystal was made on an experimental basis. FIG. 16 is a graph in which the liquid crystal panel of this example and the liquid crystal panel of the comparative example are compared with each other. The horizontal axis indicates the transmittance, and the vertical axis indicates the response time (ms). A solid line in the drawing indicates the liquid crystal panel of this example, and a broken line indicates the liquid crystal panel of the comparative example. As is apparent from FIG. 16, according to this example, a short response time is obtained in the range of all transmittance, and the response characteristics have been remarkably improved.

Example 2-2

Figure 17:
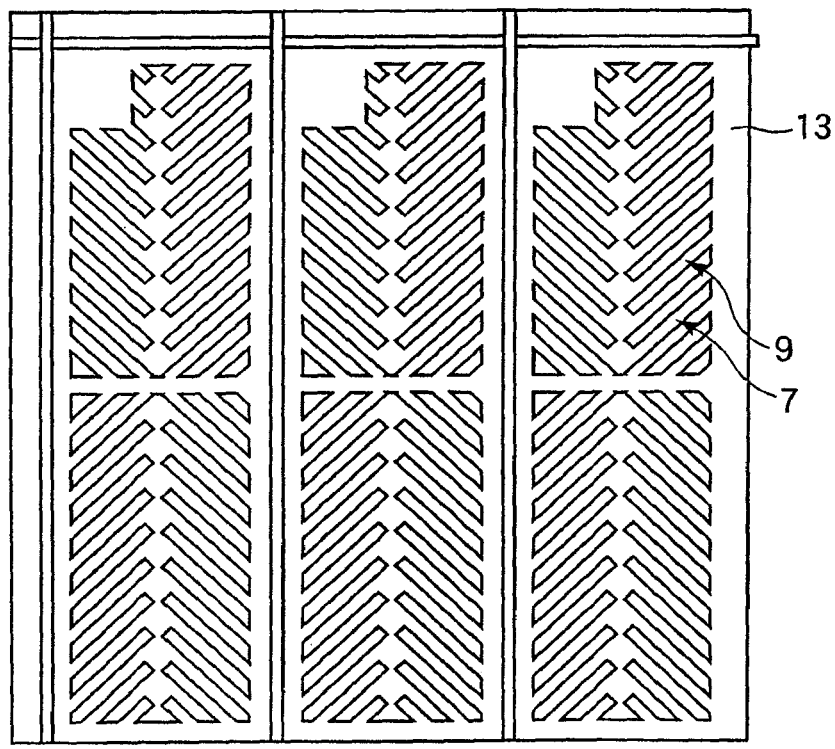
FIG. 17 is a view showing a state in which a liquid crystal panel according to example 2-2 of the second embodiment of the present invention is viewed in the direction of a normal of a substrate surface.

An XGA liquid crystal panel of a size of 15 inches in diagonal was made on an experimental basis. FIG. 17 shows a state in which three pixels of the liquid crystal panel are viewed in the direction of a normal of a substrate surface. For example, a not-shown TFT and a transparent electrode (pixel electrode) 7 are formed at the side of a substrate 1, and minute slit portions 9 as shown in the drawing are formed on the pixel electrode 7. A light shielding film 13, a not-shown color filter and an opposite electrode are formed at the side of an opposite substrate 2.

Vertical alignment film material X was used for not-shown alignment films. As liquid crystal, liquid crystal acrylate monomer UCL-001 of Dainippon Ink Co., Ltd. was added into liquid crystal material A having a negative dielectric anisotropy, and after injection, ultraviolet rays were irradiated while a voltage was applied.

Figure 18:
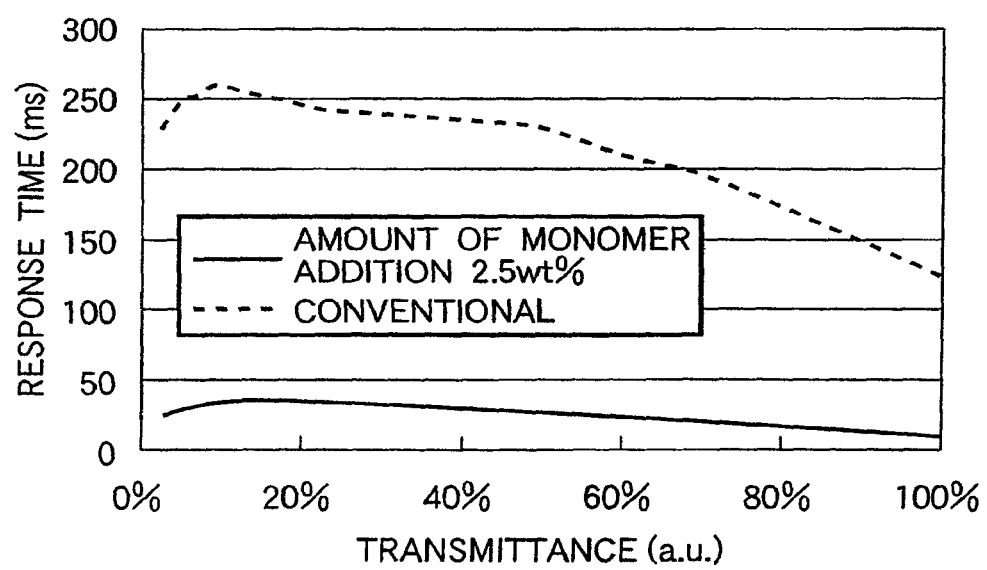
FIG. 18 is a graph for comparing the liquid crystal panel of the example 2-2 in the second embodiment of the present invention with a liquid crystal panel of a comparative example.

On the other hand, as a comparative example, a liquid crystal panel in which a photo-curing or thermosetting component was not added into liquid crystal was made on an experimental basis. FIG. 18 is a graph in which the liquid crystal panel of this example and the liquid crystal panel of the comparative example are compared with each other. The horizontal axis indicates the transmittance, and the vertical axis indicates the response time (ms). A solid line in the drawing indicates the liquid crystal panel of this example, and a broken line indicates the liquid crystal panel of the comparative example. As is apparent from FIG. 18, according to this example, a short response time is obtained in the range of all transmittance, and the response characteristics have been remarkably improved.

Third Embodiment

A liquid crystal display according to a third embodiment of the present invention will be described with reference to FIGS. 19 to 22. In order to improve the drop in the light transmittance caused by the alignment disturbance of liquid crystal molecules in the vicinity of the projection structural members of the MVA-LCD already described in the prior art, and the low response speed caused by the slowness of the regulation of the tilt direction of liquid crystal molecules propagated from the projection structural members at the time of voltage application, the method has been described in the first and second embodiments in which the polymer structure is formed in the liquid crystal and is solidified in the state of voltage application to previously regulate the tilt direction of the liquid crystal, so that the alignment disturbance is prevented and speed-up is realized.

In order to prevent the alignment disturbance and to realize the high-speed response by the methods according to the first and second embodiments, it is necessary to decrease the tilt angle (an average pre-tilt angle; an average value of pre-tilt angles of liquid crystal molecules arranged in the direction of a normal of a substrate; incidentally, the pre-tilt angle is an angle measured toward the normal of the substrate from the substrate surface) of liquid crystal molecules after solidification. However, if the average pre-tilt angle is decreased, the black luminance is raised even at the time of no voltage application, and the high contrast, which is one of the greatest features of the MVA-LCD, can not be realized.

Then, in this embodiment, at the time of formation of the polymer structure by the cured material, masking is performed on the liquid crystal panel, so that only the necessary portion is partially made a low pre-tilt region of a small pre-tilt angle and is solidified, and the remaining region is made to remain vertically aligned.

When only a portion where the alignment disturbance occurs, a portion on the projection structural member, or a portion on a bus line electrode is solidified in the state of voltage application, the alignment disturbance of the liquid crystal can be prevented, and the propagation of the tilt direction of the liquid crystal molecules can be made smooth. Besides, since the ratio of the low pre-tilt region to the whole area of the cell is small, and almost all the regions are formed in the light shielding region, the drop in the contrast does not occur.

If the low pre-tilt regions are formed at constant intervals, the alignment regulating force by the region is propagated to the remaining high pre-tilt region as well, and the movement of the liquid crystal molecules of the high pre-tilt region at the time of voltage application can also be made smooth. By this, the prevention of the alignment disturbance of the liquid crystal and the speed-up of the response speed can be realized while the high contrast is held.

Hereinafter, specific examples will be described.

Figure 19:
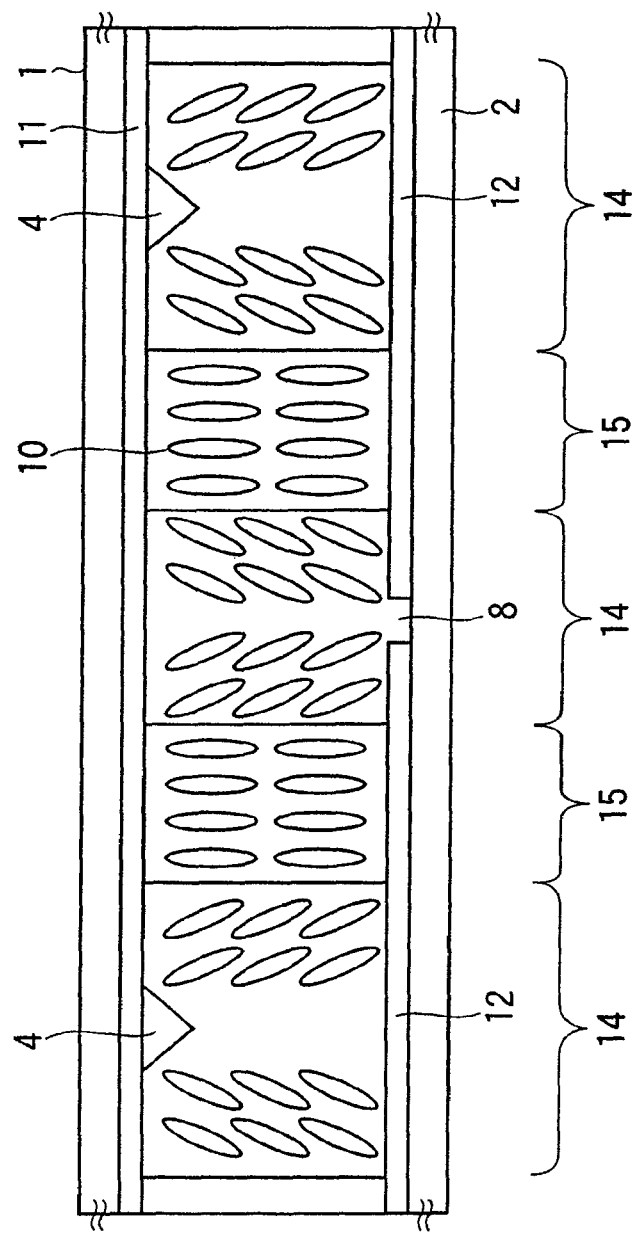
FIG. 19 is a sectional view showing the construction of a liquid crystal panel according to a third embodiment of the present invention.

FIG. 19 is a sectional view showing the liquid crystal panel construction according to this embodiment. Transparent electrodes 11 and 12 are formed on opposite surfaces of opposite substrates 1 and 2 having a predetermined cell gap and arranged opposite to each other. A liquid crystal is sealed between the transparent electrodes 11 and 12. A plurality of slit portions 8 (only one is shown in the drawing) are formed on the transparent electrode 12 at a predetermined pitch. A plurality of alignment regulating structural members 4 of linear projections are formed on the transparent electrode 11 at the same pitch as the slit portion 8 and are shifted from the slit portions 8 by a half pitch.

The vicinities of the alignment regulating structural members 4 and the slit portions 8 become low pre-tilt regions 14 by the formation of the polymer structure with cured material, and the remaining regions become high pre-tilt regions 15 in which liquid crystal molecules 10 keep the substantially vertical alignment. As stated above, if the liquid crystal molecules 10 are slightly tilted in the low pre-tilt regions 14 even at the time of no voltage application, since the tilt direction of the liquid crystal molecules 10 immediately after the voltage application is previously determined, the propagation of the tilt is fast, and the alignment disturbance of the liquid crystal molecules does not occur.

Figure 20A:
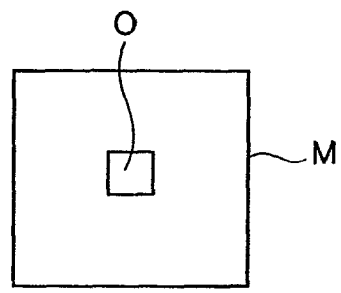
FIGS. 20A to 20D are views for explaining a manufacturing method of the liquid crystal panel according to the third embodiment of the present invention.
Figure 20B:
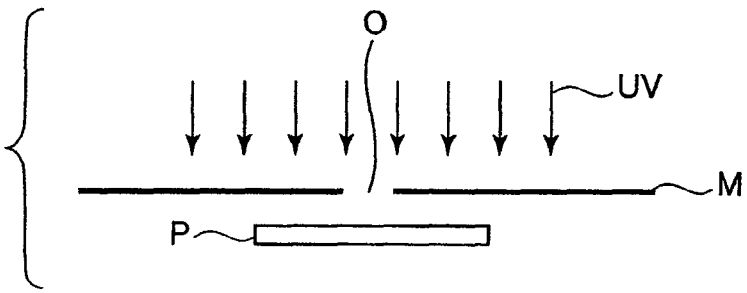

Next, a manufacturing method of the low pre-tilt regions 14 and the high pre-tilt regions 15 in the liquid crystal panel construction shown in FIG. 19 will be described by use of FIGS. 20A to 20D. FIG. 20A shows a partial plane of a mask M used when ultraviolet light (UV light) is irradiated to a liquid crystal panel. An opening O is provided at a predetermined position of the mask M. FIG. 20B shows a state in which UV light is irradiated to a liquid crystal panel P by using the mask M.

In the liquid crystal panel P, as a photo-curing resin, liquid crystal acrylate monomer UCL-001 of 1 wt % of Dainippon Ink Co., Ltd. is added into the host liquid crystal. A voltage of, for example, 6 V was applied between electrodes at both sides of the liquid crystal of the liquid crystal panel P, and UV irradiation was carried out through the positioned mask M. UV light is irradiated to a predetermined position of the liquid crystal panel P through the opening O of the mask M. By this, the low pre-tilt region 14 is formed at the predetermined position.

Figure 20C:
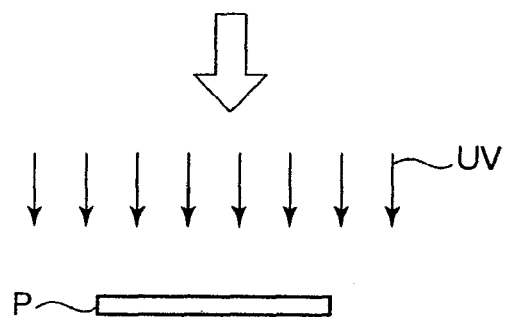
Figure 20D:
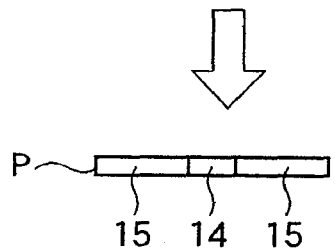

Next, after the electrodes at both the sides of the liquid crystal are short-circuited, as shown in FIG. 20C, UV irradiation is carried out to the whole surface. By this, as shown in FIG. 20D, the high pre-tilt regions 15 are formed at positions other than the low pre-tilt region 14.

Figure 21:
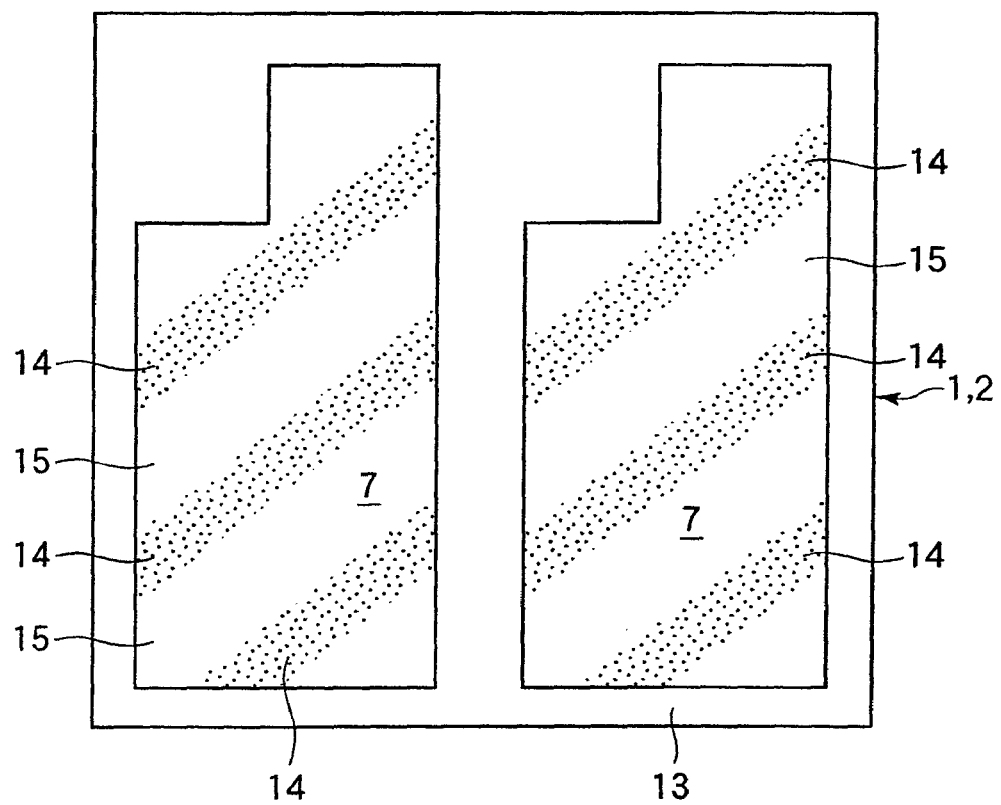
FIG. 21 is a view showing another example of the construction of the liquid crystal panel according to the third embodiment of the present invention and a state in which two adjacent liquid crystal cells are viewed against a substrate surface.

FIG. 21 shows another example of the liquid crystal panel construction according to this embodiment, and shows a state in which two adjacent liquid crystal cells are viewed against a substrate surface. For example, a not-shown TFT and a pixel electrode 7 are formed at a side of a substrate 1. A light shielding film 13, a not-shown color filter and an opposite electrode are formed at a side of an opposite substrate 2. A liquid crystal containing a photo-curing resin is sealed between the substrates 1 and 2.

In a not-shown photomask M used when a photo-curing material is solidified by UV light, an opening O is formed into a stripe shape. By irradiating the liquid crystal cell with UV using this mask M, as shown in FIG. 21, low pre-tilt regions 14 each having a relatively thin width and extending obliquely with respect to the end side of the pixel electrode 7 are formed. High pre-tilt regions 15 are formed between the low pre-tilt regions 14.

The liquid crystal molecule of the high pre-tilt region 15 has a pre-tilt angle of 89°. The liquid crystal molecule of the low pre-tilt region 14 has a pre-tilt angle of 85° by UV irradiation in a state in which a voltage of 5 V is applied to the liquid crystal. By adopting this construction, if a voltage is applied between the pixel electrode 7 and the not-shown opposite electrode, since the liquid crystal molecules of the high pre-tilt region 15 are smoothly moved in the direction previously regulated in the low pre-tilt region 14, a high speed operation becomes possible, and the alignment disturbance of the liquid crystal due to the irregularities of the structural members in the pixel, horizontal electric field and the like are reduced. Incidentally, it is desirable that the average pre-tilt angle in the high pre-tilt region 15 is 88° or higher, and it is desirable that the average pre-tilt angle in the low pre-tilt region 14 is from 45° to 88°.

In the conventional MVA-LCD, in the gradation change from black to a dark halftone, the amount of change of applied voltage is low, and the change of electric field in the liquid crystal is small, so that the propagation speed of the tilt of the liquid crystal molecules becomes low. According to this embodiment, it is expected that the effect of improving the drop of the propagation speed can also be obtained. Since the threshold voltage is lowered in the low pre-tilt regions 14, the pre-tilt regions 14 first respond at the time of low voltage application. Since the area rate of the low pre-tilt regions 14 is low, even if the low pre-tilt regions 14 become bright to some degree, the whole luminance remains low. That is, although the whole has a low luminance state, the low pre-tilt regions 14 make a high-speed response, and have a high luminance to some degree. As stated above, since the response of the low pre-tilt regions 14 becomes the response of the whole cell, the high-speed response can be made even at a low gradation. Incidentally, it is desirable that the area of the high pre-tilt regions 15 having the average pre-tilt angle of 88° or higher is 20% or more of the whole cell.

Figure 22:
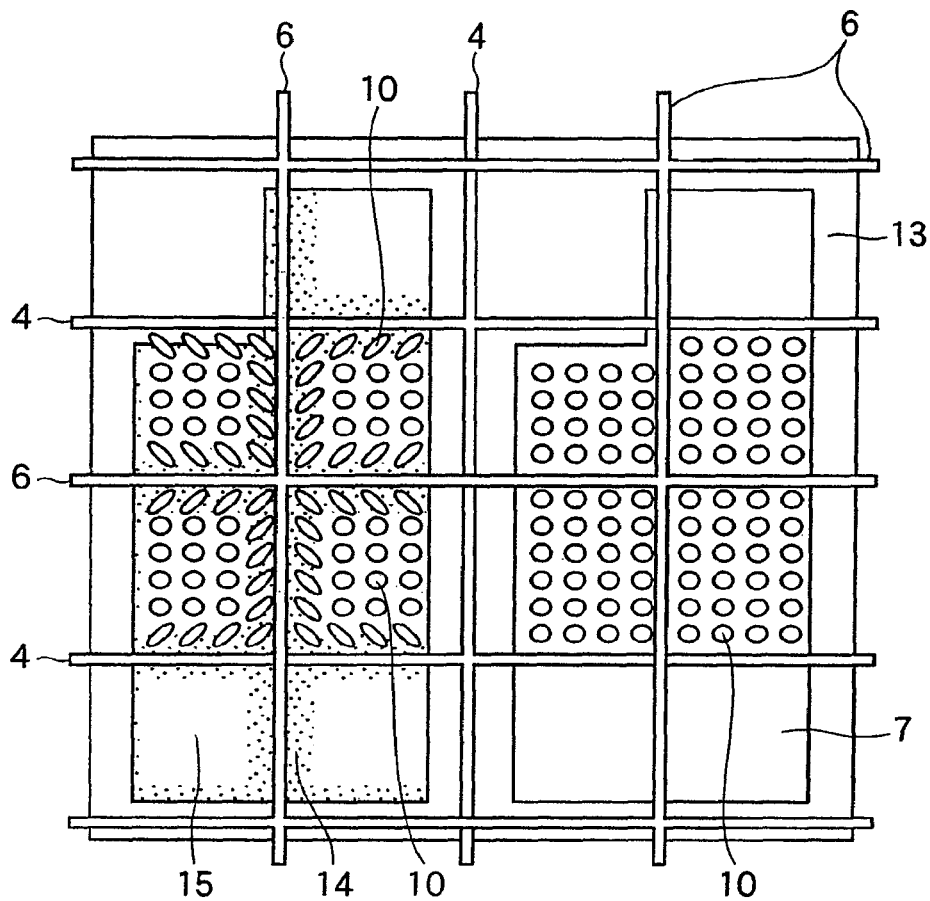
FIG. 22 is a view showing still another example of the construction of the liquid crystal panel according to the third embodiment of the present invention and a comparative example, and a state in which two pixels of the liquid crystal panel are viewed in the direction of a normal of a substrate surface.

FIG. 22 shows still another example and a comparative example of the liquid crystal panel construction according to this embodiment, and shows a state in which two pixels of a liquid crystal panel are viewed in the direction of a normal of a substrate surface. For example, a not-shown TFT and a pixel electrode 7 are formed at a side of a substrate 1, and lattice-like projection structural members 4 arranged at a predetermined pitch are formed on the pixel electrode 7. A light shielding film 13, a not-shown color filter and an opposite electrode are formed at a side of an opposite substrate 2. Besides, lattice-like projection structural members 6 having the same pitch as the lattice-like projection structural members 4 and shifted by a half pitch from the lattice-like projection structural members 4 are formed on the opposite electrode.

For comparison, a cell of this embodiment was fabricated at the left side in the drawing, and a cell of a conventional construction was fabricated at the right side. First, in the cell of the conventional construction at the right side, liquid crystal molecules are vertically aligned at the time of no voltage application. In the state of voltage application, the liquid crystal molecules are urged to be aligned vertically to the projection walls of the lattice projection structural members 4, and are soon changed in the direction of 45° with respect to the lattice. Thus, the construction having the lattice-like projection structural members 4 and 6 has a very slow response speed, and the alignment disturbance of the liquid crystal is apt to occur.

On the other hand, the cell at the left side improves the problem, and low pre-tilt regions 14 are formed around the lattice-like projection structural members 4 and 6. That is, the low pre-tilt region 14 is formed at the surrounding portion of each of regions surrounded by the lattice-like projection structural members 4 and 6, and surrounds a high pre-tilt region 15. Then, liquid crystal molecules 10 of the low pre-tilt region are aligned and tilted at an orientation of 45° with respect to the extending direction of the lattice. By this, at the time of voltage application, since the liquid crystal molecules 10 of the whole surface are smoothly tilted in the direction of 45°, a high-speed response becomes possible, and the alignment disturbance of the liquid crystal molecules is prevented. Besides, since the liquid crystal molecules 10 tilted at the time of no voltage application are only those in the vicinity of the lattice-like projection structural members 4 and 6, the drop in the contrast is also greatly reduced.

Not only the low pre-tilt regions 14 are formed to be divided like a stripe shape or a lattice shape as described above, but also they may be formed so that a high pre-tilt region (for example, an average pre-tilt angle is 88° or higher) is dotted with low pre-tilt regions.

Besides, the low pre-tilt regions 14 may be naturally formed to be restricted to the structural members 4 and 6, such as the linear projections or projection lattices, and their vicinities, or to the slit portions 8 and 9 and their vicinities.

Besides, although not shown, the low pre-tilt regions 14 may be naturally formed on a gate bus line, a data bus line, or an auxiliary capacitance bus line formed on the liquid crystal panel.

Besides, the photomask M is divided into a plurality of regions having a plurality of transmission coefficients, and by performing mask exposure for a predetermined time in a state where a predetermined voltage is applied to the whole surface of the liquid crystal panel P, a plurality of regions having a plurality of average pre-tilt angles may be naturally obtained at the same time.

Besides, it is desirable that the concentration of the photo-curing monomer contained in the liquid crystal composition is 0.3 wt % to 3 wt %.

Fourth Embodiment

Next, a liquid crystal display according to a fourth embodiment of the present invention will be described with reference to FIGS. 23 to 34. In the MVA-LCD, by the existence of the alignment regulating structural members for realizing alignment division, when a voltage is applied to the liquid crystal cell, a plurality of unidirectional alignment regions (domains) are formed. Since the liquid crystal orientation is different in every domain, a continuous transition in the liquid crystal direction occurs at the boundary portion (domain wall). In the case where there is a transition (in-plane transition) in which the liquid crystal orientation is rotated in the substrate in-plane direction, in a minute region coincident with a polarization axis of one of polarizing plates arranged at upper and lower substrates in the relation of crossed Nicols, since incident light is not subjected to birefringence, it becomes a dark display. Besides, in the in-plane transition, since the liquid crystal orientation in the domain and the liquid crystal orientation of the domain wall are different from each other, a deviation (hereinafter called a $\phi$ deviation in this embodiment) from an ideal orientation occurs in the liquid crystal orientation in the domain, and the loss of transmittance occurs.

Figure 23:
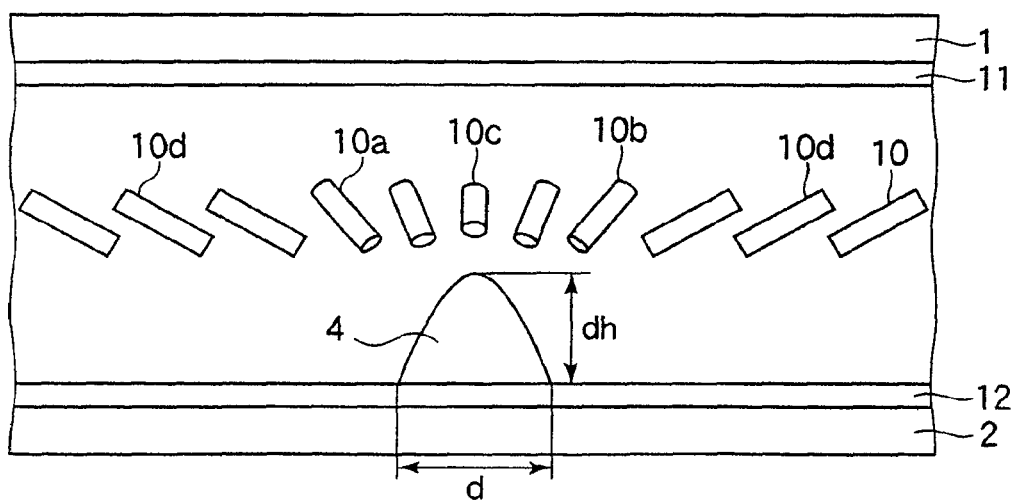
FIG. 23 is a view for explaining a problem to be solved by a fourth embodiment of the present invention.

FIG. 23 shows a schematic sectional construction of a conventional MVA-LCD. FIG. 23 shows a state in which electrodes 11 and 12 are formed on opposite surfaces of opposite substrates 1 and 2, and a liquid crystal layer made of a large number of liquid crystal molecules 10 is formed between the electrodes 11 and 12. Two polarizing plates (not shown) are arranged in crossed Nicols at the outside of each of the substrates 1 and 2. As an alignment regulating structural member, a linear projection 4 having, for example, a width d=10 μm and a height dh=1.2 μm is formed on the substrate 12.

According to this construction, although two domains in which the liquid crystal orientations are different from each other by 180° are formed at both sides of the linear projection 4, as shown in the drawing, the in-plane transition occurs at the domain wall, and there are liquid crystal molecules 10a and 10b each having an orientation angle (angle of a major axis of a liquid crystal molecule when viewed against a substrate surface) of 45°. The extending direction of the linear projection 4 (in the drawing, the vertical direction to the paper plane) is made a standard, and in the case where polarizing plates are arranged at the orientation of 45° in crossed Nicols, since birefringence does not occur in the vicinities of the liquid crystal molecules 10a and 10b, a dark display is produced, and two dark lines are generally produced at both sides of the linear projection 4 in the extending direction. Besides, the orientation angle of a liquid crystal molecule 10d in the domain is different from the orientation angle of a liquid crystal molecule 10c of the domain wall by 90°, the $\phi$ deviation occurs in the whole domain and the transmission loss occurs. As stated above, in the conventional structural member, the two dark lines and the drop in the transmittance due to the existence of the $\phi$ deviation are great factors to prevent the realization of high luminance.

With respect to the response speed, the MVA-LCD has excellent characteristics. However, there is only one problem that the response of a halftone is slow. Since the region for regulating the alignment direction is only on the alignment regulating structural member, the propagation of the liquid crystal tilt occurs over the whole domain. The propagation speed depends on the magnitude of the gradient of an electric field generated on the alignment regulating structural member. Thus, at a halftone, since the electric field gradient on the alignment regulating object is gentle, the propagation speed is low, and eventually, the response speed becomes slow.

Besides, the $\phi$ deviation in the domain has an influence on the response speed as well. By the liquid crystal molecules (for example, the liquid crystal molecules 10c to 10a or 10c to 10b of FIG. 23) tilted in the extending direction of the alignment regulating structural member of the domain wall, the deviation occurs in the orientation angle of the liquid crystal molecules 10 of the domain. In the response process, at the point when all the liquid crystal molecules 10 are tilted, since a domain having an arbitrary deviation is produced and is mixed, there occurs a process in which a stable domain group is formed. As a result, in addition to a time in which all the liquid crystal molecules 10 are tilted, it becomes necessary to take a time in which the inside of the domain is fixed, so that the response becomes slow. Especially, the response from full black to full white accompanying an abrupt change tends to generate a temporary φ deviation.

Figure 24:
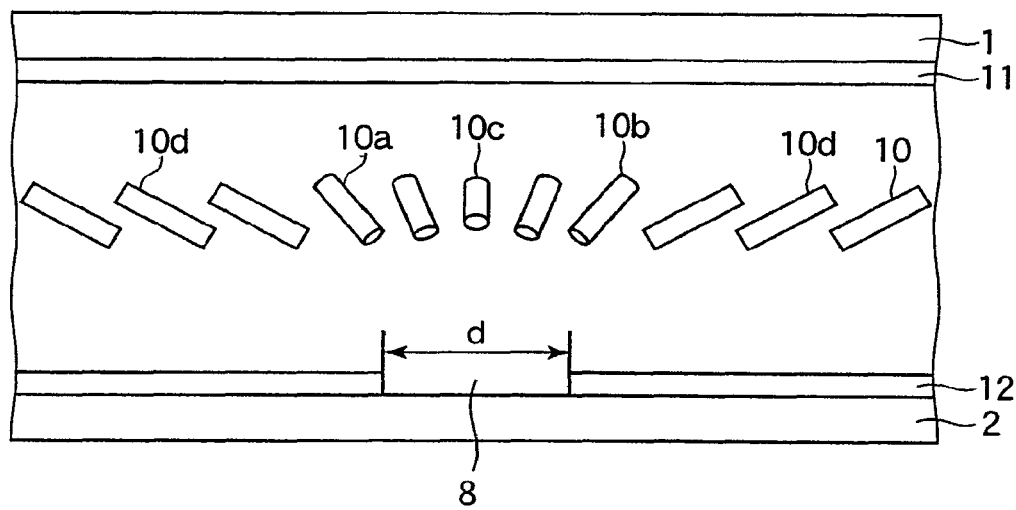
FIG. 24 is a view for explaining a problem to be solved by the fourth embodiment of the present invention.

FIG. 24 shows another example of the sectional construction of the conventional MVA-LCD. The construction is the same as the construction shown in FIG. 23 except that instead of the linear projection 4 formed on the electrode 12 shown in FIG. 23, a slit portion 8 formed by removing a electrode material of an electrode 12 is provided as an alignment regulating structural member. The slit portion 8 functions similarly to the linear structural member 4, and the MVA-LCD shown in FIG. 24 also has a problem that two dark lines and a φ deviation are produced similarly to the foregoing.

In this embodiment, by using an alignment regulating structural member which is effective in narrowing of the dark lines and in lowering or avoidance of the φ deviation, and makes an electric field gradient by an alignment regulating structural member steeper, the high luminance and high speed response of an MVA-LCD are realized.

Hereinafter, specific examples will be described.

Example 4-1

FIGS. 25 to 30 show examples of this embodiment.

Figure 25:
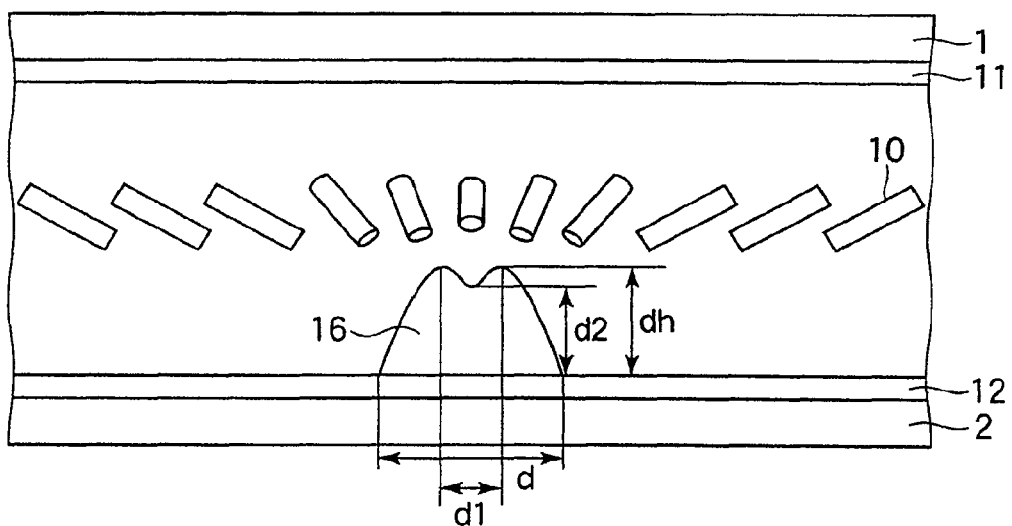
FIG. 25 is a view showing a liquid crystal display according to example 4-1 of the fourth embodiment of the present invention.

An MVA-LCD shown in FIG. 25 is the same as the construction shown in FIG. 23 except that an alignment regulating structural member is made a linear projection 16 instead of the linear projection 4. The linear projection 16 has a plurality of minute irregular portions in the vicinity of the apex in the extending direction. The sectional shape of the linear projection 16 is a two-peak shape in which the upper center of a bank shape having a width d=10 μm and a height dh=2 μm is recessed. The distance d1 between two peaks is d1=3 μm, and the height d2 from the lower portion to the valley portion of the two peaks is d2=1 μm.

Figure 26:
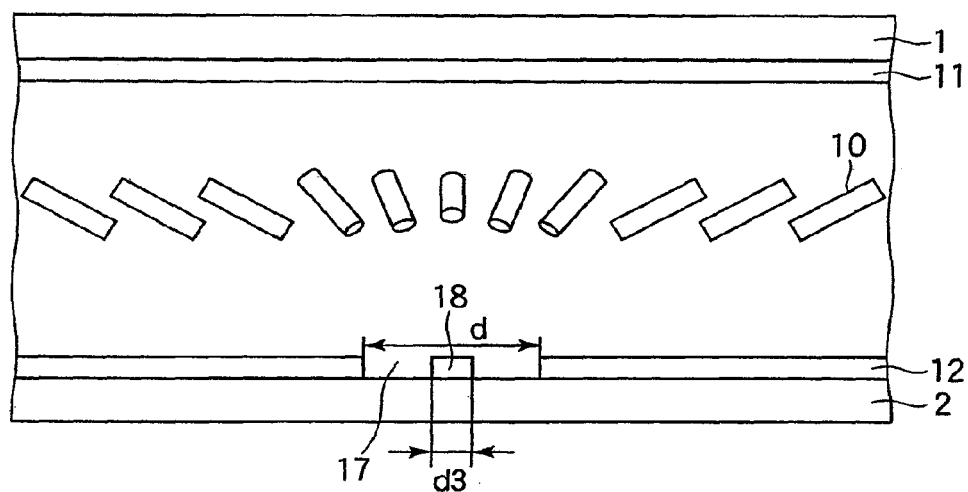
FIG. 26 is a view showing the liquid crystal display according to the example 4-1 of the fourth embodiment of the present invention.

An MVA-LCD shown in FIG. 26 has the same construction as that shown in FIG. 24 except that an alignment regulating structural member is made a slit portion 17 instead of the slit portion 8. The slit portion 17 includes a fine stripe-like electrode 18 along the extending direction. The stripe-like electrode 18 is formed to have a width d3=2.5 μm at the center of the slit portion having a width d=10 μm.

The linear projections 16 were formed at a pitch of 70 μm on the electrode 12 of the substrate 2, and a not-shown alignment film was formed to a thickness of 0.05 μm on the whole surface. On the other hand, the slit portions 17 having the strip electrodes 18 were formed at a pitch of 70 μm on the electrode 11 of the substrate 1, and a not-shown alignment film was formed to a thickness of 0.05 μm on the whole surface.

Next, after the upper and lower substrates 1 and 2 were bonded so that the linear projections 16 and the slit portions 17 were arranged to be alternately shifted from each other by a half pitch, liquid crystal was injected, so that an MVA cell having a cell gap of 4.0 μm was prepared. The positive resist (S1808; made by Shipley Far East Co., Ltd.), vertical alignment film material X, and liquid crystal material A having a negative dielectric anisotropy were used for the linear projection 16, the alignment film, and the liquid crystal molecule 10, respectively.

As a comparative example, an MVA cell was prepared in which the linear projections 4 shown in FIG. 23 were formed at a predetermined pitch at the side of the substrate 1, and the slit portions 8 shown in FIG. 24 were formed at the side of the substrate 2 to be shifted from the linear projections 4 by a half pitch. The conventional MVA cell is fabricated under the same conditions as the MVA cell of this example except for the sectional shapes of the linear projection and the slit portion.

Figure 27:
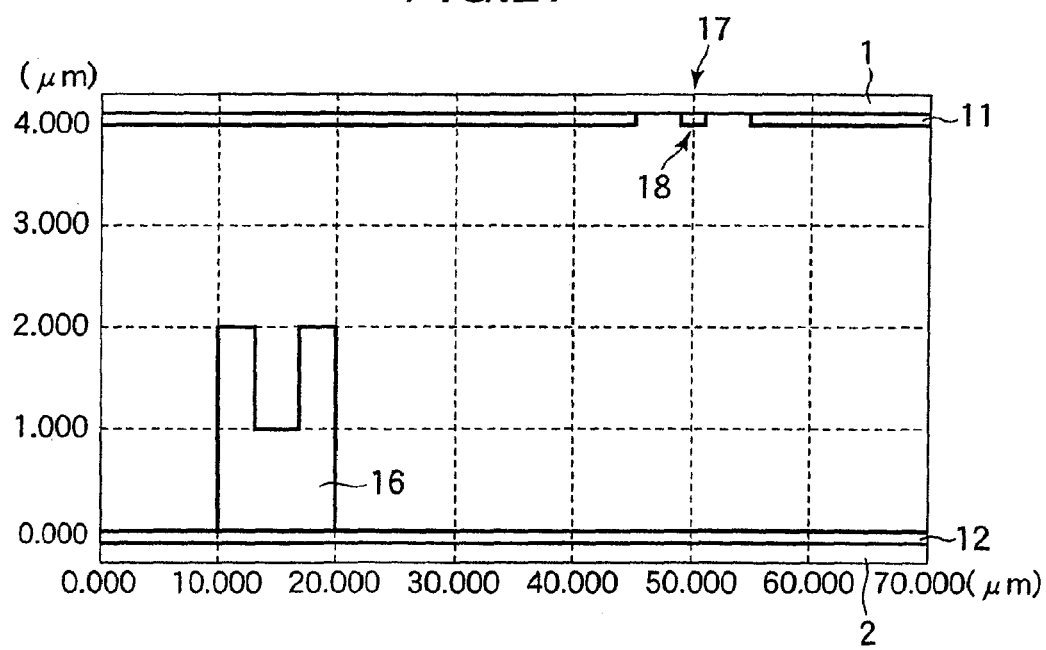
FIG. 27 is a view schematically showing a section of an MVA cell according to the example 4-1 of the fourth embodiment of the present invention.
Figure 28:
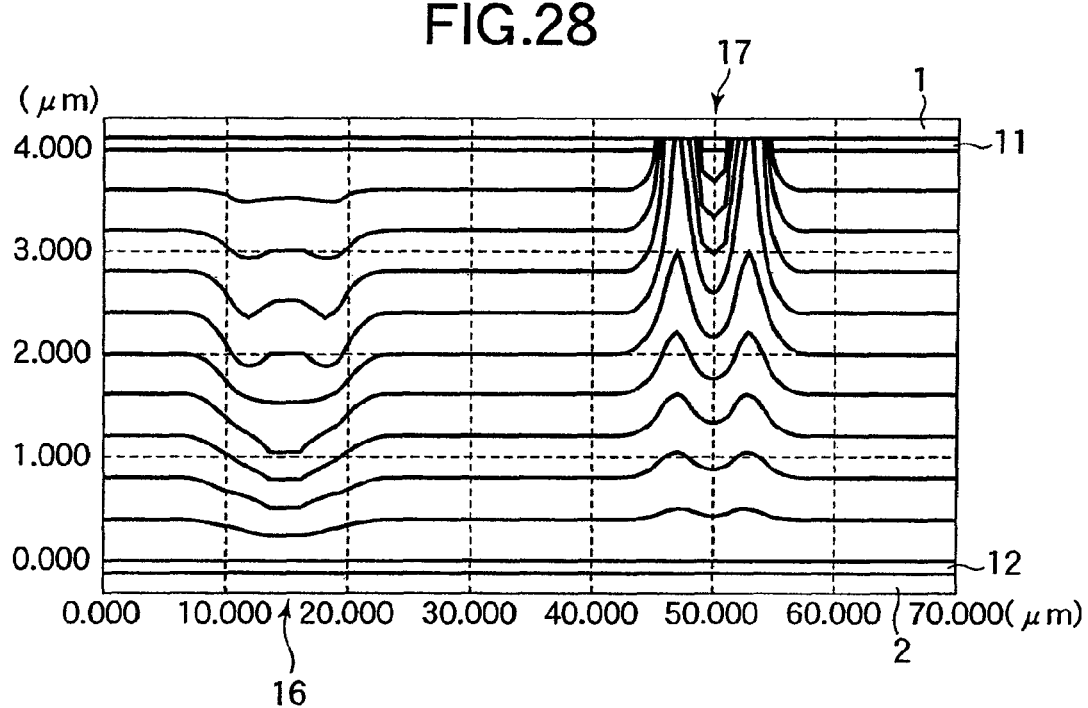
FIG. 28 is a view schematically showing the section of the MVA cell according to the example 4-1 of the fourth embodiment of the present invention.

FIGS. 27 and 28 schematically show a section of the MVA cell according to this example. In the drawings, the illustration of the upper and lower substrates are omitted. The linear projection 16 is arranged on the electrode 12 at the left side of FIG. 27, and the slit portion 17 is arranged at the right side. FIG. 28 shows a voltage distribution with equi-potential lines obtained when a predetermined voltage is applied between both the electrodes 11 and 12 in the construction of FIG. 27. As is apparent from the drawing, the equi-potential line over the upper portion of the linear projection 16 is changed so that it has the maximum value at the center and the minimum values at the right and left thereof. Similarly, the equi-potential line below the lower portion of the slit portion 17 is changed so that it has the minimum value at the center and the maximum values at both sides thereof. That is, in the extending direction, at the top portion of the linear projection 16 in which the plurality of minute irregular portions in the vertical direction are provided in the vicinity of the apex, and at the top portion of the slit portion 17, the minute domains are locally formed adjacently to both domains at both sides of the domain wall.

Figure 29:
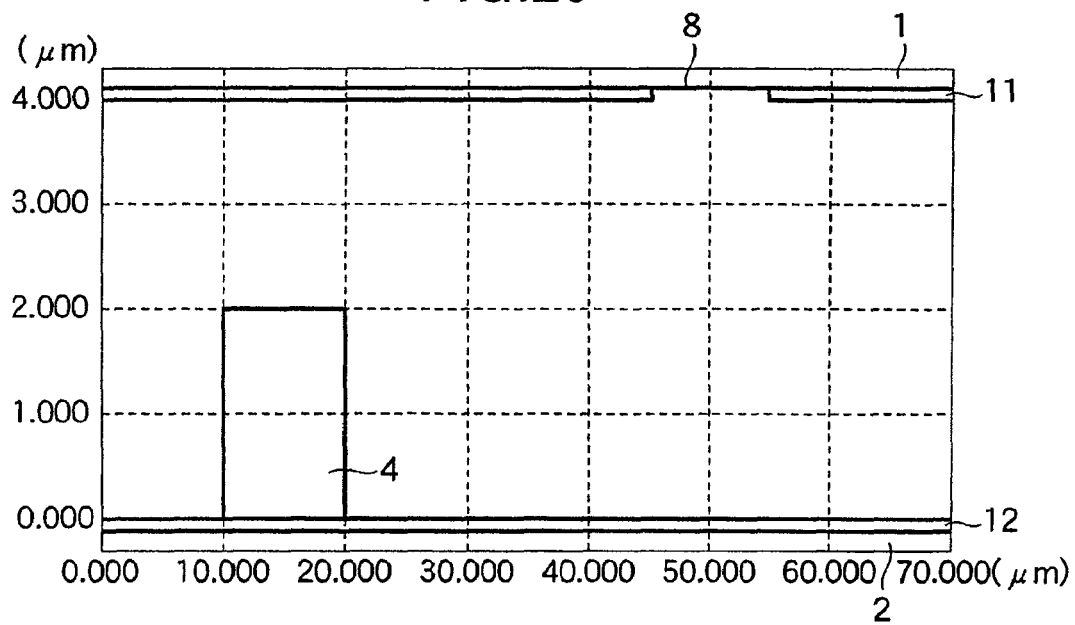
FIG. 29 is a view schematically showing a section of a MVA cell according to a comparative example of the example 4-1 of the fourth embodiment of the present invention.
Figure 30:
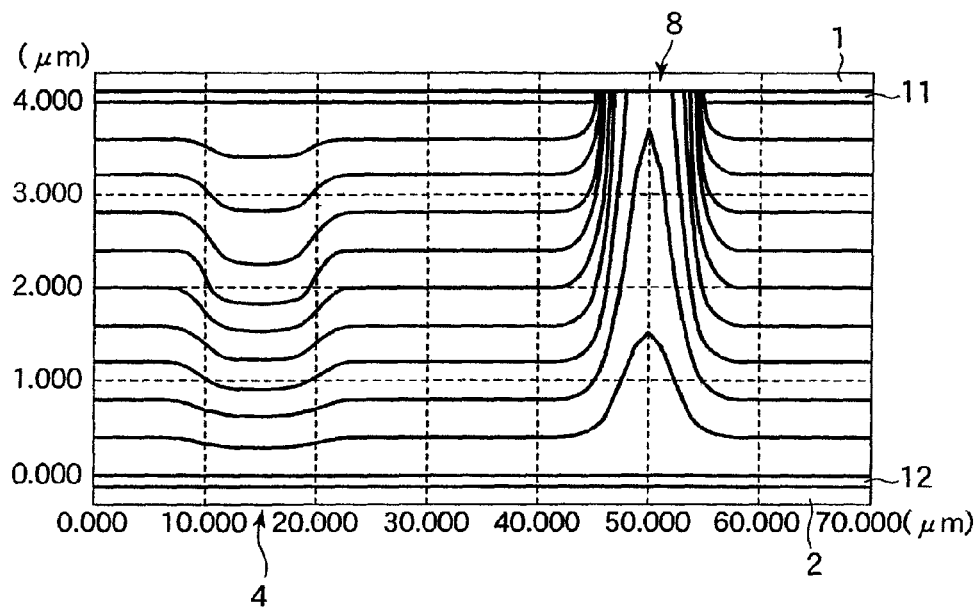
FIG. 30 is a view schematically showing the section of the MVA cell according to the comparative example of the example 4-1 of the fourth embodiment of the present invention.

On the other hand, FIGS. 29 and 30 schematically show a section of the MVA cell according to the comparative example. The constructions of the drawings are respectively the same as those of FIGS. 27 and 28. The linear projection 4 is arranged on the electrode 12 at the left side of FIG. 29, and the slit portion 8 is arranged at the right side. FIG. 30 shows a voltage distribution with equi-potential lines obtained when a predetermined voltage is applied between both the electrodes 11 and 12 in the construction of FIG. 29. As is apparent from the drawing, the equi-potential line has only one extreme value at the upper portion of the linear projection 4 or the lower portion of the slit portion 8. As stated above, since the equi-potential line at the upper portion of the linear projection 4 or the lower portion of the slit 8 has only one extreme value, there occurs an in-plane transition of 180° as shown in FIGS. 23 and 24.

On the other hand, according to this embodiment, by the irregular portion of the top of the linear projection 16 or the stripe electrode 18 of the slit portion 17, the plurality of minute domains are locally formed on the linear projection 16 or the slit portion 17. The minute domains function to tilt the liquid crystal molecules on the linear projection 16 or the slit portion 17 in the extending direction. Accordingly, according to the construction of this embodiment, the liquid crystal molecules on the linear projection 16 or the slit portion 17 are tilted in the extending direction by alignment regulating force higher than the prior art. By this, the conventional in-plane transition of 180° is divided into two liquid crystal orientation angle transitions of 90°, and an angle difference in the liquid crystal orientation angle between the adjacent domains becomes small. As a result, the transition length of the domain wall becomes short, and narrowing of the dark lines is realized.

Incidentally, as the number of the irregularities of the upper portion of the linear projection 16 as the alignment regulating structural member or the number of the stripe electrodes 18 of the slit portion 17 becomes large, the alignment regulating force of the minute domains formed between the domains becomes high, and the distortion received by the minute region from the adjacent domain becomes low. As a result, the transition length of the domain wall becomes short as the number of the irregularities of the upper portion of the linear projection 16 or the number of the stripe electrodes 18 of the slit portion 17 becomes large, and narrowing of the dark lines is realized.

Besides, since the stability of the minute domains in which the liquid crystal molecules are tilted in the extending direction of the linear projection 16 or the slit portion 17, becomes high, the temporary φ deviation becomes slight, and more superior response characteristics can be obtained.

According to the MVA cell of this example, it has been confirmed that the transmittance is improved by 10% or more as compared with the conventional MVA cell of the comparative example, and the dark line width is narrowed by 20% or more as compared with the comparative example. Besides, also with respect to the response characteristics, it has been confirmed that the response of the halftone, which is the problem, is faster than the comparative example by 10% or more.

In summary, the construction according to this example includes the pair of substrates 1 and 2 having a predetermined cell gap and arranged opposite to each other, the electrodes 11 and 12 formed on the opposite surfaces of the pair of substrates 1 and 2, as the alignment regulating structural member, at least one of the linear projection 16 provided with the irregular portion formed in the vicinity of the top in the extending direction and arranged on the electrode 11 or 12 and the slit portion 17 formed by removing part of the electrode material of the electrode 11 or 12 and provided with the stripe-like electrode 18 in the extending direction, the vertical alignment films formed between the pair of substrates 1 and 2, and the liquid crystal layer sealed between the vertical alignment films and having the negative dielectric anisotropy.

Example 4-2

Figure 31:
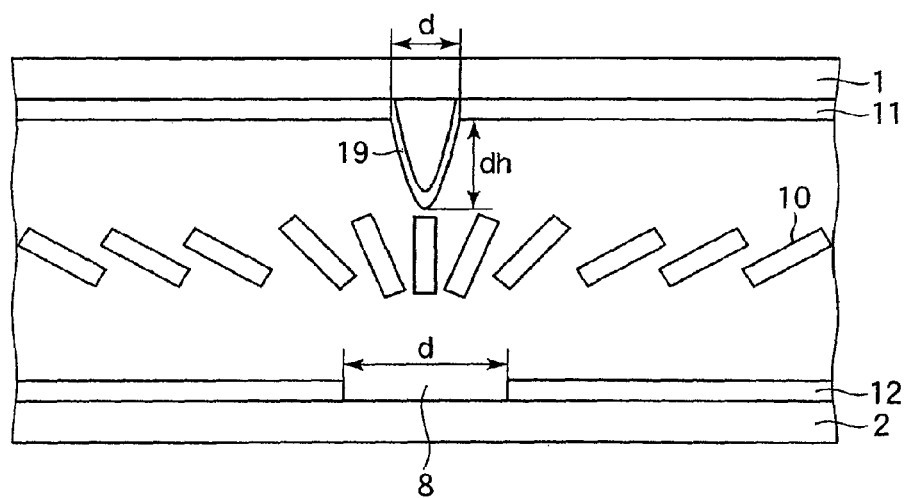
FIG. 31 is a view showing a liquid crystal display according to example 4-2 of the fourth embodiment of the present invention.
Figure 32:
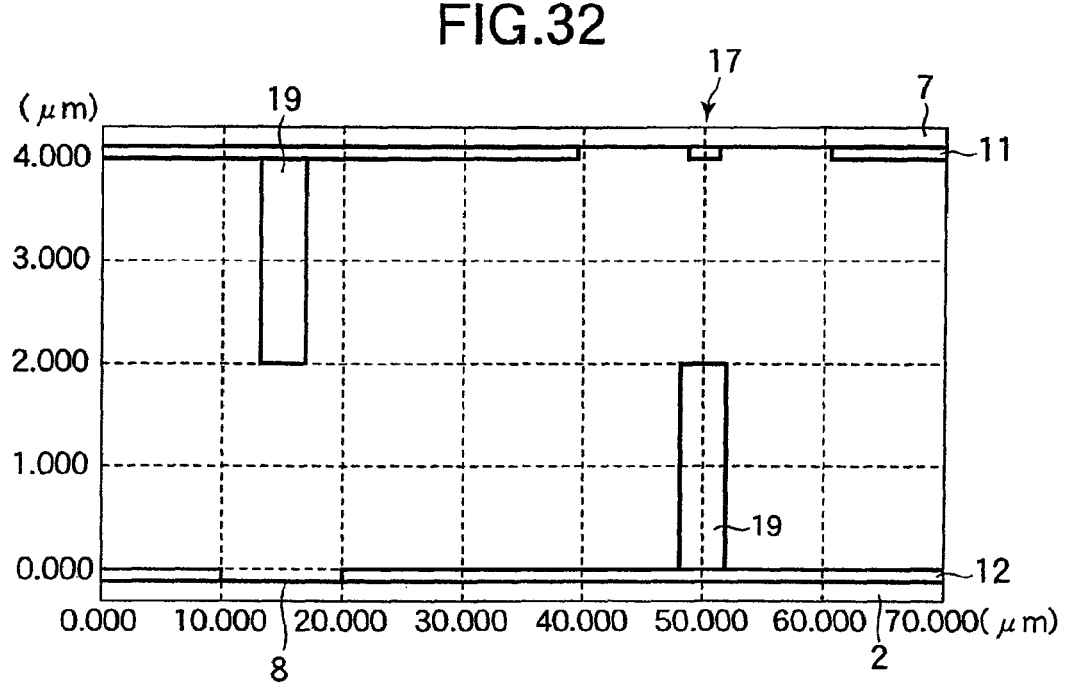
FIG. 32 is a view schematically showing a section of an MVA cell according to the example 4-2 of the fourth embodiment of the present invention.
Figure 33:
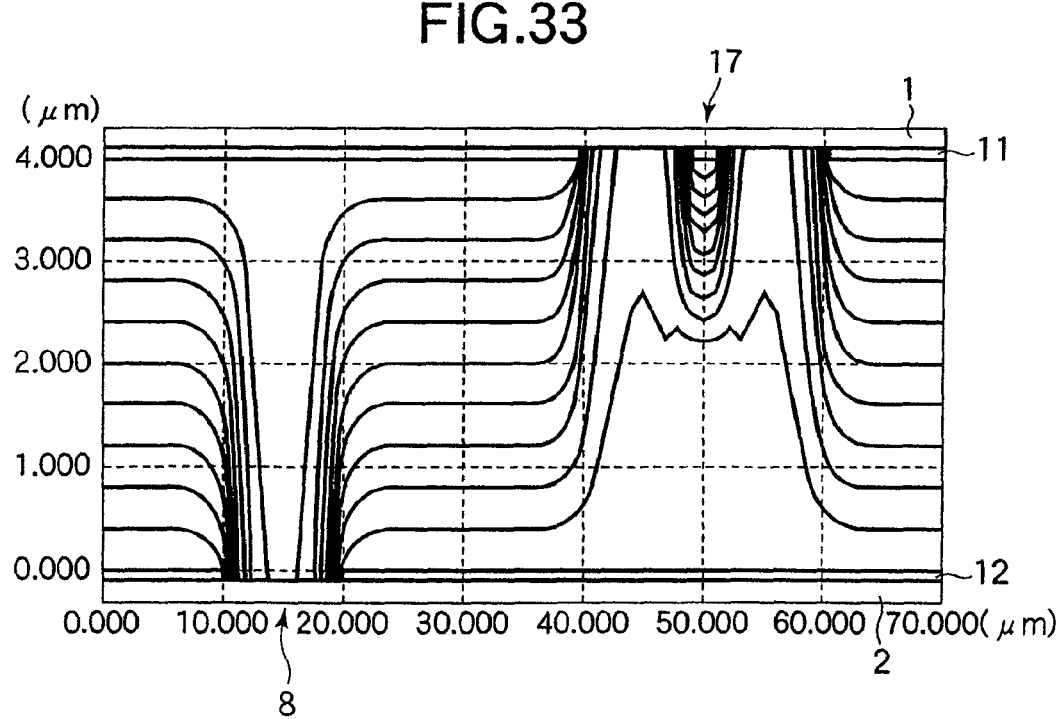
FIG. 33 is a view schematically showing the section of the MVA cell according to the example 4-2 of the fourth embodiment of the present invention.

FIGS. 31 to 33 show an example of this embodiment.

According an MVA-LCD shown in FIG. 31, in the MVA-LCD shown in FIG. 24, a conductive linear projection 19 is formed on the opposite substrate just above the conventional slit portion 8, and an alignment regulating structural member is constructed by the combination of the slit portion 8 and the conductive linear projection 19. The other construction is the same as the MVA-LCD shown in FIG. 24. The sectional shape of the conductive linear projection 19 has a bank shape with one peak having a width d=5 μm and a height dh=2 μm. Both are disposed so that the edge line of the conductive linear projection 19 is positioned at the center of the slit portion 8.

The conductive linear projection 19 is fabricated by forming a linear projection of an insulator having a predetermined width and a height before the electrodes 11 and 12 on the substrates 1 and 2 are formed, by next forming an electrode material on the whole surface, and by patterning it. The conductive linear projections 19 are provided at a pitch of 70 μm on the substrates 1 and 2. Besides, removed regions were formed in the electrodes 11 and 12 at nearly center positions between the adjacent conductive linear projections 19, and the slit portions 8 were arranged. Next, a not-shown alignment film was formed to a thickness of 0.05 μm on the whole surface.

Next, after both the substrates 1 and 2 were bonded to each other so that the conductive linear projection 19 of one of the substrates was opposite to the slit portion 8 of the other substrate, the liquid crystal was injected, and the MVA cell of a cell gap 4.0 μm was prepared. The alignment film and the liquid crystal material are the same as those of the example 4-1. The conductive linear projection 19 was fabricated by forming a transparent conductive film on an insulating structural member formed of a positive resist.

FIGS. 32 and 33 schematically show a section of the MVA cell according to this example. In the drawings, the illustration of the upper and lower substrates 1 and 2 is omitted. The slit portion 8 is arranged on the electrode 12 at the left side of FIG. 32, and the conductive linear projection 19 is formed at the position opposite to that. Since the construction shown at the right side of FIG. 32 is described in a next example, it is not described here. The left side of FIG. 33 shows a voltage distribution with equi-potential lines obtained when a predetermined voltage is applied between both the electrodes 11 and 12 in the construction of FIG. 32. As is apparent from the drawing, in a region linearly connecting the conductive linear projection 19 and the slit portion 8, an electric field generated between the upper and lower substrates becomes weak. Accordingly, even if the voltage is applied between the electrodes 11 and 12, since a sufficient electric field to tilt the liquid crystal molecules is not applied to the liquid crystal molecules existing between the conductive linear projection 19 and the slit portion 8, they are not tilted in the extending direction of the conductive linear projection 19 and the slit portion 8, but remains vertically aligned. By this, the liquid crystal molecules in the vicinity of the domain wall in this example are tilted through the vertical transition in which a polar angle is successively changed in a plane substantially orthogonal to the extending direction of the conductive linear projection 19 and the slit portion 8. That is, the liquid crystal transition of the domain wall becomes such a change that in a state of a constant orientation angle, the polar angle approaches perpendicularity from 0°, and the orientation angle is inverted by 180° through the vertically aligned liquid crystal molecule of the center portion.

As compared with the conventional slit portion construction, the tilt of the electric field generated on the structural member becomes steep, and the liquid crystal molecules on the structural member becomes stable in energy by the vertical transition rather than the in-plane transition. In the vertical transition, in the case where polarizing plates are formed in crossed Nicols in the orientation of 45° with respect to the extending direction of the alignment regulating object, the number of dark lines on the structural member is changed from two to one. This is because there is no region where the orientation of incident light is coincident with the orientation of liquid crystal, and only a region in which the liquid crystal at the center portion becomes vertical and birefringence does not occur, becomes a dark line. Besides, there is no liquid crystal molecule falling down in the extending direction of the linear projection, the liquid crystal orientation of the whole domain becomes the ideal orientation, and the φ deviation does not occur. As a result, the number of dark lines on the domain wall becomes one from two, so that the transmission loss is reduced, the φ deviation is avoided, and the high luminance is realized. Besides, since the gradient of the electric field on the alignment regulating structural member becomes steep by the electrode slit portion and the conductive structural member, the propagation speed of the tilt of the liquid crystal of the domain becomes high, and more excellent response characteristics can be obtained.

According to the MVA cell of this example, it has been confirmed that the transmittance is improved by 20% or more as compared with the conventional MVA cell of the comparative example, and the dark line width is narrowed by 20% or more as compared with the comparative example. It has been confirmed that the φ deviation in the domain is also eliminated, and as compared with the transmittance of only the domain of the comparative example, the transmittance is improved by 10% or more, and it is an almost ideal value. Besides, also with respect to the response characteristics, it has been confirmed that the response at a halftone, which is the problem, becomes faster than the comparative example by 10% or more.

Example 4-3

Figure 34:
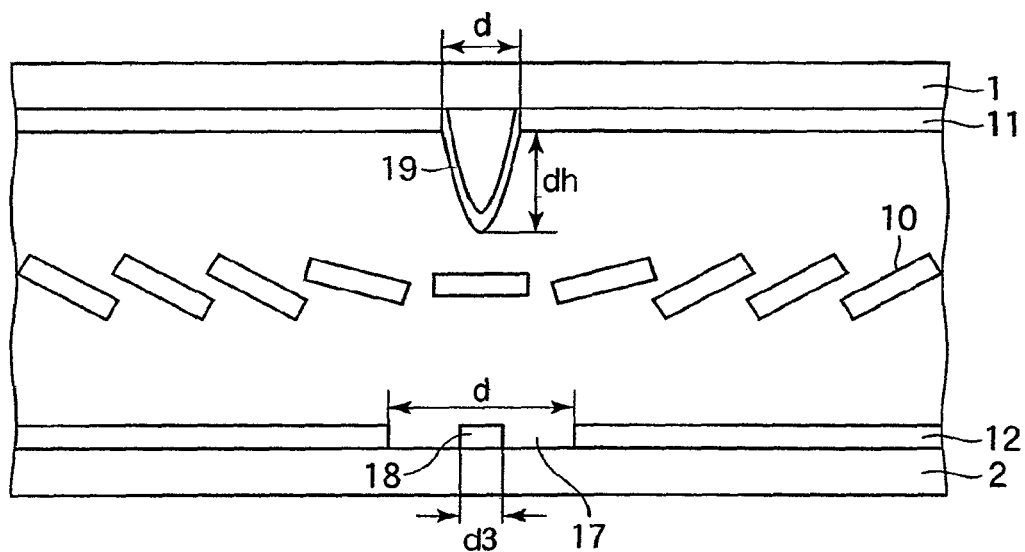
FIG. 34 is a view showing a liquid crystal display according to example 4-3 of the fourth embodiment of the present invention.

FIGS. 32 to 34 show an example of this embodiment.

The MVA-LCD shown in FIG. 34 is the same as the MVA-LCD shown in FIG. 31 except that the slit portion 17 shown in FIG. 26 is provided instead of the slit portion 8 in the MVA-LCD shown in FIG. 31. However, the width d of the slit portion 17 is longer than that shown in FIG. 26, and d=22.5 μm in this example, and the width d3 of the stripe-like electrode of the center portion of the slit portion 17 is d3=2.5 μm.

The right side of FIG. 32 and the right side of FIG. 33 schematically show a section of the MVA cell according to this example. The slit portion 17 is arranged on the electrode 11, and the conductive linear projection 19 is formed at the position opposite to that. The right side of FIG. 33 shows a voltage distribution with equi-potential lines obtained when a predetermined voltage is applied between both the electrodes 11 and 12 in the construction of the right side of FIG. 32. As is apparent from the drawing, since the electric field of the center portion of the domain wall, that is, the electric field of the portion over the alignment regulating structural member is higher than that of domains at both sides, the liquid crystal molecules 10 between the slit portion 17 and the conductive linear projection 19 are tilted more greatly than the liquid crystal molecules in the domain. By the high oblique electric field generated by the edge of the slit portion 17 and the conductive linear projection 19, the tilt direction becomes substantially parallel to the substrate surface in the plane orthogonal to the extending direction of the slit portion 17 and the conductive linear projection 19 as shown in FIG. 34. The liquid crystal transition in the domain wall becomes a change (horizontal transition) in which in a state of a constant orientation angle, the polar angle is gradually tilted, and through the maximum polar angle at the center portion, the orientation angle is inverted by 180°. As compared with the conventional slit portion 8, the tilt of the electric field generated over the conductive linear projection 19 becomes steep, and the liquid crystal molecules 10 over the conductive linear projection 19 become stable in energy by the horizontal transition rather than the in-plane transition. In the horizontal transition, in the case where polarizing plates are arranged in crossed Nicols in the orientation of 45° with respect to the extending direction of the alignment regulating structural member, the number of dark lines over the alignment regulating structural member becomes 0 from two. This is because there is no region where the orientation of incident light is coincident with the orientation of the liquid crystal, and the liquid crystal molecules 10 vertically aligned at the center portion do not exist, and accordingly, there is no region which is not subjected to birefringence. Besides, since the liquid crystal molecules 10 which fall down in the extending direction of the alignment regulating structural member do not exist, the liquid crystal orientation of the whole domain becomes ideal, and the φ deviation does not occur. As a result, the number of dark lines on the domain wall becomes zero from two, the transmission loss is reduced, the φ deviation is avoided, and the high luminance is realized.

Besides, the alignment regulating structural member by the combination of the slit portion 17 and the conductive linear projection 19 has a function of improving the response characteristics. Since the liquid crystal molecules 10 of the domain wall center portion receive an electric field higher than that in the domain, they are tilted more greatly than the liquid crystal molecules 10 of the domain. That is, a series of liquid crystal alignment transitions at the domain wall have, as shown in FIG. 34, an alignment distortion like a spray. Accordingly, even at a halftone, since the gradient of the electric field to the liquid crystal molecules becomes steep by the domain wall for regulating the propagation speed of the tilt of the liquid crystal, more excellent response characteristics can be obtained. Besides, by setting the applied voltage at the time of black display to be a voltage lower than a predetermined threshold value, not 0 V, and by previously tilting the liquid crystal molecules 10 at the domain wall portion, the liquid crystal molecules at the domain wall portion receive the electric field in an oblique direction, so that the response characteristics can be improved more remarkably.

Since the dark line does not exist in the MVA cell of this example, the transmittance is improved by 30% or more as compared with the conventional MVA cell of the comparative example. The φ deviation in the domain is also eliminated, and as compared with the transmittance of the domain of the comparative example, it has been confirmed that the transmittance is improved by 10% or more and becomes an almost ideal value. Also with respect to the response characteristics, it has been confirmed that the response of a halftone, which is the problem, is not larger than half of the comparative example.

The functions, operations and effects according to the above examples are shown in Table 1 while they are compared with the conventional example.

TABLE 1

|  | Conventional Example | Example 4-1 | Example 4-2 | Example 4-3 |
|---|---|---|---|---|
| Liquid crystal transition | in-plane transition | in-plane transition | vertical transition | horizontal transition |
| Transmittance | 1 | 1.1 | 1.2 | 1.3 |
| Transmittance of only domain | 1 | 1 | 1.1 | 1.1 |
| φ deviation of domain | present | present | not present | not present |
| Width of dark line | 1 | 0.8 | 0.8 | 0 |
| Response speed | 1 | 0.9 | 0.9 | 0.5 |

As described above, according to this embodiment, by using the alignment regulating structural member effective in the narrowing of the dark line, and the reduction or avoidance of the φ deviation, the high luminance of the MVA-LCD can be realized, and the response characteristics can be improved.

Fifth Embodiment

Next, a liquid crystal display according to a fifth embodiment of the present invention will be described with reference to FIGS. 35 to 37. This embodiment is an improvement of the liquid crystal display of the example 4-3 of the fourth embodiment described with reference to FIG. 34.

There is a case where the liquid crystal display of the example 4-3 having the construction for realizing the horizontal transition can not obtain a sufficient effect in a low voltage region near the threshold voltage. Since the liquid crystal molecules 10 on the domain wall can not be given the directionality tilted more greatly than the liquid crystal molecules 10 in the domain at the threshold voltage or lower, they become unstable. Besides, even if the voltage is the threshold voltage or higher, in the case where the liquid crystal molecules 10 in the domain are hardly tilted, they become unstable similarly. In the unstable state, there arises a problem that a possibility that the $\phi$ deviation occurs becomes high, and a sufficient improvement effect cannot be obtained in the response characteristics.

Besides, the construction shown in FIG. 34 has also a defect that a manufacturing margin is very narrow. When a position deviation of the alignment regulating structural members (the slit portion 17 and the conductive linear projection 19) respectively formed on the upper and lower substrates occurs by a bonding deviation at the time of bonding the upper and lower substrates 1 and 2, the balance between adjacent domains is lost, and a deviation from the ideal horizontal transition occurs. Especially, there arises a problem that the $\phi$ deviation becomes apt to occur, and the effect of high transmittance cannot be sufficiently obtained. Besides, when the magnitude of the $\phi$ deviation becomes different between adjacent domains by the bonding deviation, there arises a problem that a display blur occurs, or desired response characteristics cannot be obtained.

In this embodiment, by using an alignment regulating structural member in which a bonding deviation is hard to produce and a stable horizontal transition can be realized even in a low voltage region, a high luminance and a high speed response are realized without narrowing a manufacturing margin.

Hereinafter, specific examples will be described.

Example 5-1

Figure 35:
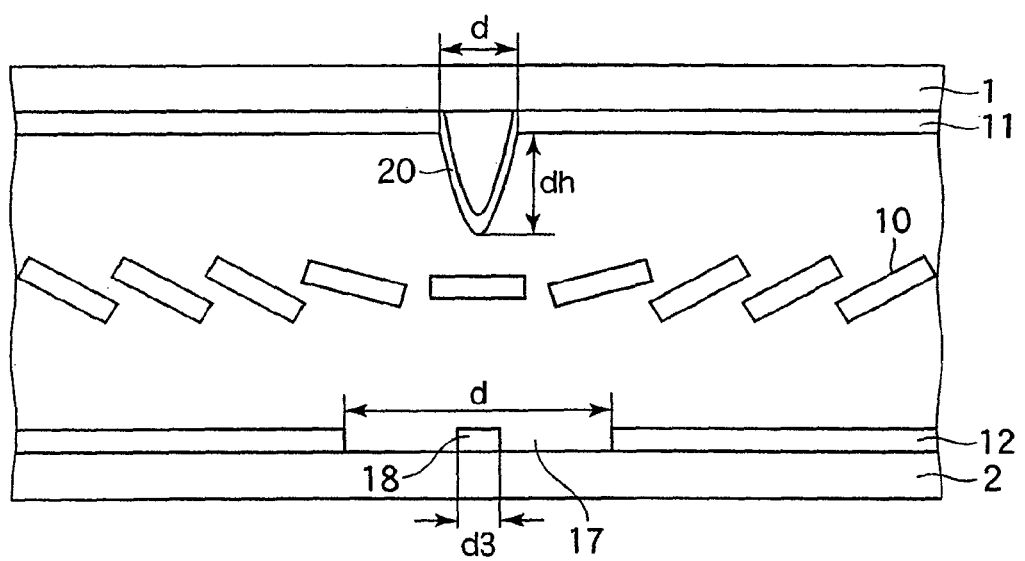
FIG. 35 is a view showing a liquid crystal display according to example 5-1 of a fifth embodiment of the present invention.
Figure 36:
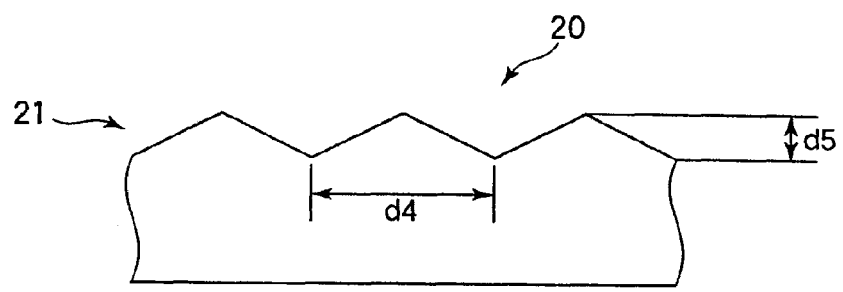
FIG. 36 is a view showing the liquid crystal display according to the example 5-1 of the fifth embodiment of the present invention.

FIGS. 35 and 36 show an example of this embodiment.

An MVA-LCD shown in FIG. 35 has the same shape as the MVA-LCD shown in FIG. 34 except that the conductive linear projection 19 in the MVA-LCD shown in FIG. 34 is replaced by a conductive linear projection 20. However, the width d of a slit portion 17 is longer than that shown in FIG. 26, and d=22.5 μm in this example, and the width d3 of a stripe-like electrode at the center portion of the slit portion 17 is d3=2.5 μm.

The conductive linear projection 20 is such that a transparent conductive film is formed on a patterned novolac or acrylic photosensitive resin. FIG. 36 shows a state in which the tip end portion of the conductive linear projection 20 is viewed in the direction orthogonal to the extending direction. As shown in FIG. 36, an irregular portion 21 in which irregularities are repeated in the extending direction is formed in the vicinity of the apex of the conductive linear projection 20. The width (period) of the irregular portion 21 is d4=6.0 μm, and the height (vertical difference) is d5=0.3 μm. The irregular portion 21 was formed by using heat shrinkage generated by irradiation of ultraviolet rays of irradiation energy of about 5000 mJ/cm$^2$ ($\lambda$=254 nm) after the photosensitive resin was post-baked.

The irregular portion 21 provided at the top portion of the conductive linear projection 20 can be regarded as a plurality of minute linear projections extending in the direction orthogonal to the extending direction of the conductive linear projection 20. Thus, the liquid crystal molecules 10 in the vicinity of the minute linear projections are aligned in the extending direction of the minute linear projections.

Accordingly, by using the alignment regulating structural member (combination of the slit portion 17 and the conductive linear projection 20) of this example, also in the low voltage region, it becomes possible to cause the liquid crystal molecules 10 on the domain wall to have directionality in the direction orthogonal to the extending direction by the irregular portion 21 of the conductive linear projection 20. By this, it becomes possible to avoid or reduce the $\phi$ deviation which is apt to occur in the conventional construction, and the response characteristics, together with the transmittance, are also improved. Besides, since a new alignment regulating force is exerted on the domain wall, the $\phi$ deviation produced by the bonding deviation can also be reduced. Accordingly, by applying this alignment dividing construction, a wide manufacturing margin can be secured, and the transmittance and the response characteristics can be improved more remarkably.

As a comparative example, the MVA cell shown in FIG. 34 was prepared. The MVA cell has the same construction as the MVA cell of this example except that it has the conductive linear projection 19. Besides, in both the present example and the comparative example, in order to confirm the margin to the bonding deviation, cells in which bonding was shifted were also fabricated. As a result of alignment observations, according to the MVA cell of this example, the $\phi$ deviation, which occurred in the low voltage region, was capable of being made smaller than the comparative example, and more excellent transmittance characteristics and response characteristics were obtained. Besides, it was confirmed that the magnitude of the $\phi$ deviation produced when the bonding deviation occurred was also reduced.

Example 5-2

Figure 37:
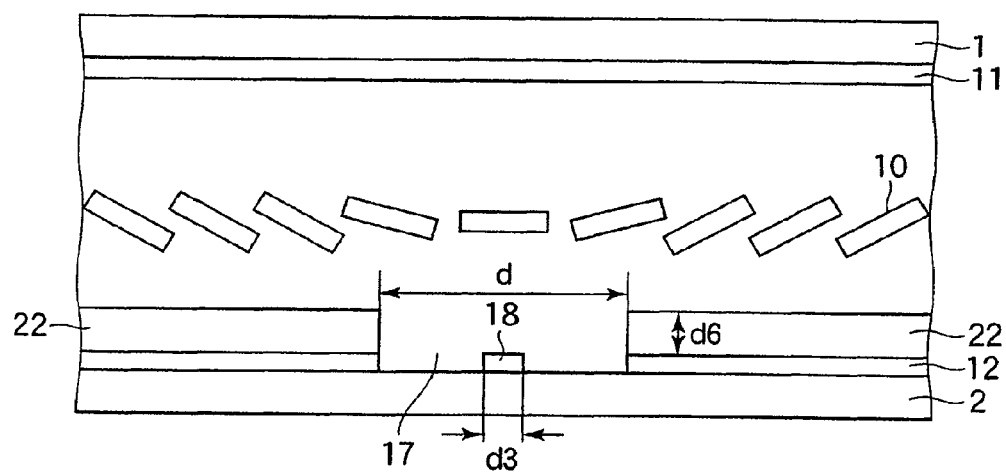
FIG. 37 is a view showing a liquid crystal display according to example 5-2 of the fifth embodiment of the present invention.

FIG. 37 shows an example of this embodiment.

In an MVA-LCD shown in FIG. 37, the conductive linear projection 20 is not formed on the substrate 1 in the MVA-LCD shown in FIG. 35, but slit portions 17 are formed at a pitch of 70 μm on the substrates 1 and 2. Then, a dielectric layer 22 of a positive resist having a thickness d6=0.5 μm is formed on the electrode 12 in regions other than the slit portions 17 including stripe-like electrodes 18, and a vertical alignment film (not shown) having a thickness of 0.05 μm is formed thereon. The upper and lower substrates 1 and 2 are bonded to each other so that the slit portions 17 are alternately arranged, and liquid crystal is injected, so that the MVA cell of a cell gap of 4.0 μm is prepared.

By using the alignment regulating structural member of this example, the alignment division of the horizontal transition in which the problem due to the bonding deviation does not arise can be realized. Since a step of eliminating the deviation of the two opposite alignment regulating structural members and bonding the substrates can be simplified, a high manufacturing yield can be obtained. As a result of alignment observations, in the MVA cell of this example, it was confirmed that the $\phi$ deviation did not occur in a region other than a low voltage region, and the $\phi$ deviation due to the bonding deviation, which occurred in the comparative example, was prevented.

As described above, even if the bonding deviation of the substrates occur, by using the alignment regulating structural member which realizes the horizontal transition more stable in energy, the high luminance and the high speed response can be realized without narrowing the manufacturing margin of the MVA-LCD.

Sixth Embodiment

Next, a liquid crystal display according to a sixth embodiment of the present invention will be described with reference to FIGS. 38A to 43. The liquid crystal display according to this embodiment is an MVA-LCD in which an insulating linear projection is arranged as an alignment regulating structural member, and has a feature that an electrode is formed on the linear projection. Besides, a potential such as decreases a potential difference with respect to an electrode at the side of the opposite substrate is applied to the electrode on the linear projection. For example, the same potential as the potential of the opposite electrode is applied. By doing so, even if a voltage is applied between the electrodes of both the substrates, the liquid crystal molecules on the linear projection stand upright without being tilted in the extending direction of the linear projection. By this, the liquid crystal molecules in the vicinity of the domain wall are tilted in the vertical transition in which the polar angle is successively changed in the plane substantially orthogonal to the extending direction of the linear projection. That is, the liquid crystal transition at the domain wall becomes a change in which in a state of a constant orientation angle, the polar angle approaches verticality from 0°, and through the vertically aligned liquid crystal molecule at the center portion, the orientation angle is inverted by 180°.

Hereinafter, specific examples will be described.

Example 6-1

Figure 38A:
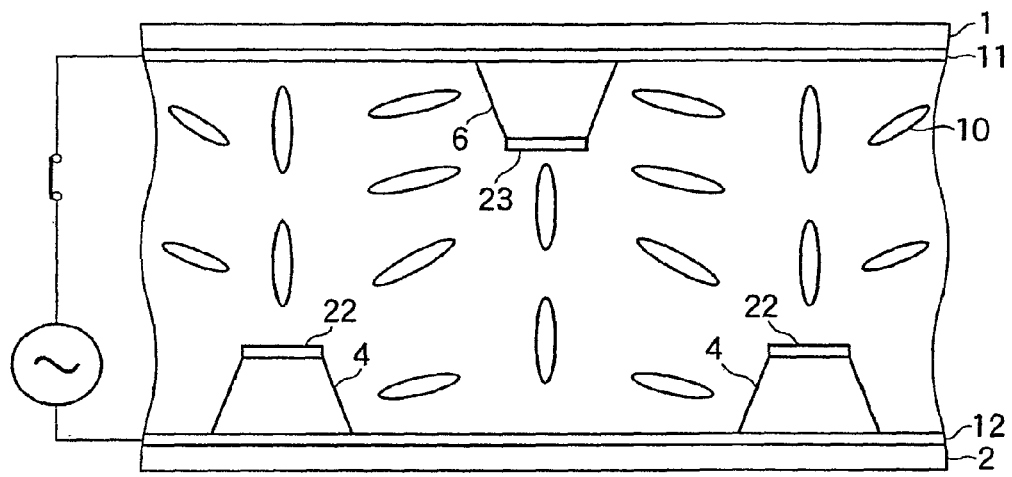
FIGS. 38A and 38B are views showing a liquid crystal panel construction according to example 6-1 of a sixth embodiment of the present invention.
Figure 38B:
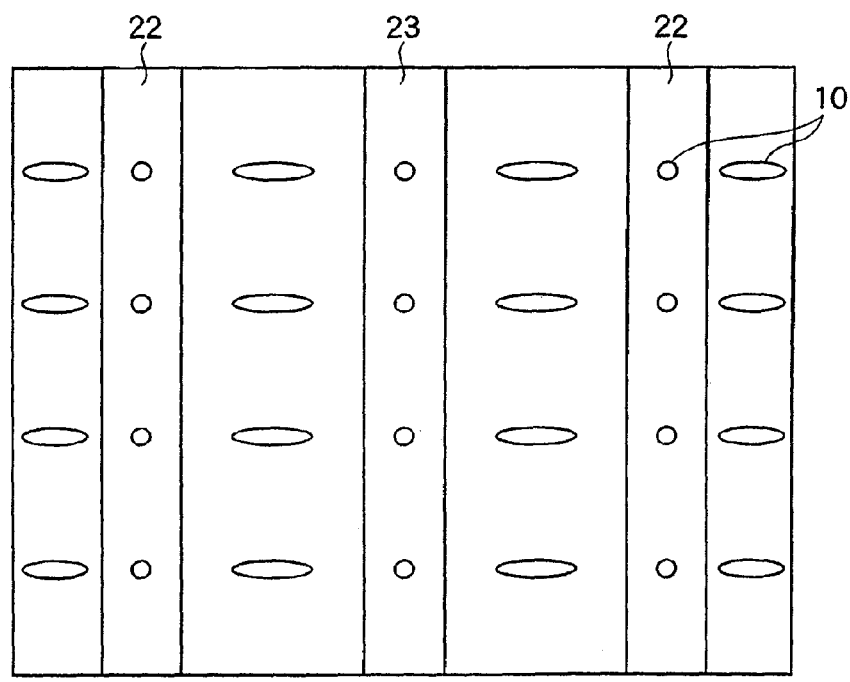

FIGS. 38A and 38B are sectional views showing a liquid crystal panel construction according to this example. FIG. 38A shows a panel section taken along a normal of a panel surface, and FIG. 38B shows a state viewed in the direction of the normal of the panel surface. Transparent electrodes 11 and 12 are formed on opposite surfaces of a pair of opposite substrates 1 and 2 having a predetermined cell gap and arranged opposite to each other. A liquid crystal layer containing a large number of liquid crystal molecules 10 is sealed between the transparent electrodes 11 and 12. A plurality of linear projections 4 are formed at a predetermined pitch on the transparent electrode 12. A plurality of linear projections 6 are formed on the transparent electrode 11 at the same pitch as the linear projections 4 and are shifted by a half pitch from the linear projections 4. Two polarizing plates (either of them is not shown) are arranged in crossed Nicols at the outside of each of the substrates 1 and 2. The cell gap is 4 µm, the height of the linear projections 4 and 6 is 1.5 µm, the width is 10 µm, and the space (pitch) is 25 µm.

Electrodes 22 and 23 are formed on the top portions of the respective linear projections 4 and 6. The same potential as the potential applied to the opposite electrode 11 is applied to the electrode 22 on the linear projection 4. The same potential as the potential applied to the opposite electrode 12 is applied to the electrode 23 on the linear projection 6.

For example, when 0 V is applied to the electrode 11 of the substrate 1 and +5 V is applied to the electrode 12 of the substrate 2, the liquid crystal molecules 10 are tilted in accordance with the distortion of the intensity of the electric field generated in the liquid crystal layer by the action of the linear projections 4 and 6 as the alignment regulating structural members. However, since the potentials of the electrodes 22 and 23 on the respective linear projections 4 and 6 are the same as the potentials of the opposite electrodes, the same state as the state of no voltage application is kept on the respective linear protrusions 4 and 6. Thus, the liquid crystal molecules 10 on the respective linear projections 4 and 6 are not tilted but stand vertically. By this, the liquid crystal molecules 10 in the vicinity of the domain wall are tilted in the vertical transition in which the polar angle is successively changed in the plane substantially orthogonal to the extending direction of the linear projections 4 and 6. According to this example, panel characteristics were obtained in which the panel transmittance was 5.2% and the response speed from black to gray of 25% was 77 (ms).

Example 6-2

Figure 39A:
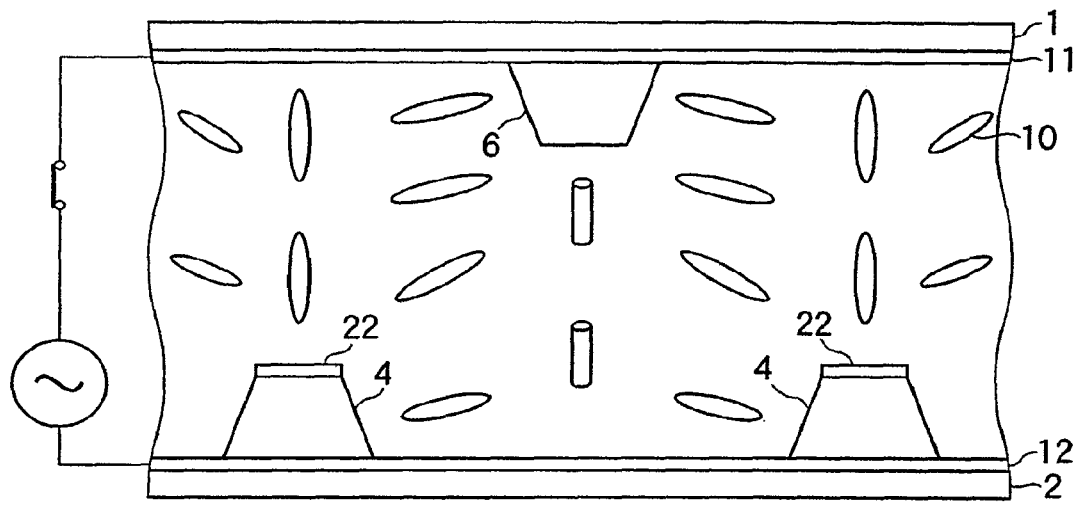
FIGS. 39A and 39B are views showing a liquid crystal panel construction according to example 6-2 of the sixth embodiment of the present invention.
Figure 39B:
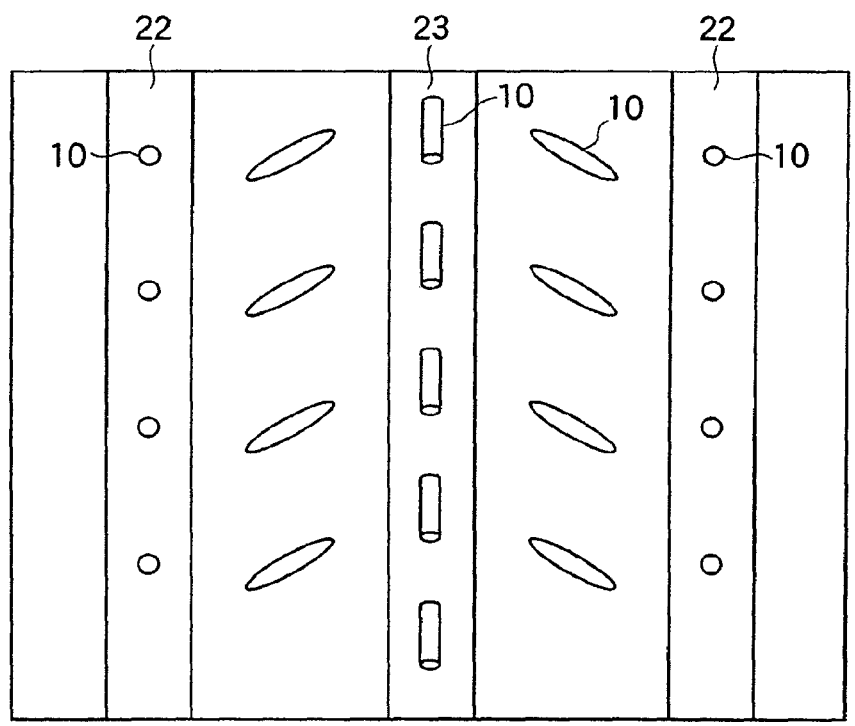

FIGS. 39A and 39B are sectional views showing a liquid crystal panel construction according to this example. A liquid crystal panel shown in FIGS. 39A and 39B is the same as the liquid crystal panel of the example 6-1 except that the electrodes 23 on the linear projections 6 are removed from the liquid crystal panel of the example 6-1 shown in FIGS. 38A and 38B.

For example, when 0 V is applied to the electrode 11 of the substrate 1 and +5 V is applied to the electrode 12 of the substrate 2, the liquid crystal molecules 10 are tilted in accordance with the distortion of the intensity of the electric field generated in the liquid crystal layer by the action of the linear projections 4 and 6 as the alignment regulating structural members. However, since the potentials of the electrodes 22 on the respective linear projections 4 are the same as the potential of the opposite electrode, the same state as the state of no voltage application is kept on the respective linear projections 4. Thus, the liquid crystal molecules 10 on the respective linear projections 4 are not tilted, but stand vertically. However, since the liquid crystal molecules 10 on the respective linear projections 6 are tilted, the liquid crystal molecules 10 in the vicinity of the domain wall are tilted in a state which is close to the vertical transition though its degree is inferior to the example 6-1. According to this example, panel characteristics were obtained in which the panel transmittance was 5.0% and the response speed from black to gray of 25% was 105 (ms).

Example 6-3

Figure 40A:
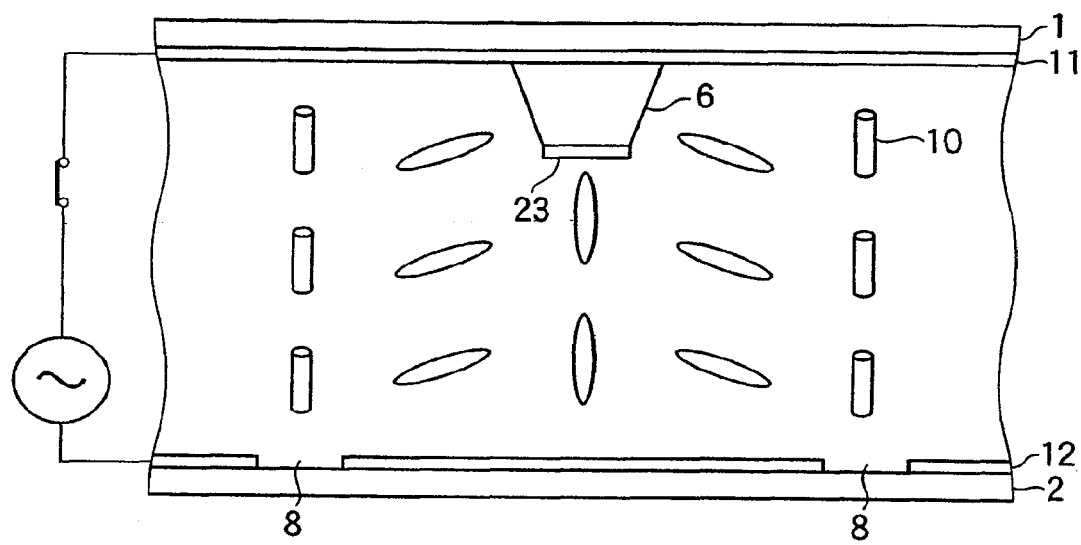
FIGS. 40A and 40B are views showing a liquid crystal panel construction according to example 6-3 of the sixth embodiment of the present invention.
Figure 40B:
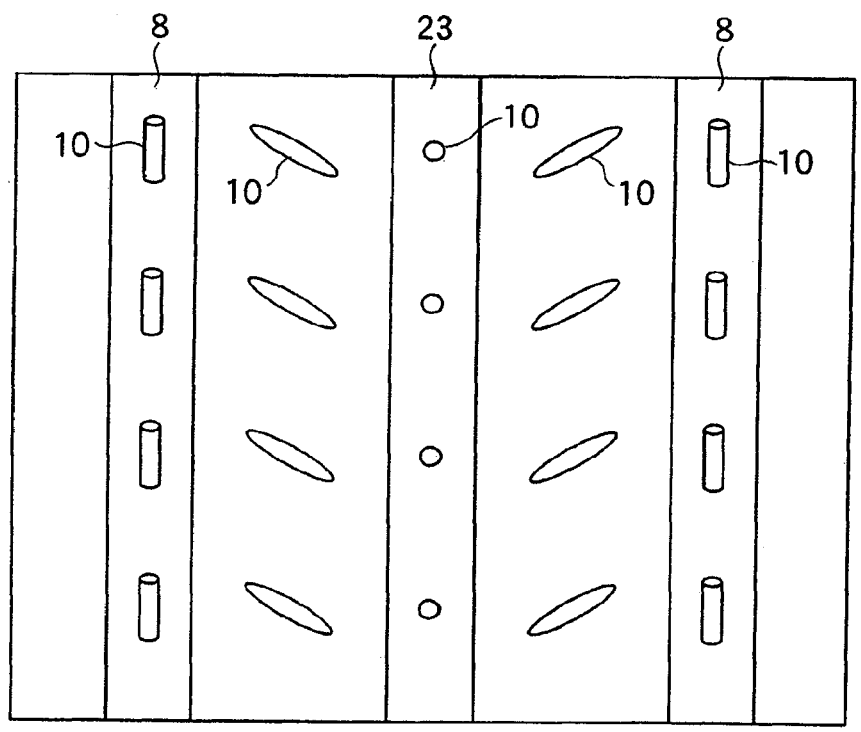

FIGS. 40A and 40B are sectional views showing a liquid crystal panel construction according to this example. A liquid crystal panel shown in FIGS. 40A and 40B is the same as the liquid crystal panel of the example 6-1 except that slit portions 8 are provided instead of the linear projections 4 of the liquid crystal panel of the example 6-1 shown in FIGS. 38A and 38B (slit width is 10 µm).

For example, when 0 V is applied to the electrode 11 of the substrate 1 and +5 V is applied to the electrode 12 of the substrate 2, the liquid crystal molecules 10 are tilted in accordance with the distortion of the intensity of the electric field generated in the liquid crystal layer by the action of the linear projections 6 and the slit portions 8 as the alignment regulating structural members. However, since the potentials of the electrodes 23 on the respective linear projections 6 are the same as the potential of the opposite electrode, the same state as the state of no voltage application is kept on the respective linear projections 6. Thus, the liquid crystal molecules 10 on the respective linear projections 6 are not tilted but stand vertically. However, since the liquid crystal molecules 10 on the slit portions 8 are tilted, the liquid crystal molecules 10 in the vicinity of the domain wall are tilted in a state which is close to the vertical transition though its degree is inferior to the example 6-1. According to this example, panel characteristics were obtained in which the panel transmittance was 5.0% and the response speed from black to gray of 25% was 110 (ms).

Example 6-4

Figure 41:
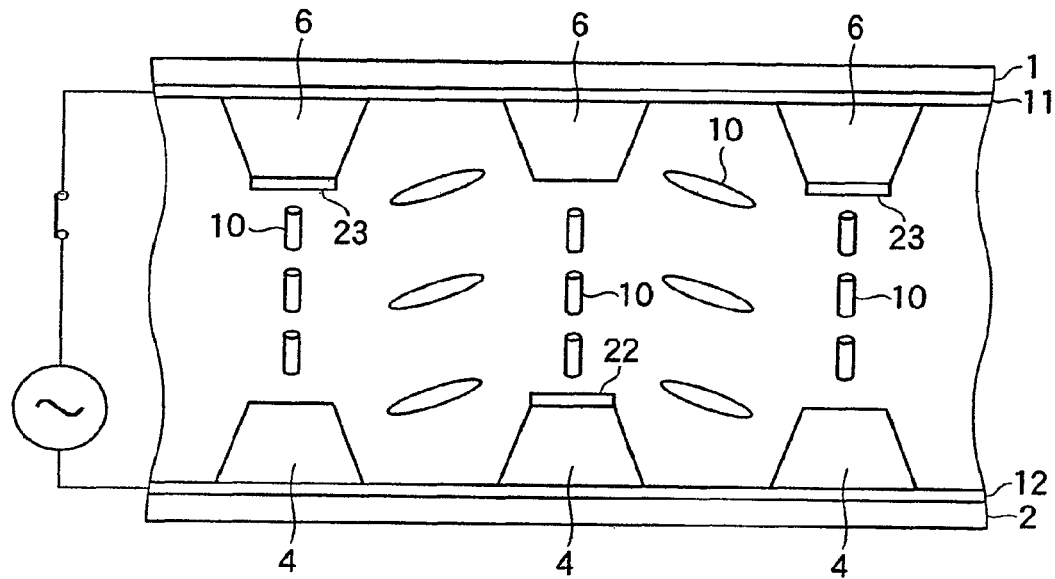
FIG. 41 is a view showing a liquid crystal panel construction according to example 6-4 of the sixth embodiment of the present invention.

FIG. 41 is a sectional view showing a liquid crystal panel construction according to this example. In a liquid crystal panel shown in FIG. 41, linear projections 6 are formed at a predetermined pitch on an electrode 11, and linear projections 4 are formed on an electrode 12 at positions opposite to the linear projections 6. Electrodes 22 are formed on every other linear projections 4, and electrodes 23 are formed on every other linear projections 6 and are shifted from them by a half pitch. The other construction is the same as the liquid crystal panel of the example 6-1 shown in FIGS. 38A and 38B.

The same potential as the potential applied to the electrode 12 is applied to the electrodes 22 on the linear projections 4. The same potential as the potential applied to the electrode 11 is applied to the electrodes 23 on the linear projections 6. That is, the construction is such that the conductive linear projections provided with the electrodes are arranged at the opposite side of the linear projections 4 and 6 as the alignment regulating structural members having no electrode on the top portions.

For example, when 0 V is applied to the electrode 11 of the substrate 1 and +5 V is applied to the electrode 12 of the substrate 2, 0 V is applied to the electrodes 23 of the linear projections functioning as the conductive linear projections, and +5 V is applied to the electrodes 22 of the linear projections 4 functioning as the conductive linear projections. By doing so, the alignment regulating force becomes high, and the response speed of display can be raised. According to this example, panel characteristics were obtained in which the panel transmittance was 4.8% and the response speed from black to gray of 25% was 90 (ms).

Example 6-5

Figure 42:
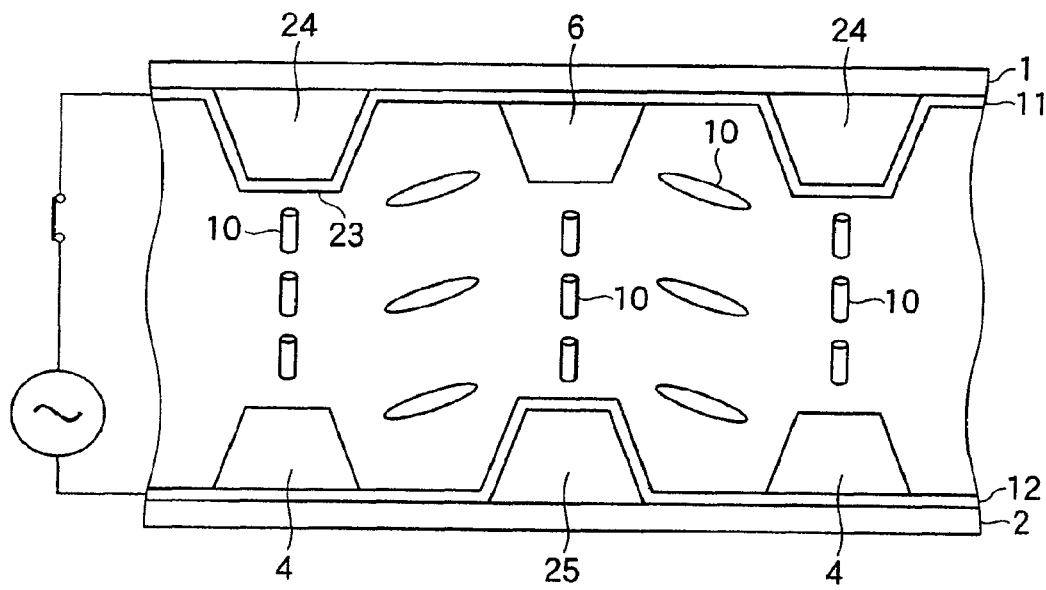
FIG. 42 is a view showing a liquid crystal panel construction according to example 6-5 of the sixth embodiment of the present invention.

FIG. 42 is a sectional view showing a liquid crystal panel construction according to this example. In a liquid crystal panel shown in FIG. 42, linear projections 6 are formed at a predetermined pitch on an electrode 11, and conductive linear projections 24 are formed at the same pitch as the predetermined pitch and are shifted from the linear projections 6 by a half pitch. The conductive linear projections 24 are formed by stacking an electrode 11 on previously formed dielectric projections.

Besides, linear projections 4 are formed on an electrode 12 at the same pitch as the linear projections 6, and conductive linear projections 25 are formed at the same pitch as the pitch and are shifted from the linear projections 4 by a half pitch. The conductive linear projections 25 are formed by stacking an electrode 12 on previously formed dielectric projections. The substrates 1 and 2 are bonded to each other so that the linear projections 6 and the conductive linear projections 25 are opposite to each other, and the linear projections 4 and the conductive linear projections 24 are opposite to each other. The other construction is the same as the liquid crystal panel of the example 6-1 shown in FIGS. 38A and 38B.

Since the operation of this example is the same as the example 6-4, the description is omitted. According to this example, panel characteristics were obtained in which the panel transmittance was 4.8% and the response speed from black to gray of 25% was 90 (ms).

Example 6-6

FIG. 43 is a sectional view showing a liquid crystal panel construction according to this example. A liquid crystal display shown in FIG. 43 has the same construction as that of the example 6-5 shown in FIG. 42 except that the shapes of the sections of the conductive linear projections 24 and 25 in the direction orthogonal to the extending direction are different.

The shape of the section of each of the conductive linear projections 24 and 25 in the direction orthogonal to the extending direction is characterized in that an upper side is longer than a lower side, and the area of an upper surface of each of the conductive linear projections 24 and 25 is larger than the area of a surface being in contact with the pixel electrode on which the projection is arranged. By doing so, the alignment direction by the projections becomes more stable, and the response speed of display can be further raised. Incidentally, the conductive linear projections 24 and 25 can be formed by overexposure using a negative photosensitive material.

Besides, the conductive linear projections 24 and 25 can be formed by forming color filter layers in piles at the time of formation of color filters, and by forming transparent electrodes thereon. Accordingly, the conductive linear projections 24 and 25 can be formed without increasing the manufacturing step. According to this example, panel characteristics were obtained in which the panel transmittance was 4.8% and the response speed from black to gray of 25% was 70 (ms).

Conventional Example

A conventional MVA-LCD was formed in which linear projections were formed on the opposite substrate to be shifted by a half pitch. The panel construction parameters such as a cell gap are the same as those of the example 6-1. The panel transmittance was 4.8%. The response speed from black to gray of 25% was 120 (ms).

The functions, operations and effects of the above examples are shown in Table 2 while they are compared with the conventional example.

TABLE 2

|  | Conventional example | Example 6-1 | Example 6-2 | Example 6-3 | Example 6-4 | Example 6-5 | Example 6-6 |
| --- | --- | --- | --- | --- | --- | --- | --- |
| Panel transmittance (%) | 4.8 | 5.2 | 5.0 | 5.0 | 4.8 | 4.8 | 4.8 |
| Halftone response time (ms) | 120 | 77 | 105 | 110 | 90 | 90 | 70 |

Seventh Embodiment

Next, a liquid crystal display according to a seventh embodiment of the present invention will be described with reference to FIGS. 44 to 54. In order to improve the transmittance characteristics of an MVA-LCD, a system is proposed in which the orientation of liquid crystal alignment of a structural member or a slit portion is made different from the orientation of liquid crystal alignment of a space (region between two structural members) portion by 45°. This system can be realized by forming, for example, lattice-like alignment regulating structural members 4 and 6 on upper and lower substrates as shown in FIG. 44, arranging the structural members 4 and 6 of the upper and lower substrates to be shifted from each other by a half pitch, and lowering the height of each of the structural members 4 and 6 to approximately half of that of the conventional MVA-LCD. Two polarizing plates at both sides of the upper and lower substrates are arranged in crossed Nicols, and are arranged so that both polarization axes become orthogonal to or parallel to the extending direction of the structural members 4 and 6. By doing so, a deviation between the orientation of the liquid crystal alignment in the domain and the orientation of the liquid crystal alignment on the alignment regulating structural member can be made smaller than that of the conventional MVA-LCD. Thus, the deviation of the liquid crystal molecules from the ideal orientation in the domain becomes small, the number of dark lines can be made one, and the transmittance can be improved.

However, in this system, although the transmittance can be improved as compared with the conventional type, there arises a problem that the response speed becomes slow. Then, a response state of a cell was observed by using a high speed camera. FIGS. 45A, 45B, 45C, 46A, 46B, 46C, 46D, 47A, 47B, and 47C show results of response states of a cell after a predetermined time has passed after voltage application. In FIGS. 45A to 47F, each of the drawings shows a plurality of domains divided by the alignment regulating structural members 4 and 6 shown in FIG. 44. FIGS. 45A to 45C in turn show states after 0 ms, 12 ms, and 16 ms have passed since the start of the voltage application, FIGS. 46A to 46D in turn show states after 20 ms, 40 ms, 100 ms and 200 ms have passed, and FIGS. 47A to 47C in turn show states after 400 ms, 500 ms, and 700 ms have passed.

By the observation results, it has been understood that the following three factors are factors of slow response.

1. (See problem 2 of FIG. 46A) It is seen that a complicated optical pattern appears at the center portion of the space at the initial period of response, and it assimilates with the brightness of the surroundings and gradually becomes bright with the passage of time. It has been found that the cause is such that liquid crystal molecules in the vicinity of the center of the space portion do not follow the alignment regulation from the structural member at the initial period of the response and are aligned at random, however, they receive the propagation of the tilt from the liquid crystal molecules in which the alignment is regulated by the structural member with the passage of time, and are gradually aligned in the regulation direction of the structural member.

2. (See problem 3 of FIG. 46A) In regions very close to the structural member or the slit, a region other than a crossing portion is dark immediately after the response, and becomes bright with the passage of time. It has been found that the cause is such that the liquid crystal molecules of this region are aligned in the orthogonal (90°) orientation with respect to the extending direction of the linear structural member or slit portion immediately after the response, and thereafter, the alignment is changed to the orientation of 45°.

3. (See problem 1 of FIG. 46B) It is seen that immediately after the response, among regions on the structural member or the slit portion, a plurality of singular points of alignment vectors appear in the crossing portion and regions other than that, and with the passage of time, the singular points appearing in the regions other than the crossing portion are moved so as to attract each other and disappear. Further, in accordance with the movement and extinction of the singular points, there is a change in the brightness of the surroundings (three dark lines are changed to one line). The reason of this will be described below. At the time of voltage application, the liquid crystal molecules on the linear structural member or the slit portion are urged to be aligned in the direction parallel to the extending direction of the structural member or the slit portion. Here, for example, in the case where a line is extended right and left, there are two cases, that is, a left direction and a right direction, in which the liquid crystal molecules are aligned parallel to that. In the vicinity of the crossing portion of the structural member or the slit portion, since an alignment control state is realized in which a singular point of an alignment vector is stably formed, the alignment orientation of the liquid crystal molecules is determined to be one direction in accordance with that. However, at the regions other than the crossing portion, there is no means for determining the orientation of the liquid crystal alignment. Thus, it is conceivable that immediately after the response, the liquid crystal molecules in the regions other than the crossing portion are slanted in one of the two directions at random, so that singular points are produced in the regions other than the crossing portion, and thereafter, the alignment state is changed in accordance with the alignment orientation of the crossing portion, and the singular points other than those on the crossing portion in which the singular point can be stably formed, finally disappear.

In summary, the cause of making the response slow can be classified into three factors, that is, the random alignment in the space portion, the orthogonal alignment in the vicinity of the structural member, and the change (movement and disappearance) of the singular points produced in the regions other than the crossing portion of the lattice.

Then, according to this embodiment, in order to improve the response characteristics of the MVA-LCD for controlling the liquid crystal alignment by the linear projection or the slit portion provided on the substrate, the liquid crystal molecules on the linear projection or the slit portion are made not to be vertically aligned even at the time of no voltage application. By this, at the time of no voltage application, the tilt direction of the liquid crystal molecules on the linear projection or the slit portion can be determined in advance.

As a result, also after the voltage application, since the liquid crystal molecules on the linear projection or the slit portion follow the previously determined tilt direction, the movement and disappearance of the singular points, which occurred in the conventional MVA-LCD, can be eliminated.

Further, at the time of the voltage application, the liquid crystal molecules of the region adjacent to the linear projection or the slit portion are urged to be aligned in the orientation of 45° with respect to the extending direction of the linear projection or the slit portion. At this time, since the liquid crystal molecules on the linear projection or the slit portion are tilted in the previously determined orientation, the liquid crystal molecules in the region adjacent to this can change the alignment smoothly from the tilt orientation to the direction shifted by 45°. By these, the above problems 2 and 3 can be improved and the response speed can be raised.

Incidentally, in order to obtain a bright display having high contrast, it is appropriate that the alignment orientation of the liquid crystal molecules on the linear projection or the slit portion is shifted by 45° with respect to the alignment orientation of the liquid crystal molecules in the domain at the time of voltage application. Besides, it is necessary that the polarization axis of a polarizing plate is also arranged to be in the orientation of 45° with respect to the alignment orientation of the liquid crystal molecules in the domain. If the orientation of the liquid crystal alignment on the linear projection or the slit portion is shifted by 45° from the alignment orientation of the liquid crystal molecules in the domain, the orientation of the polarization axis is coincident with the orientation of the liquid crystal alignment on the linear projection or the slit portion, and a light leak does not occur. If the alignment orientation of the liquid crystal molecules on the linear projection or the slit portion are shifted from the orientation of the polarization axis, the light leak occurs at the time of a black display. Thus, as a method of preventing the light leak from occurring, at least one of the linear projection or the slit portion, and their opposite portions may be shaded.

Besides, at the time of the voltage application, the linear projection or the slit portion is made the boundary, and the alignment orientations of adjacent liquid crystal domains are different from each other by approximately 90°. The alignment orientation of the liquid crystal molecules on the linear projection or the slit portion at the time of no voltage application is equal to the extending direction of the linear projection or the slit portion. Besides, a difference between the orientation of the pre-tilt angle appearance of the liquid crystal molecules on the linear projection or the slit portion at the time of no voltage application and the alignment orientation of the liquid crystal domains positioned at both sides of the boundary of the linear projection or the slit portion at the time of voltage application is 90° or less.

Hereinafter, specific examples will be described.

Example 7-1

Figure 48A:
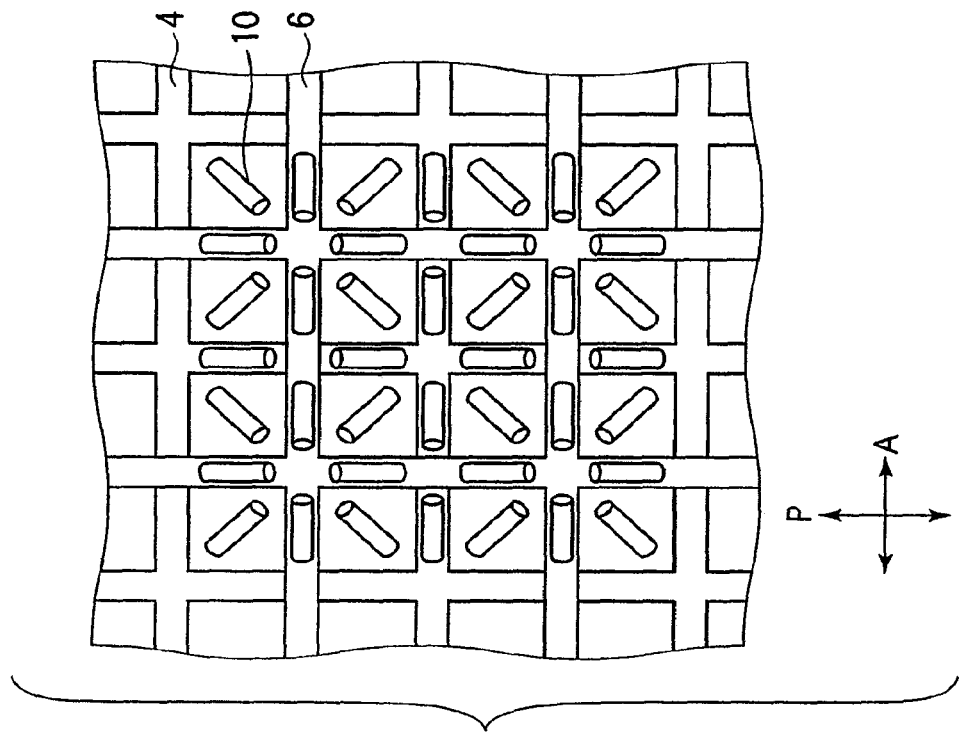
FIGS. 48A and 48B are views showing a liquid crystal panel construction according to example 7-1 of the seventh embodiment of the present invention.
Figure 48B:
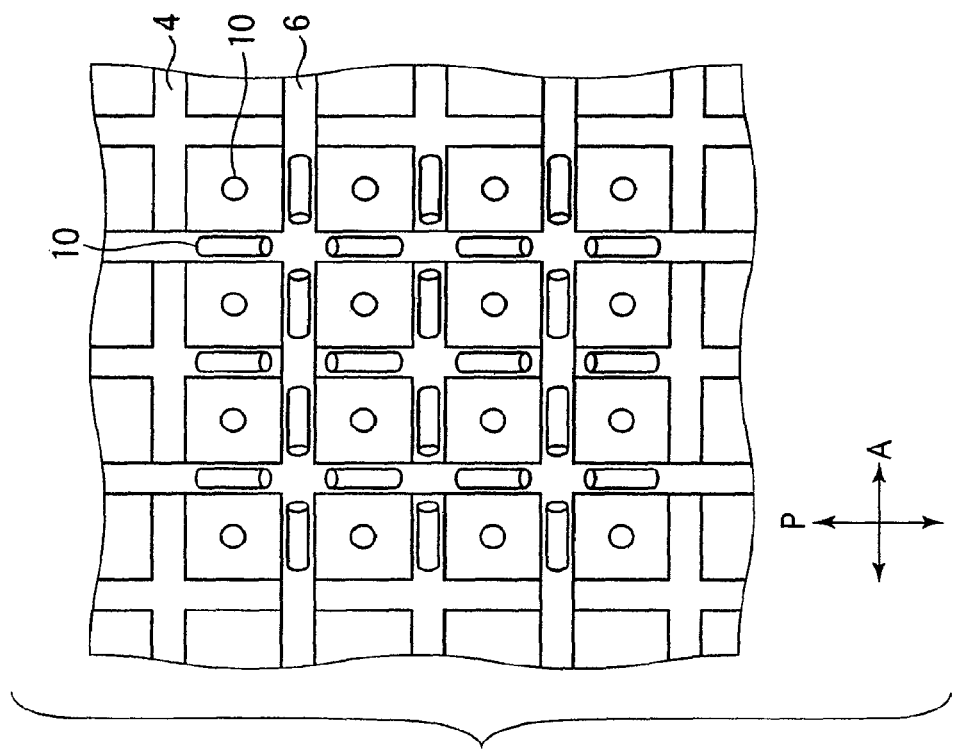

A liquid crystal panel construction according to this example will be described with reference to FIGS. 48A and 48B. FIGS. 48A and 48B show states in which a liquid crystal panel according to this example is viewed against a substrate surface, FIG. 48A shows the state at the time of no voltage application, and FIG. 48B shows the state at the time of voltage application.

Lattice-like alignment regulating structural members 4 (6) were formed on a substrate having an ITO electrode. Photosensitive acryl resin was used for a structural material. The formation of a structural pattern was performed by spin coating the resin on the substrate, carrying out baking at 90° C. for 20 minutes (using clean oven), selectively irradiating ultraviolet light by using a photomask, carrying out development with an organic alkali developer (solution of TMAH of 0.2 wt %), and carrying out baking at 200° C. for 60 minutes (using clean oven). The width of the structural member 4 (6) was made 5 μm, the height was made 0.74 μm, and the lattice pitch was made 40 μm.

By coating the thus obtained substrate with an alignment film directly without carrying out an ashing processing, the alignment film was made not to be selectively formed on the structural member 4(6). Vertical alignment film material X was spin coated on the substrate, and after pre-baking was carried out at 110° C. for one minute (using hot plate), primary baking was carried out at 180° C. for 60 minutes (using clean oven). The two substrates formed in this way were bonded to each other so that the pitches of the lattices are shifted from each other by a half pitch to form a cell, and liquid crystal material A having a negative dielectric anisotropy was injected between the substrates. The cell gap was made 4 μm. The alignment state of the cell was observed, and as shown in FIG. 48A, it was confirmed that the liquid crystal molecules 10 positioned on the structural members 4 and 6 were not vertically aligned at the time of no voltage application. Incidentally, the thickness of the alignment film at the alignment regulating structural member or at the opposite portion may be made thinner than the thickness in the region where the alignment regulating structural member does not exist.

Next, as a comparative example, a panel was fabricated in which an ashing processing of about one minute was carried out in an oxygen plasma atmosphere to the substrate before coating of the alignment film, so that the alignment film was formed on the structural member as well.

Next, response states of both were observed by a high-speed camera. The observation results will be described again with reference to FIGS. 45A to 47F. FIGS. 45A, 45B, 45C, 46A, 46B, 46C, 46D, 47A, 47B and 47C show results of the response states of the cell after a predetermined time has passed after voltage application in the comparative example. FIGS. 45D, 45E, 45F, 46E, 46F, 46G, 46H, 47D, 47E and 47F show results of the response states of the cell after a predetermined time has passed after voltage application in this example. Incidentally, for facilitating an understanding through the drawings, in the respective drawings of FIGS. 45D, 45E, 45F, 46E, 46F, 46G, 46H, 47D, 47E and 47F, domains to be noticed are surrounded by circles.

Figure 45D:
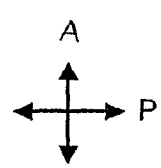

First, at the time of no voltage application, in this example, although the liquid crystal molecules on the structural member are not vertically aligned, since the orientation is equal to the orientation of the polarization axis, similarly to the comparative example in which the liquid crystal molecules on the structural member are vertically aligned, a black display state appears (see FIGS. 45A and 45D).

Figure 45E:
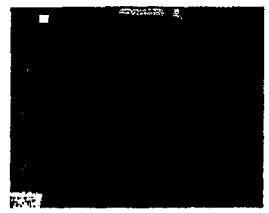

Next, when the brightness in the vicinity of the structural member after voltage application is compared, the whole in the vicinity of the structural member is already bright after 12 ms in the example, whereas only the portion in the vicinity of the crossing portion is bright in the comparative example (see FIGS. 45B and 45E).

Besides, when the state of singular point formation on the structural member after voltage application is compared, a singular point is not seen in a portion except the crossing portion of the structural members in this example, whereas a singular point is also formed at a linear portion between the crossing portions, and it is understood that the singular point disappears after a long time of 700 ms or more (see FIGS. 47C and 47F).

Figures 49A, 49B:
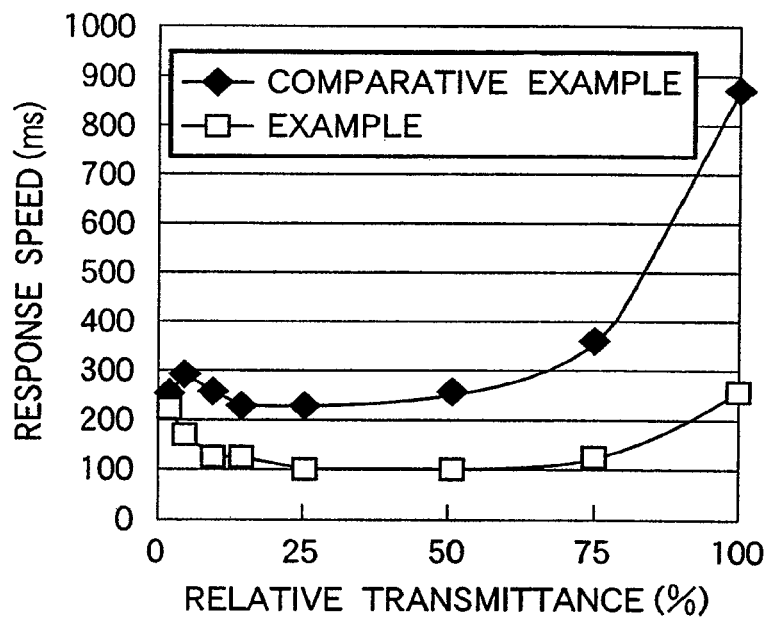
FIGS. 49A and 49B are views showing measurement results of response speed of the liquid crystal panel according to the example 7-1 of the seventh embodiment of the present invention.

Next, measurement results of response speed are shown in FIGS. 49A and 49B. FIG. 49A is a graph in which the horizontal axis indicates the relative transmittance (%), and the vertical axis indicates the response speed (ms). Incidentally, the relative transmittance is made 100% when an applied voltage to the liquid crystal is 5.4 V. FIG. 49B numerically shows measurement values of response speed at respective measurement points of the relative transmittance (%). As is apparent from FIGS. 49A and 49B, in this example, the response speed higher than those of the comparative example is obtained at any gradations, and this fully corresponds to the results by the high speed camera shown in FIGS. 45A to 47F. By these, it is understood that the response characteristics can be improved by this embodiment.

Example 7-2

FIG. 50A shows a panel construction according to this example, and FIG. 50B shows a panel construction according to a comparative example. This example is the same as the panel construction of the example 7-1 shown in FIGS. 48A and 48B except for the following. In the comparative example shown in FIG. 50B, lattice-like alignment regulating structural members 4 and 6 having an equal width are formed on upper and lower substrates. On the other hand, in this example, as shown in FIG. 50A, the widths of lattice-like alignment regulating structural members 34 and 36 are changed in the extending direction. The width of a thick portion of the lattice-like alignment regulating structural members 34 and 36 was made 5 μm, and the width of a thin portion was made 2 μm. By this, the liquid crystal alignment on the structural members 34 and 36 can be controlled to be in a definite direction. Here, the thickness at the crossing portion of the structural members on the same substrate was made thickest, and the liquid crystal alignment on the structural members could be controlled to be within 90° from the liquid crystal alignment in the domain (45° in this example). As in the comparative example, in the case where the width of the structural member is constant, since either direction with respect to the extending direction can not be set for the tilt orientation of the liquid crystal molecules on the structural member, there is a case where the tilt orientation of the liquid crystal molecule on the structural member becomes 90° or more with respect to the alignment orientation of the space portion at the time of voltage application (liquid crystal molecules colored black in the drawing). In this case, an alignment abnormality as shown at the lower portion of the center (below the outside of a circular portion) of FIGS. 45D, 45E, 45F, 46E, 46F, 46G, 46H, 47D, 47E and 47F is observed, and the transmittance is lowered. However, by changing the width of the structural member as in this example, a desired direction can be stably set for the liquid crystal alignment of the structural member, so that the drop in the transmittance can be suppressed.

Example 7-3

FIG. 51A shows a state in which a panel construction according to this example is viewed against a substrate surface. FIG. 51B shows a section taken along line A-A of FIG. 51A. This example is the same as the panel construction of the example 7-1 shown in FIGS. 48A and 48B except that the height of the lattice-like alignment regulating structural members 4 and 6 is changed. In this example, the height of a crossing portion of the structural member on the same substrate was made highest, the height of a high portion was made 1.2 μm, and the height of a low portion was made 0.5 μm. In FIG. 51B, the height of a crossing portion 37 of the lattice-like alignment regulating structural member 4 on the substrate 2 is made highest. Similarly to the example 7-2, also by the construction of this example, the liquid crystal alignment on the structural member can be stably set to have a desired direction, and the drop in the transmittance can be suppressed.

Example 7-4

Figure 52A:
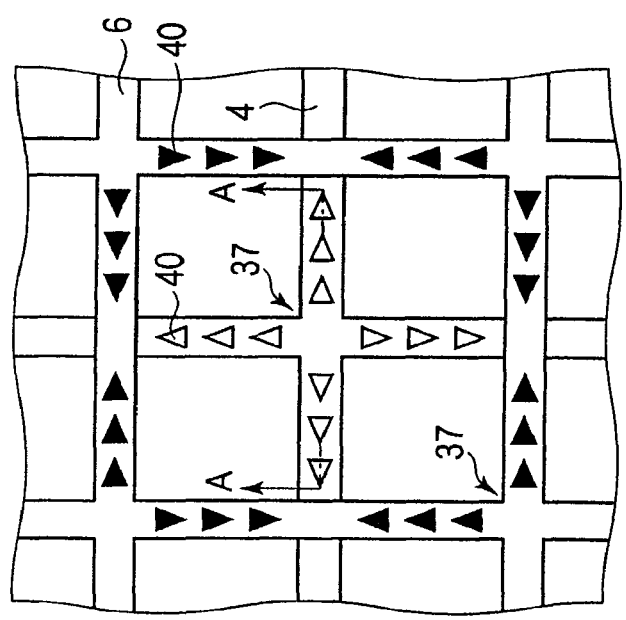
FIGS. 52A and 52B are views showing a liquid crystal panel construction according to example 7-4 of the seventh embodiment of the present invention.
Figure 52B:
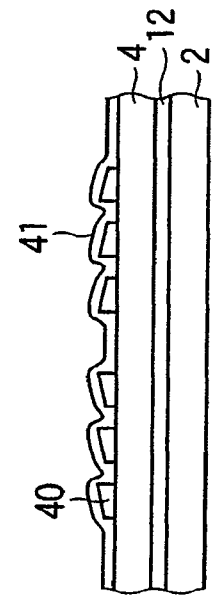

FIGS. 52A and 52B show a panel construction of this example. FIG. 52A shows a state in which the panel construction according to this example is viewed against a substrate surface. FIG. 52B shows a section taken along line A-A of FIG. 52A. This example is the same as the panel construction of the example 7-1 shown in FIGS. 48A and 48B except that a plurality of minute structural members 40 are formed on the lattice-like alignment regulating structural members 4 and 6, and an alignment film 41 is formed thereon.

Each of the minute structural members 40 has, as shown in FIG. 52A, a shape of an isosceles triangle when viewed against a substrate surface. The minute structural members 40 are arranged so that the bottom side of the shape of the isosceles triangle is directed toward the side of the crossing portion 37 of the structural members 4 and 6. By this, since the liquid crystal alignment on the structural member can be stably set to have a desired orientation, the drop in the transmittance can be suppressed.

Example 7-5

Figure 53:
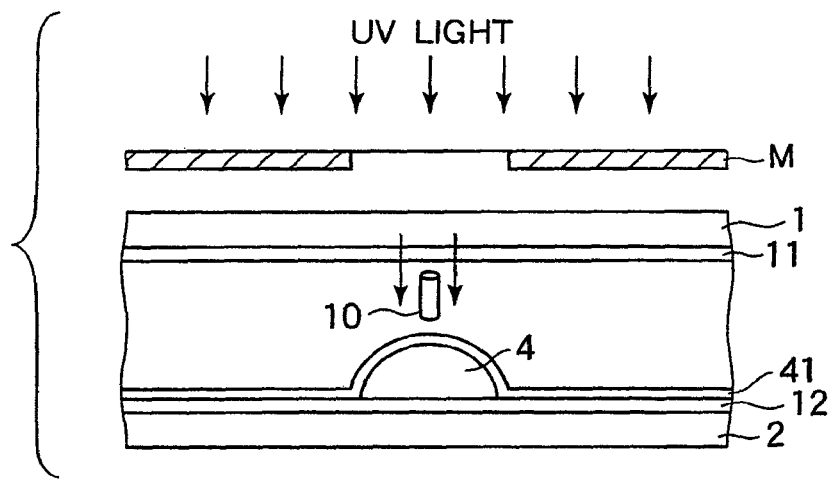
FIG. 53 is a view for explaining a manufacturing method of a liquid crystal panel according to example 7-5 of the seventh embodiment of the present invention.

This example will be described with reference to FIG. 53. In FIG. 53, ultraviolet ray irradiation was carried out, while the substrates 1 and 2 were selectively shaded with a photomask M, so that only the structural member 4 and its opposite portion were irradiated with ultraviolet light. The wavelength of ultraviolet light was made 254 nm, and the irradiation amount was made about 5000 mj/cm². By this, a pre-tilt angle of the liquid crystal molecule 10 on the structural member 4 could be made to be approximately 0° (the liquid crystal molecule 10 is aligned substantially parallel to the substrate surface). In the case where the pre-tilt angle is 0°, the drop in the transmittance due to the difference of the tilt angle does not occur.

Example 7-6

Figure 54:
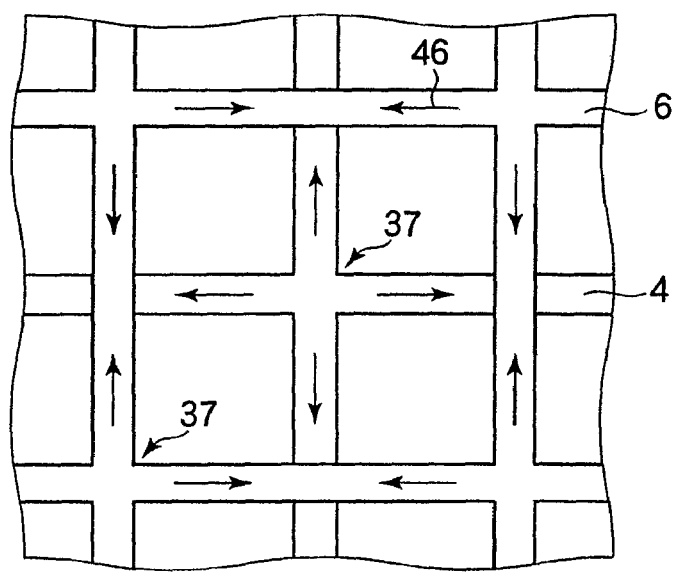
FIG. 54 is a view showing a liquid crystal panel construction according to example 7-6 of the seventh embodiment of the present invention.

This example will be described with reference to FIG. 54. This example is the same as the construction of the example 7-1 except for the following. A rubbing processing was selectively carried out onto the structural members 4 and 6. Rubbing directions 46 (indicated by arrows in the drawing) were parallel to the extending directions of the linear structural members 4 and 6, and the processing was carried out from the inside of the crossing portion 37 to the outside. By this, since the liquid crystal alignment on the structural members 4 and 6 can be stably set to have a desired orientation, the drop in the transmittance can be suppressed.

As described above, according to this embodiment, the response characteristics in the liquid crystal display for controlling the liquid crystal alignment can be improved by the structural member or the slit portion provided on the substrate.

Eighth Embodiment

Next, a liquid crystal display according to an eighth embodiment of the present invention will be described with reference to FIGS. 55 to 62. This embodiment shows optimum structural conditions of a liquid crystal panel capable of improving the display response speed of an MVA-LCD. An example of liquid crystal panel conditions of a conventional MVA-LCD is such that a cell gap d is 4.0 μm, and Δn (refractive index anisotropy) of liquid crystal is 0.0822. In the conventional MVA-LCD, since a contrast ratio when viewed from the front is very high, a viewing angle characteristic is very wide, and a response property between white and black is also fast, it is excellent as a still picture monitor of a PC (Personal Computer) or the like. However, since the response speed at a halftone (gray scale) is not good, if it is used as a monitor for coping with motion pictures, there is a case where "persistence of vision" and "display blur" occur.

Figure 55:
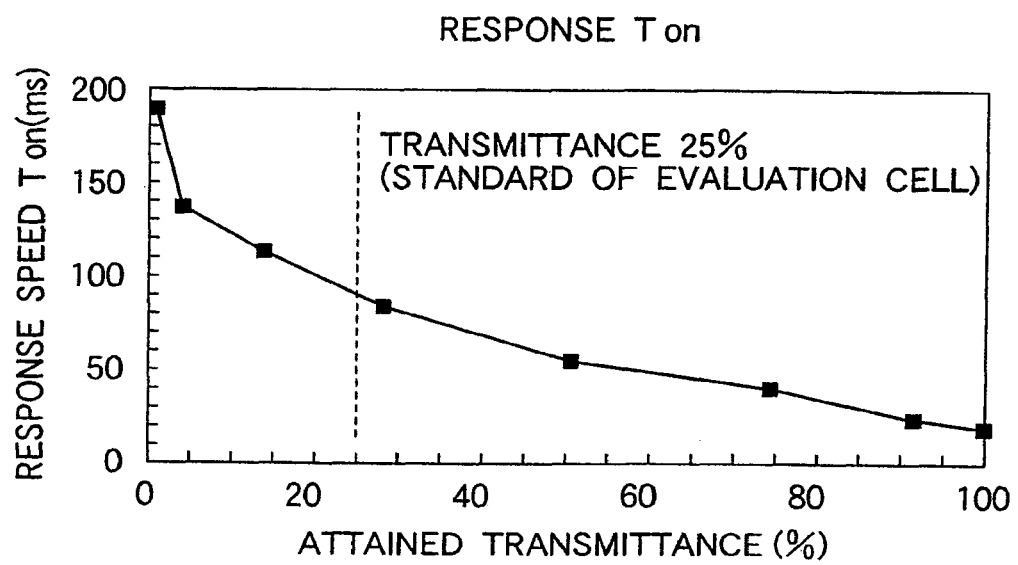
FIG. 55 is a view for explaining a problem to be solved by an eighth embodiment of the present invention.
Figure 56:
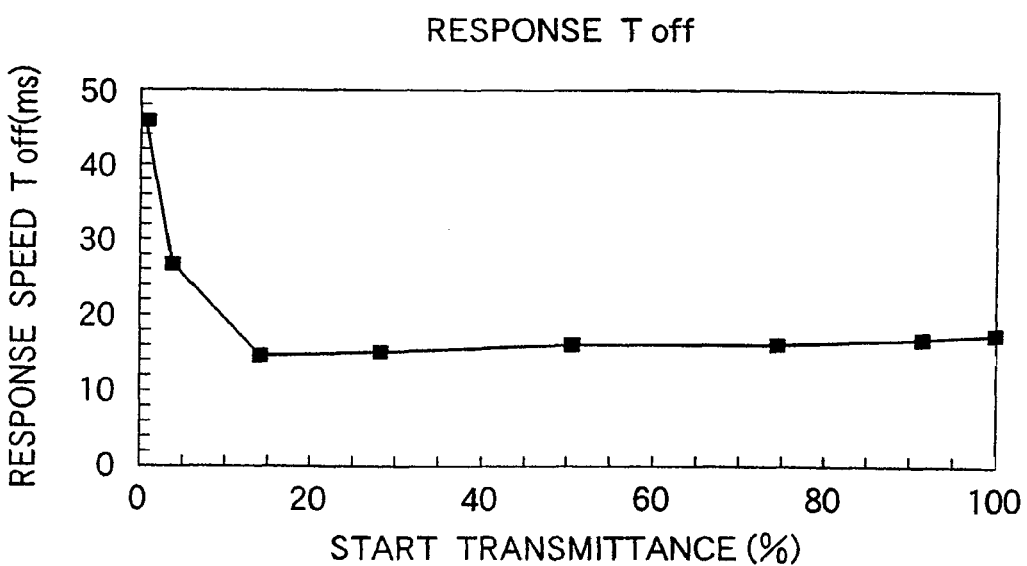
FIG. 56 is a view for explaining the problem to be solved by the eighth embodiment of the present invention.

FIGS. 55 and 56 are views for explaining a problem to be solved by this embodiment. In FIG. 55, the horizontal axis indicates the attained transmittance (%), and the vertical axis indicates the response speed Ton (ms; millisecond), and in the MVA-LCD, the drawing shows the response speed Ton from a zero gradation at which start transmittance is about 0% and a display screen is fully black to the attained transmittance of a predetermined gradation.

In FIG. 56, the horizontal axis indicates the start transmittance (%) after the change of gradation, and the vertical axis indicates the response speed Toff (ms), and in the MVA-LCD, the drawing shows the response speed Toff from a predetermined gradation to a display screen of fully black in which the attained transmittance is about 0%.

As is apparent from FIG. 55, there is a halftone at which the response speed Ton at the time when the black display is changed to gray (halftone) exceeds 100 ms. Besides, as is apparent from FIG. 56, there is a halftone at which the response speed Toff at the time when the halftone is changed to black exceed 20 ms. Especially, at the low response speed of Ton, when the liquid crystal monitor is made to produce a motion picture display, line (tail) draw or the like occurs, and a satisfactory motion display can not be obtained.

The MVA system using the vertically aligned liquid crystal molecules uses an ECB effect (Electric-field Control Birefringence effect), and in general, the response speed $\tau$ relating to the electro-optic characteristics is given by the following expression.

$$\tau_r = \eta_i d^2 / (\in_0 \cdot |\Delta\in| V^2 - K_{33}\pi^2)$$

$$\tau_d = \eta_i d^2 / (K_{33}\pi^2)$$

$\tau_r$: rising time (MVA: black→white)
$\tau_d$: falling time (MVA: white→black)
$\eta_i$: viscosity parameter
$K_{33}$: elastic parameter (bend)
d: cell gap
$\in_0$: relative dielectric constant
$\Delta\in$: dielectric anisotropy (liquid crystal material)
V: applied voltage The above expression means that if the viscosity of the liquid crystal material is made low, the cell gap is made small, the dielectric anisotropy of the liquid crystal material is made large, the applied voltage is made high, or the elastic constant is made small, the response speed $\tau$ of the liquid crystal cell becomes small and the response performance of the MVA-LCD is improved.

Conventionally, attempts to raise the response speed by decreasing the cell gap d of the MVA-LCD and decreasing the viscosity of the liquid crystal have been made. Especially, as is apparent from the above expression, if the cell gap d is made small, the effect can be obtained by the square thereof.

However, if the cell gap d is simply made small, the transmittance of the liquid crystal cell is lowered, and the display of the liquid crystal monitor or the like becomes dark. In order to prevent this, in compensation for the small cell gap d, it is necessary to use liquid crystal having large $\Delta$n. However, in the liquid crystal material having large $\Delta$n and a negative dielectric anisotropy, its viscosity is apt to become relatively large, and it becomes necessary to prevent this to a minimum.

Besides, in the MVA-LCD, even if the cell gap d is simply made small or the applied voltage is made high, as is pointed out in the foregoing embodiments, there is a case where the response time $\tau$ can not be made high by the alignment deviation ($\phi$ deviation) of liquid crystal molecules generated in the vicinity of the linear projection (bank) or the slit portion as the alignment regulating structural member. In order to avoid this and to make the cell gap d small, it is necessary to provide an alignment regulating structural member meeting various conditions.

Incidentally, in general, when the cell gap d becomes small, a time required for injecting liquid crystal into a space between two opposite glass substrates becomes long. Especially, the viscosity of the vertical alignment type liquid crystal used for the MVA system is apt to become relatively large and the time of liquid crystal injection becomes long. Accordingly, when the cell gap d is made small in the MVA-LCD, there arise a problem that a disadvantage occurs in mass production as compared with the TN type LCD or the like. Thus, it is necessary to adopt an MVA-LCD manufacturing method in which even if the cell gap d is made small, the disadvantage does not occur in the mass production process, and the manufacturing cost is also made equivalent or can be reduced.

Figure 57:
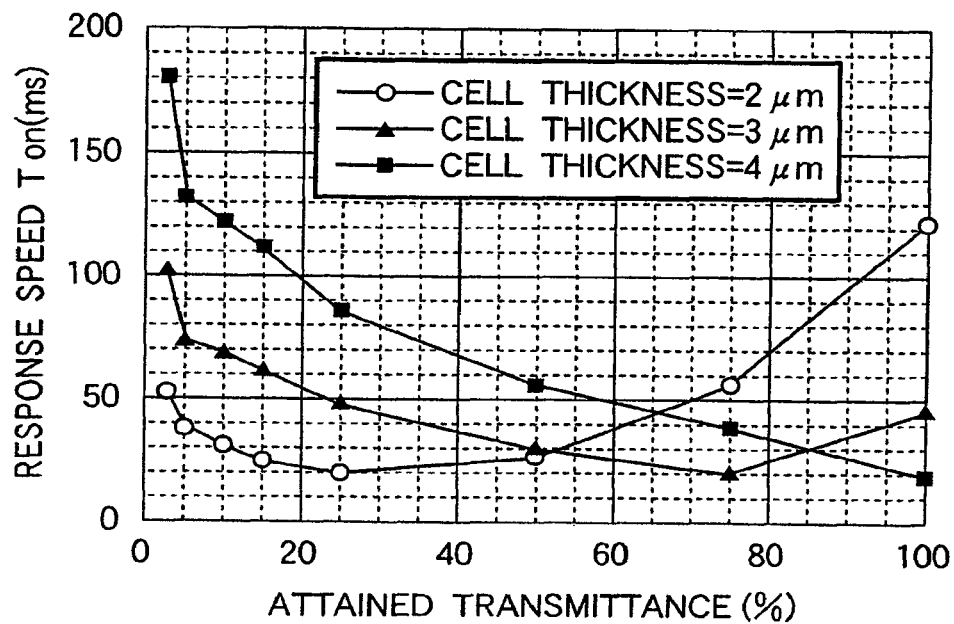
FIG. 57 is a view showing the dependency of response characteristics of a liquid crystal display on a cell gap (cell thickness) in the eighth embodiment of the present invention.

FIG. 57 is a graph showing the dependency of response characteristics of a liquid crystal display on the cell gap (cell thickness). The horizontal axis indicates the attained transmittance (%), and the vertical axis indicates the response speed Ton (ms). Table 3 shows the relation between the attained transmittance and the response speed Ton at respective cell thicknesses of the graph of FIG. 57. Incidentally, the liquid crystal material of the MVA-LCD shown in FIG. 57 and Table 3, the bank height and bank width of a bank-like alignment regulating structural member, and the gap width of the bank are formed under the same conditions as the MVA-LCD having the characteristics of FIGS. 55 and 56.

TABLE 3

| Transmittance (%) | Cell thickness = 2 µs | Cell thickness = 3 µs | Cell thickness = 4 µs |
| --- | --- | --- | --- |
| 2.5 | 52 | 103 | 180 |
| 5 | 36 | 72 | 132 |
| 10 | 30 | 68 | 121 |
| 15 | 24 | 61 | 112 |
| 25 | 19 | 47 | 85 |
| 50 | 26 | 29 | 55 |
| 75 | 55 | 20 | 38 |
| 100 | 122 | 45 | 18 |

As shown in FIG. 57 and Table 3, when the cell gap d is made small, at the side where the attained transmittance is near 0%, the response speed becomes high. However, at the point where the attained transmittance becomes 100%, the response speed does not necessarily become high. This is because when the cell gap d becomes small, in the case of a high applied voltage (for example, 5 V), an electric field of excessive intensity is applied, so that an excessive alignment occurs and it takes a time to fix the alignment direction of the liquid crystal molecules. As the cell gap d becomes small, the excessive electric field is applied, so that the minimum point of the response speed is moved to the side of low attained transmittance. As a result of various examinations as stated above, it has been found that in the case where the cell gap d is made small, the effect on the response speed does not simply appear by the square of the cell gap d, but the influence on the realization of a high speed response is greater than that.

Incidentally, the material design of a liquid crystal material having a negative dielectric anisotropy is relatively difficult as compared with other liquid crystal materials. Thus, as a liquid crystal material satisfactorily used for a motion picture display in an active matrix type display provided with TFTs as switching elements, the upper limit of $\Delta$n is 0.15 to 0.17.

As a result of various examinations, conditions have been found in which the transmittance equivalent to the prior art can be obtained, and a high speed response at a halftone can be realized. First, it has been found that in order to satisfactorily cope with a motion picture display, it is appropriate that the cell gap d is 2.0 µm or less, and Δn of the liquid crystal material to be used is 0.1500 or more.

Besides, in the case of the liquid crystal cell of the ECB type such as the MVA system, since the transmittance depends on retardation Δn·d, very large Δn·d can not be adopted. As a result of various examinations, it has been found that as the range in which the high speed response can be realized while the characteristics of the MVA system are kept, the range in which Δn·d is from 0.30 nm to 0.42 nm is suitable.

In order to obtain the liquid crystal having the negative dielectric anisotropy and large Δn, it is effective that (1) a negative component compound having large Δn is introduced, or (2) a neutral material compound having large Δn is used.

In the case of the condition (2), it is desirable to use a liquid crystal material having no tolan system component. If a tolan system compound exists, the stability and life of the liquid crystal cell are lowered. Accordingly, a liquid crystal material having no tolan system component is advantageous for an active matrix LCD required to satisfy strict electric characteristics. Thus, it is desirable to use a liquid crystal material constituted by a liquid crystal compound containing no unsaturated bonding.

Besides, when liquid crystal molecules in the liquid crystal cell are tilted in two or more directions at the time of voltage application, the response characteristics and viewing angle characteristics become excellent, and a multi-domain structure is desirable. In order to tilt the liquid crystal molecules in multiple domains and in plural directions at the time of voltage application, it is desirable that an alignment regulating structural member such as a bank or a projection is formed on a substrate surface of at least one of two opposite substrates, or an alignment regulating structural member of a slit-like pattern formed by partially removing a pixel electrode is formed.

In general, in the MVA-LCD, the alignment regulating structural member such as the bank or the projection is formed on both of the two opposite substrates, or the alignment regulating structural member such as the bank or the projection is formed on one of the substrates, and the alignment regulating structural member of the slit-like pattern formed by partially removing an electrode is formed on the other substrate.

With respect to the response speed, it is known that to form the alignment regulating structural member such as the bank or the projection on both of the two opposite substrates is suitable. Also in the liquid crystal panel of this embodiment in which the cell gap d was made small, in the case where the alignment regulating structural member such as the bank or the projection was formed on both of the two opposite substrates, the high speed response could be most certainly obtained.

Figure 58:
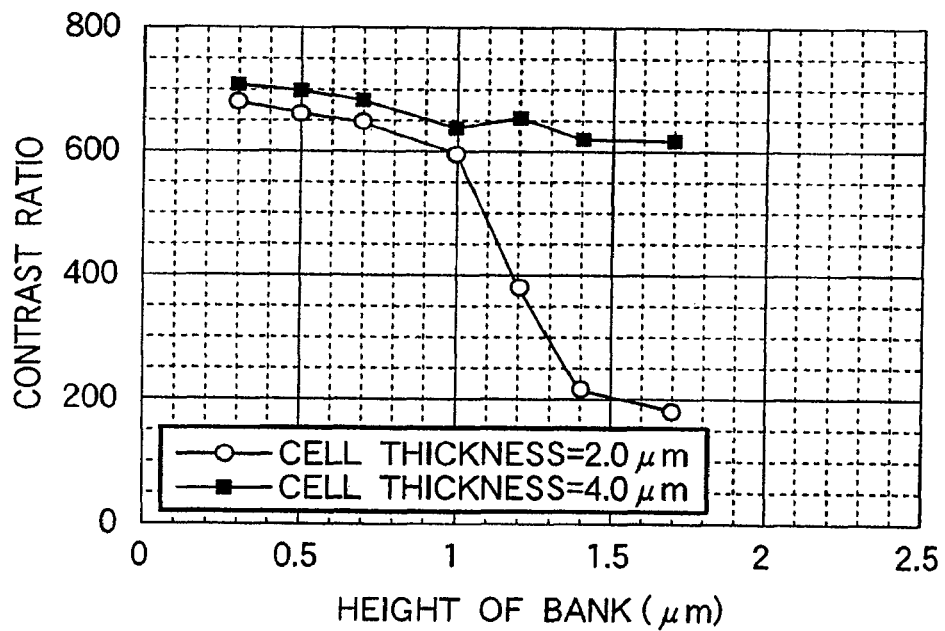
FIG. 58 is a view showing the relation between a height of a bank of a liquid crystal display and a contrast ratio in the eighth embodiment of the present invention.

FIG. 58 is a graph showing the relation between the height of a bank of a liquid crystal display and the contrast ratio. The horizontal axis indicates the height (µm) of the bank, and the vertical axis indicates the contrast ratio. Table 4 shows the relation between the height of the bank and the contrast ratio at respective cell thicknesses of the graph of FIG. 58. Incidentally, the liquid crystal material of the MVA-LCD shown in FIG. 58 and Table 4 is liquid crystal material A having a negative dielectric anisotropy, a space width between banks of a panel having a cell gap d=4 µm is 25 µm, and a space width between banks of a panel having a cell gap d=2 µm is 15 µm. The width of the bank is 10 µm in both.

From FIG. 58 and Table 4, in order to keep the contrast ratio high, it is understood that the height of the bank is also important. Even if the height of the bank is equally 1.5 µm, in the case where the cell gap d of the liquid crystal cell is large, since the influence of a taper (tilt portion) of the bank of 1.5 µm is very small, it is not concerned in light leak at the time of black display, and the contrast ratio becomes high. In the panel having the cell gap of 4.0 µm, if the height of the bank is 1.7 µm or less, a very high contrast ratio can be kept. On the other hand, when the cell gap d becomes 2.0 µm, the light leak becomes high when the height of the bank is 1.5 µm. In the case where the cell gap d is small, since the margin region of the light leak with respect to the height of the bank becomes small, in order to keep a high contrast ratio, it becomes necessary to make the height of the bank equivalent to the cell gap d or less.

TABLE 4

| | Contrast ratio | |
| --- | --- | --- |
| Height of bank | Cell thickness = 4.0 µm | Cell thickness = 2.0 µm |
| 0.3 | 701 | 674 |
| 0.5 | 692 | 658 |
| 0.7 | 680 | 645 |
| 1.0 | 638 | 593 |
| 1.2 | 655 | 380 |
| 1.4 | 620 | 212 |
| 1.7 | 613 | 181 |

With respect to the height of the bank of the alignment regulating structural member, in the conventional MVA-LCD having the cell gap d=4 µm, it is 1.3 µm to 1.5 µm. If the height of the bank of the liquid crystal panel of this embodiment having the small cell gap d is formed to be equal to the conventional bank height, the vertical alignment film on the bank acts intensely between the opposite substrates and the light leak in the black state occurs, so that the black level on a monitor display is lowered and the contrast ratio is lowered (see FIG. 58 and Table 4). Besides, when spacer dispersion or the like is considered, in order to obtain the uniform cell gap, it is desirable that the height of the bank is low, and the yield in mass production is also good. Accordingly, it is desirable that the height of the bank which realizes the high speed response and is also advantageous in mass production is 1.0 µm or less.

Figure 59:
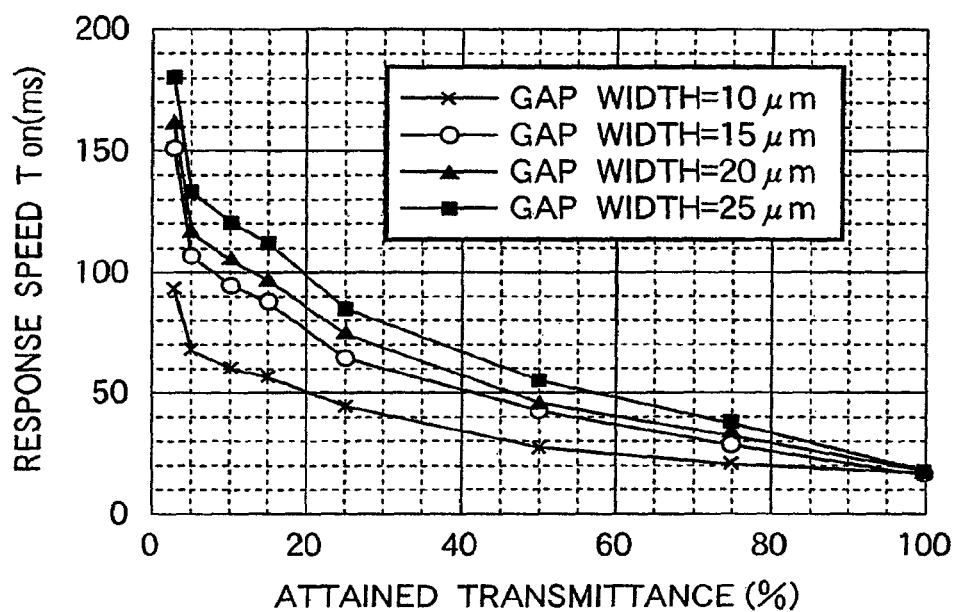
FIG. 59 is a view showing the space width (pitch) dependency of response characteristics of the liquid crystal display in the eighth embodiment of the present invention.
Figure 60:
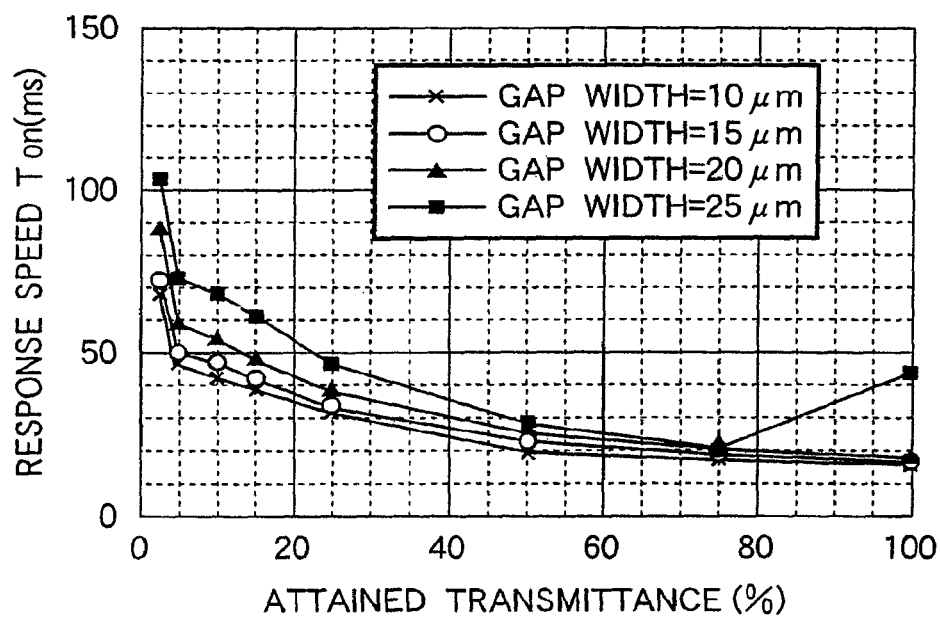
FIG. 60 is a view showing the space width (pitch) dependency of response characteristics of the liquid crystal display in the eighth embodiment of the present invention.
Figure 61:
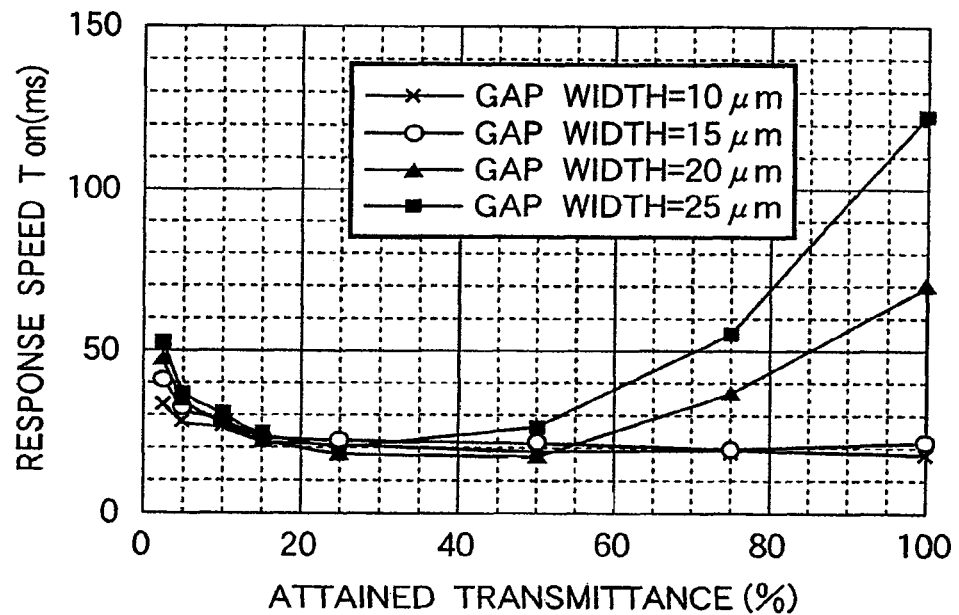
FIG. 61 is a view showing the space width (pitch) dependency of response characteristics of the liquid crystal display in the eighth embodiment of the present invention.

FIGS. 59 to 61 are graphs showing the space width (pitch) dependency of response characteristics of a liquid crystal display. The horizontal axis indicates the attained transmittance (%), and the vertical axis indicates the response speed Ton (ms). FIG. 59 shows a case of the cell gap d=4 µm, FIG. 60 shows a case of the cell gap d=3 µm, and FIG. 61 shows a case of the cell gap d=2 µm. Tables 5 to 7 respectively show the relation between the attained transmittance and the response speed Ton at respective space widths of the graphs of FIGS. 59 to 61. The liquid crystal material, the bank height, and the bank width of the MVA-LCD shown in FIGS. 59 to 61 and Tables 5 to 7 are formed under the same conditions as the MVA-LCD having the characteristics of FIGS. 55 and 56.

As is apparent from FIGS. 59 to 61 and Tables 5 to 7, when the cell gap d becomes small, since the alignment disturbance of the liquid crystal occurs at the time of voltage application, and the response speed Ton is lowered, it is necessary that the space width between adjacent alignment regulating structural members is made smaller than 25 µm of the conventional case.

In the conventional case of the cell gap d=4.0 µm shown in FIG. 57, since the response characteristics do not have a minimum point, as shown in FIG. 59, if the space width is made small, the response characteristics are directed toward the improvement as they are.

In the case where the response characteristics have a minimum point as in the case where the cell gap d is 3.0 µm or 2 µm, as shown in FIGS. 60 and 61, it is effective that the space width is made small. It is conceivable that this is because the effect of the bank controlling the alignment is exerted. It is conceivable that since the liquid crystal molecules to be aligned in the ideal direction in the plane resist the intensity of the electric field in the cell gap direction, for example, even if a voltage of 5 V is applied between the substrates at both sides of the liquid crystal, a surplus alignment change is not produced, so that the effect of the cell gap is exerted. It has been found that in the case where the cell gap is 3.0 µm, the generation of a minimum point can be suppressed when the space width is 20 µm or less, and in the case where the cell gap is 2.0 µm, the generation of a minimum point can be suppressed when the space width is 15 µm or less.

Incidentally, it is not always appropriate that the space width is small. This relates to the transmittance of the liquid crystal cell and the contrast ratio. For example, when a voltage of 5 V is applied to the liquid crystal cell, as the transmittance becomes high, the display becomes bright. When the space width between the banks is made small, this transmittance becomes low. Besides, when the space width becomes small, the bank region per unit area is increased. For example, if the number of banks per pixel of the LCD becomes large, light leak portions in the black display become large, and the contrast ratio is lowered. This is because the taper portion of the bank is inclined, and the liquid crystal molecules are not aligned in the vertical direction with respect to the substrate, so that light leaks although its amount is slight, and consequently, the contrast ratio is lowered.

That is, when the number of banks per unit area is made small, the display performance is improved in both the transmittance and the contrast ratio. However, in view of the response speed, in order to prevent a minimum point from being generated, there are conditions where an optimum space width is obtained with respect to the cell gap.

TABLE 5

| Cell thickness = 4 µm | Space width = 10 µm | Space width = 15 µm | Space width = 20 µm | Space width = 25 µm |
|---|---|---|---|---|
| 2.5 | 93 | 150 | 161 | 180 |
| 5 | 68 | 107 | 116 | 132 |
| 10 | 60 | 95 | 106 | 121 |
| 15 | 57 | 88.1 | 97 | 112 |
| 25 | 44 | 64 | 75 | 85 |
| 50 | 27 | 43 | 46 | 55 |
| 75 | 21 | 28 | 35 | 38 |
| 100 | 17 | 16 | 17 | 18 |

TABLE 6

| Cell thickness = 3 µm | Space width = 10 µm | Space width = 15 µm | Space width = 20 µm | Space width = 25 µm |
|---|---|---|---|---|
| 2.5 | 68 | 72 | 88 | 103 |
| 5 | 47 | 50 | 59 | 72 |
| 10 | 42 | 47 | 55 | 68 |
| 15 | 39 | 42 | 48 | 61 |
| 25 | 32 | 33 | 38 | 47 |

TABLE 6-continued

| Cell thickness = 3 µm | Space width = 10 µm | Space width = 15 µm | Space width = 20 µm | Space width = 25 µm |
|---|---|---|---|---|
| 50 | 20 | 23 | 26 | 29 |
| 75 | 18 | 19 | 23 | 20 |
| 100 | 17 | 17 | 19 | 45 |

TABLE 7

| Cell thickness = 3 µm | Space width = 10 µm | Space width = 15 µm | Space width = 20 µm | Space width = 25 µm |
|---|---|---|---|---|
| 2.5 | 33 | 41 | 47 | 52 |
| 5 | 28 | 32 | 34 | 36 |
| 10 | 27 | 29 | 28 | 30 |
| 15 | 22 | 24 | 22 | 24 |
| 25 | 21 | 22 | 18 | 19 |
| 50 | 19 | 21 | 17 | 26 |
| 75 | 18 | 19 | 36 | 55 |
| 100 | 17 | 21 | 70 | 122 |

Figure 62:
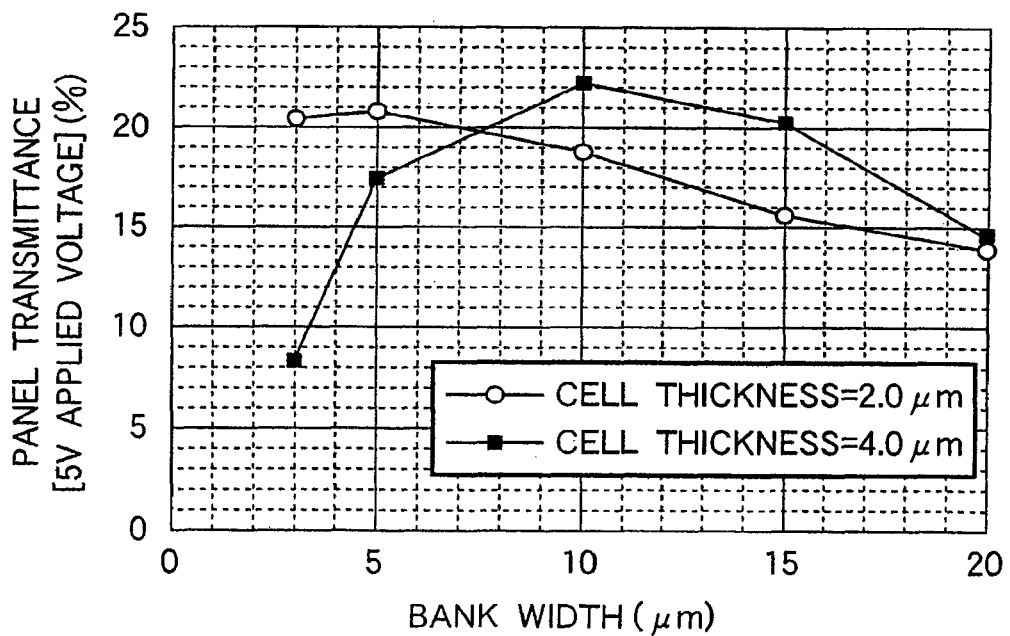
FIG. 62 is a view showing the relation between bank width and panel transmittance in the eighth embodiment of the present invention.

FIG. 62 is a graph showing the relation between the bank width and the panel transmittance. The horizontal axis indicates the bank width (µm), and the vertical axis indicates the panel maximum transmittance (%) at the time of application of 5 V. Table 8 shows the relation between the bank width and the transmittance at respective cell gaps of the graph of FIG. 62. Incidentally, the liquid crystal material of the liquid crystal panel having a cell gap d=2 µm is after-mentioned liquid crystal C, the space width between adjacent banks is 15 µm, and the bank height is 0.8 µm. On the other hand, the liquid crystal material of the liquid crystal panel having a cell gap d=4 µm is Liquid crystal A, the space width between adjacent banks is 25 µm, and the bank height is 1.5 µm.

TABLE 8

| | Transmittance (%) | |
|---|---|---|
| Bank width (µm) | Cell thickness = 4.0 µm | Cell thickness = 2.0 µm |
| 3 | 8.4 | 20.4 |
| 5 | 17.6 | 20.8 |
| 10 | 22.3 | 18.7 |
| 15 | 20.2 | 15.6 |
| 20 | 14.6 | 13.9 |

When the space width between the banks becomes short, in accordance with that, it becomes necessary to form a relatively long bank width. When the bank width is small, the loss region of the transmittance becomes small. However, the bank width also relates to the space width between the banks, and in the case where the space width is large, if the bank width is not large to that extent, the alignment in the ideal orientation can not be obtained. As in this embodiment, when the cell gap d is made small, the space width is also made small, and therefore, it becomes possible to decrease the bank width as well. As a result of examinations, as shown in FIG. 62 and Table 8, it has been found that for the stability of alignment and the prevention of luminance loss, the bank width including a manufacturing margin has only to be 3.0 µm or less.

In the case where the liquid crystal panel having a small cell gap d is fabricated, in a conventional fabrication method (vacuum dip injection method), an injection time becomes long, and from a problem of tact, eventually, the manufacturing cost is raised. Then, in the manufacture of the liquid crystal display according to this embodiment, a dropping injection method is used. The dropping injection method has a merit in that the injection time can be shortened, and especially, a liquid crystal display having an enlarged size and a narrowed space greatly receives benefit of the merit.

Further, a liquid crystal material containing a liquid crystal compound, which is suitable for the dropping injection method and has high volatility in vacuum, can be used, and by the introduction of the liquid crystal compound, the rotational viscosity ($\gamma 1$) of the liquid crystal material having the negative dielectric anisotropy can be made small and the response speed can be improved.

With respect to the liquid crystal compound having high volatility in vacuum, since the composition ratio of the liquid crystal material is changed by volatilization in the conventional vacuum dip injection process of the TN type LCD, the compound is judged to be unsuitable for mass production and is not in use. However, although a time in which the liquid crystal is put in vacuum is as long as about 6 to 7 hours in the vacuum dip injection process, it is about one minute in the dropping injection step, which is an extraordinary short time. Thus, it becomes possible to use the liquid crystal compound having volatility in vacuum, which is rather higher than that conventionally used, for mass production. As a result of examinations, it has been confirmed that when the material having high volatility is used, the rotational viscosity $\gamma 1$ of the liquid crystal can be lowered by 20 to 30 percent, and this also contributes to the improvement of the response speed of the liquid crystal cell.

It is known that in general, when $\Delta n$ of the liquid crystal material becomes high, the wavelength dependency of $\Delta n$ becomes high. This means that in the liquid crystal panel, the wavelength dependency becomes high in the voltage—transmittance characteristics as well. Even in the liquid crystal panel in which high speed can be realized, if the wavelength dependency is high, there is a case where coloring occurs by a transmission spectrum, and chromaticity characteristics are lowered. Especially, when a refractive index anisotropy in the blue wavelength region becomes high and the wavelength dependency of voltage-transmittance characteristics of blue becomes high, as compared with green or red, a color shift becomes noticeable. As a method of correcting the color shift, a space width between a structural member and a structural member in the pixel is changed, and a structural member pattern may be adopted in which the space width becomes large in order of blue, green and red. Since the blue wavelength region is substantially prominent, when the space portion pitch in only the blue portion is made smaller than that of green or red, the chromaticity characteristics are greatly improved.

Hereinafter, specific examples will be described.

Example 1

Resist S1808 (made by Shipley) was patterned and thermally hardened to form banks (width of 3 μm) on a substrate having an ITO electrode. After this substrate was subjected to an asking processing, an alignment film using vertical alignment film material X was formed by a spinner. The height of the bank was made 0.7 μm. Predetermined spacers were scattered on one of the substrates, and the substrates were bonded to each other by using a thermosetting seal material, so that empty cells were fabricated (spacer: 2.0 μm, 3.0 μm, 4.0 μm). When the substrates were bonded to each other, the intervals (alignment control) between banks and slit portions are 5 μm, 10 μm, and 15 μm. Liquid crystal material A, liquid crystal B, liquid crystal C and liquid crystal D, which were different from each other in viscosity·$\Delta n$, were respectively injected to these empty cells and were sealed, and polarizing plates were bonded in crossed Nicols, so that MVA cells were fabricated. The cell gap was obtained by a cell thickness measurement device of Oak Seisakusho Co., Ltd. The combinations of the liquid crystal B, the liquid crystal C, the liquid crystal D and the cell gap are made such that $\Delta n \cdot d$ values become equal to each other.

Here, Table 9 shows characteristics of the liquid crystals A, B, C and D.

TABLE 9

Physical property values of liquid crystal materials

| | Liquid crystal A | Liquid crystal B | Liquid crystal C | Liquid crystal D |
|---|---|---|---|---|
| NI point | 71° C. | 70° C. | 90° C. | 70° C. |
| $\Delta n$ | 0.0822 | 0.1321 | 0.1535 | 0.1669 |
| $\Delta \epsilon$ | -3.8 | -3.8 | -5.0 | -4.1 |
| $K_{11}$ | 13.6 | 11.3 | 14.7 | 12.6 |
| $K_{33}$ | 14.7 | 14.7 | 21.0 | 17.7 |
| $\gamma 1$ | 135 | 187 | 320 | 234 |

T-V characteristics of the respective MVA cells were measured, a voltage of 5.4 V causing an actual white display was made 100%, and response times from 0% to 25%, 50%, and 100% were measured. As a result, it has been found that as compared with the case where the cell gap is large (4.0 μm), as the cell gap becomes small, the speed becomes high especially in the halftone region. In the case where the cell gap is small, the dependency on liquid crystal viscosity becomes low, and restriction to the liquid crystal material used for the MVA cell is relaxed.

Since an alignment blur occurs at the time of high voltage application when the space pitch between a bank portion and a bank portion exceeds 15 μm, it has been found that the space pitch is desirably 15 μm or less. When the space pitch is less than 15 μm, since the transmittance at the time of voltage application in the T-V characteristics is lowered, it is desirable that the space pitch is made 15 μm.

When the width of the bank portion was 3 μm or more, the transmittance was lowered as well, and a desirable tendency was not obtained. In the case where the height of the bank was 1.0 μm or more, since the transmittance at the time of no voltage application was high, and the light leak occurred, the contrast ratio became small, and an excellent result was not obtained.

As described above, according to the liquid crystal display of this embodiment, the response speed can be made high, and especially, "persistence of vision" and "display blur" which are the problem in the halftone display can be relieved, and the display performance of the MVA-LCD can be improved.

Ninth Embodiment

Next, an LCD according to a ninth embodiment of the present invention will be described with reference to FIGS. 63 to 72D. This embodiment relates to panel construction conditions of the LCD, and especially relates to the improvement of the response speed of the VA system LCD using a liquid crystal having a negative dielectric anisotropy.

Since the VA system LCD using the liquid crystal having the negative dielectric anisotropy has a high contrast and excellent response characteristics, various systems have been developed. Especially, the MVA-LCD using multiple domains is excellent in viewing angle characteristics, and is mass-produced as a high performance liquid crystal monitor.

With the advancement of multimedia in recent years, the demand for a motion picture monitor from a still picture monitor has been raised, an LCD which completes a response in one frame (16.7 ms) has been required. The improvement of the response characteristics of the TN type and the IPS type have been advanced, and also in the MVA-LCD, the improvement of the response characteristics is desired.

Figure 63:
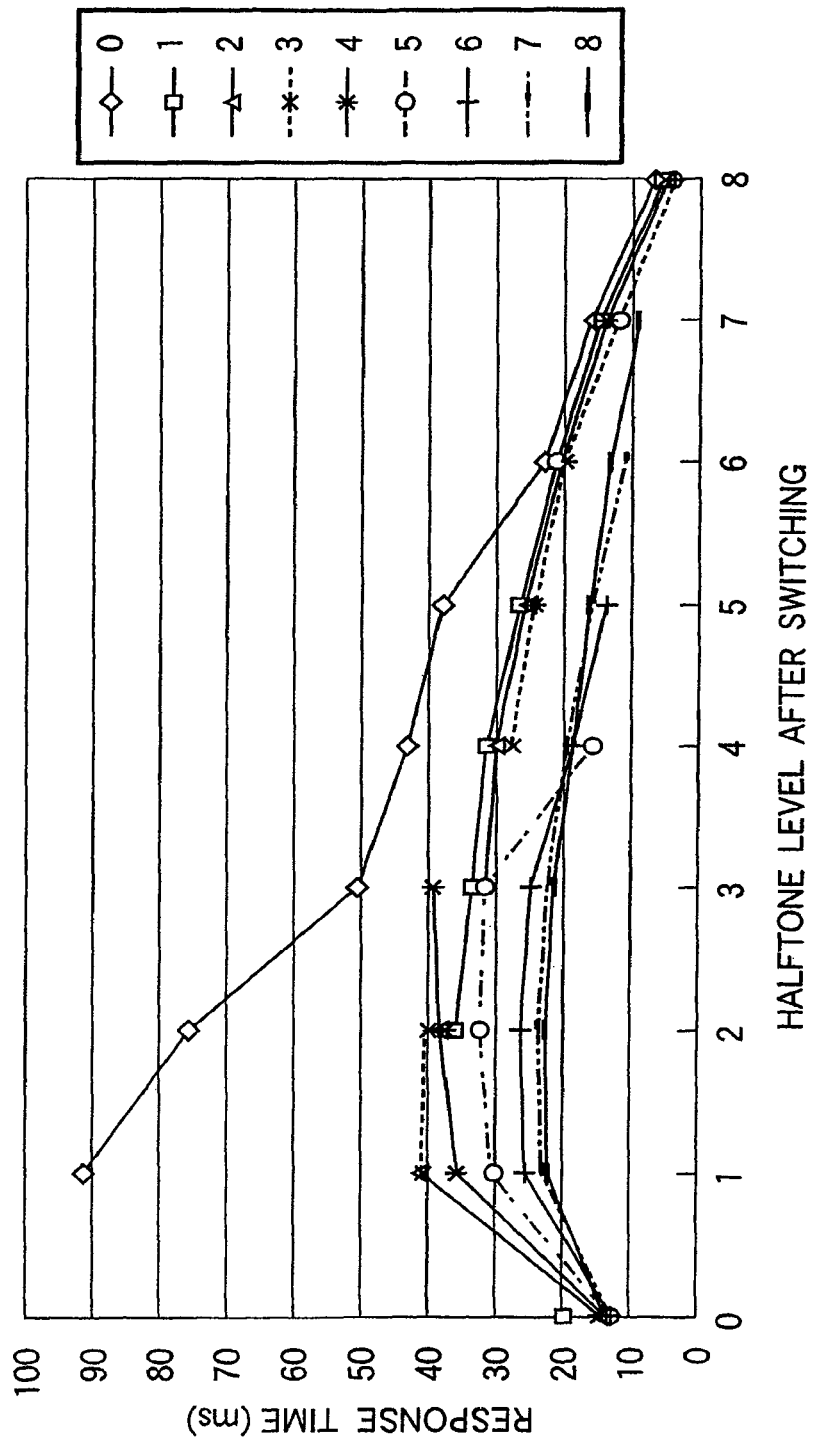
FIG. 63 is a view for explaining a problem to be solved by a ninth embodiment of the present invention.
Figure 64:
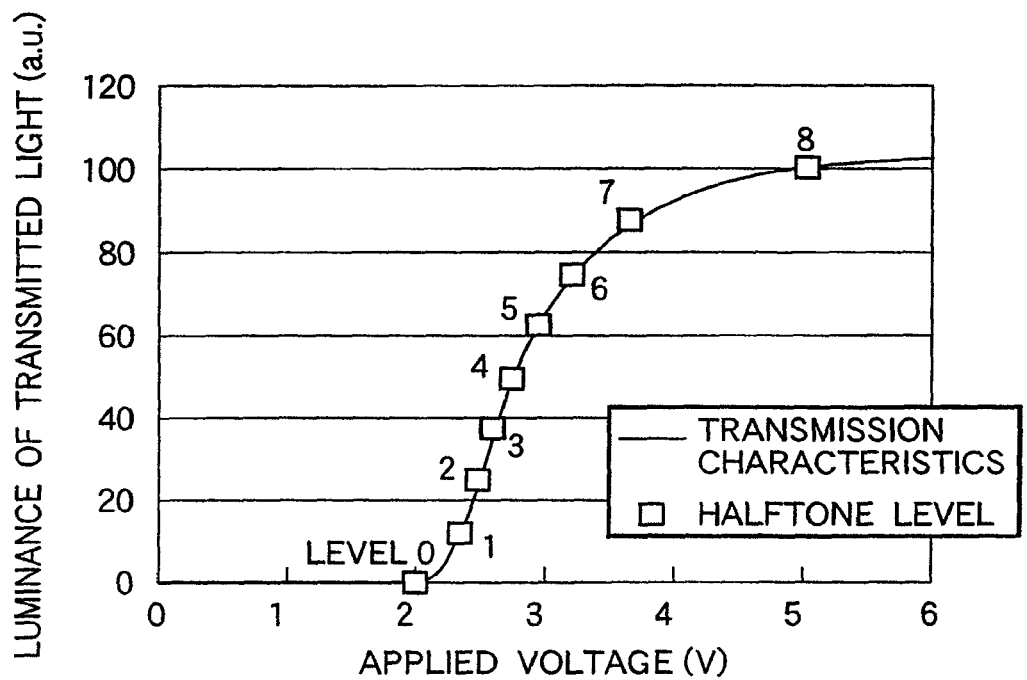
FIG. 64 is a view for explaining the problem to be solved by the ninth embodiment of the present invention.

FIG. 63 explains a problem to be solved by this embodiment, and shows the response characteristics of an MVA-LCD at respective halftone levels before switching. The horizontal axis indicates the halftone level after switching, and the vertical axis indicates the response time (ms) required before and after switching. Here, the definition of a halftone is illustrated in FIG. 64. FIG. 64 shows the luminance of transmitted light with respect to the applied voltage in the MVA-LCD, and shows respective halftone levels. The horizontal axis indicates the applied voltage (V), and the vertical axis indicates the luminance of transmitted light (a.u.). As shown in FIG. 63, when a complete white display (halftone level 8) is obtained, the response time is short irrespective of the halftone level before the switching. However, when a halftone display is obtained, since a response time of several tens ms or longer is required, persistence of vision, display blur or the like is caused on a monitor screen. Especially, when the switching is performed from the halftone level 0 to a low halftone level such as the halftone levels 1 and 2, a long response time is required.

Figure 65:
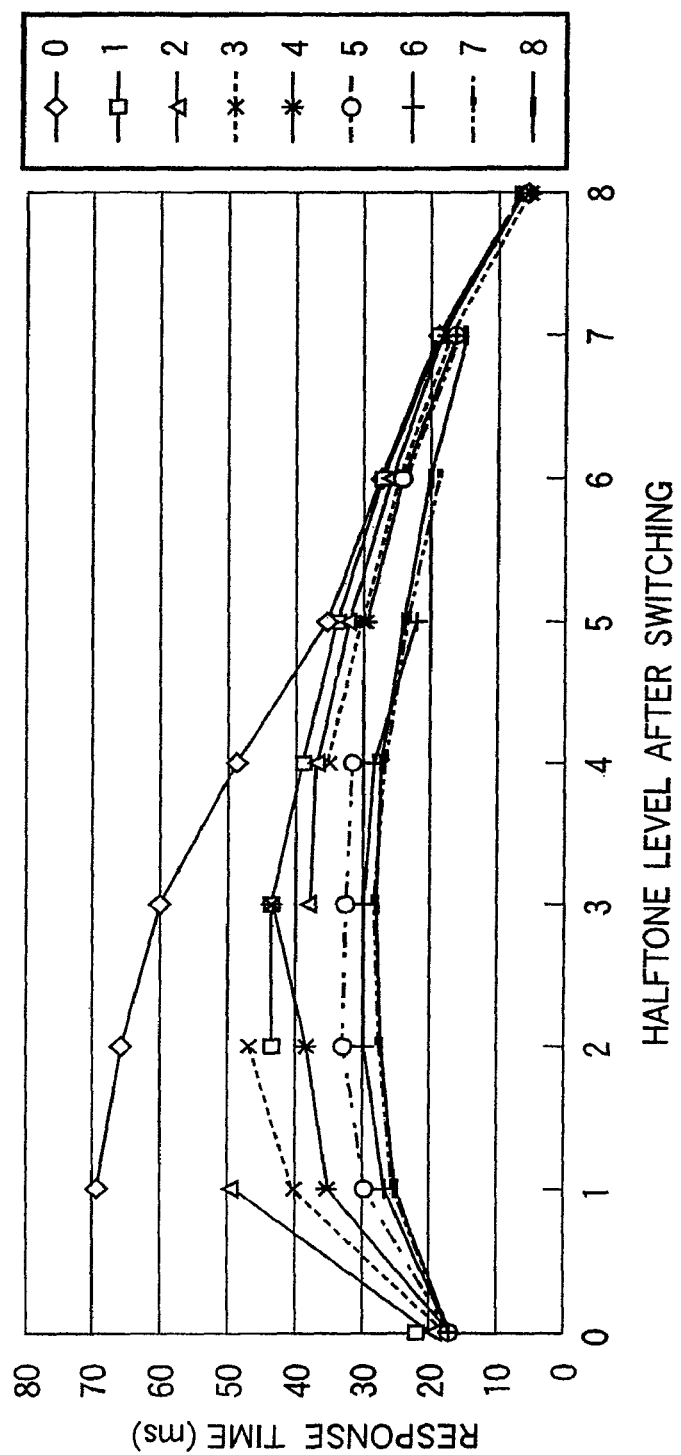
FIG. 65 is a view for explaining the problem to be solved by the ninth embodiment of the present invention.

Besides, FIG. 65 explains a problem to be solved by this embodiment, and shows the response characteristics of a VA system LCD at respective halftone levels before switching. Similarly to FIG. 63, the horizontal axis indicates the halftone level after the switching, and the vertical axis indicates the response time (ms). As shown in FIG. 65, when a complete white display (halftone level 8) is obtained, the response time is short irrespective of the halftone level before the switching. However, when a halftone display is obtained, since a response time of several tens ms or longer is required, persistence of vision, display blur or the like is caused on a monitor screen. Especially, when the switching is performed from the halftone level 0 to a low halftone level such as the halftone levels 1 and 2, a long response time is required.

The response characteristics of the VA system LCD using the liquid crystal having the negative dielectric anisotropy depends on parameters such as rotational viscosity $\gamma_1$ of a liquid crystal material, elastic constant $K_{11}$ of a spray, elastic constant $K_{33}$ of a bend, and dielectric anisotropy $\Delta\in$. However, since these parameters have correlations between them, it is difficult to optimize all the parameters.

The VA system LCD using the liquid crystal having the negative dielectric anisotropy has response characteristics capable of responding in one frame at all gradations when rotational viscosity $\gamma_1$ (unit is mPa·s) of a liquid crystal material, elastic constant $K_{11}$ (unit is pN) of a spray, elastic constant $K_{33}$ (unit is pN) of a bend, dielectric anisotropy $\Delta\in$, and a cell gap d (unit is μm) satisfy $$(\gamma_1-1.1)\times(K_{11}+233.7)\times(K_{33}+36.9)\times(d-1.1)\times(\Delta\in^4+31.7\Delta\in^3+370.8\Delta\in^2+1948.6\Delta\in+4304.2) \leq 8.8\times10^8. \quad \text{(expression 3)}$$

Besides, the MVA-LCD in which the liquid crystal having the negative dielectric anisotropy is sandwiched between two substrates each having a surface subjected to a vertical alignment processing, and an alignment regulating structural member is formed on at least one substrate surface, has response characteristics capable of responding in one frame at all gradations when rotational viscosity $\gamma_1$ (unit is mPa·s) of a liquid crystal material, elastic constant $K_{11}$ (unit is pN) of a spray, elastic constant $K_{33}$ (unit is pN) of a bend, dielectric anisotropy $\Delta\in$, and a cell gap d (unit is μm) satisfy $$(\gamma_1-1.1)\times(K_{11}+875.6)\times(K_{33}+50.6)\times(d^4+2.7d^3+9.5d^2+430.8d+524.1)\times(\Delta\in^4+31.74\Delta\in^3+370.8\Delta\in^2+1948.6\Delta\in+4304.2) \leq 1.6\times10^{12}. \quad \text{(expression 4)}$$

Hereinafter, specific examples will be described.

Example 9-1

Figure 66:
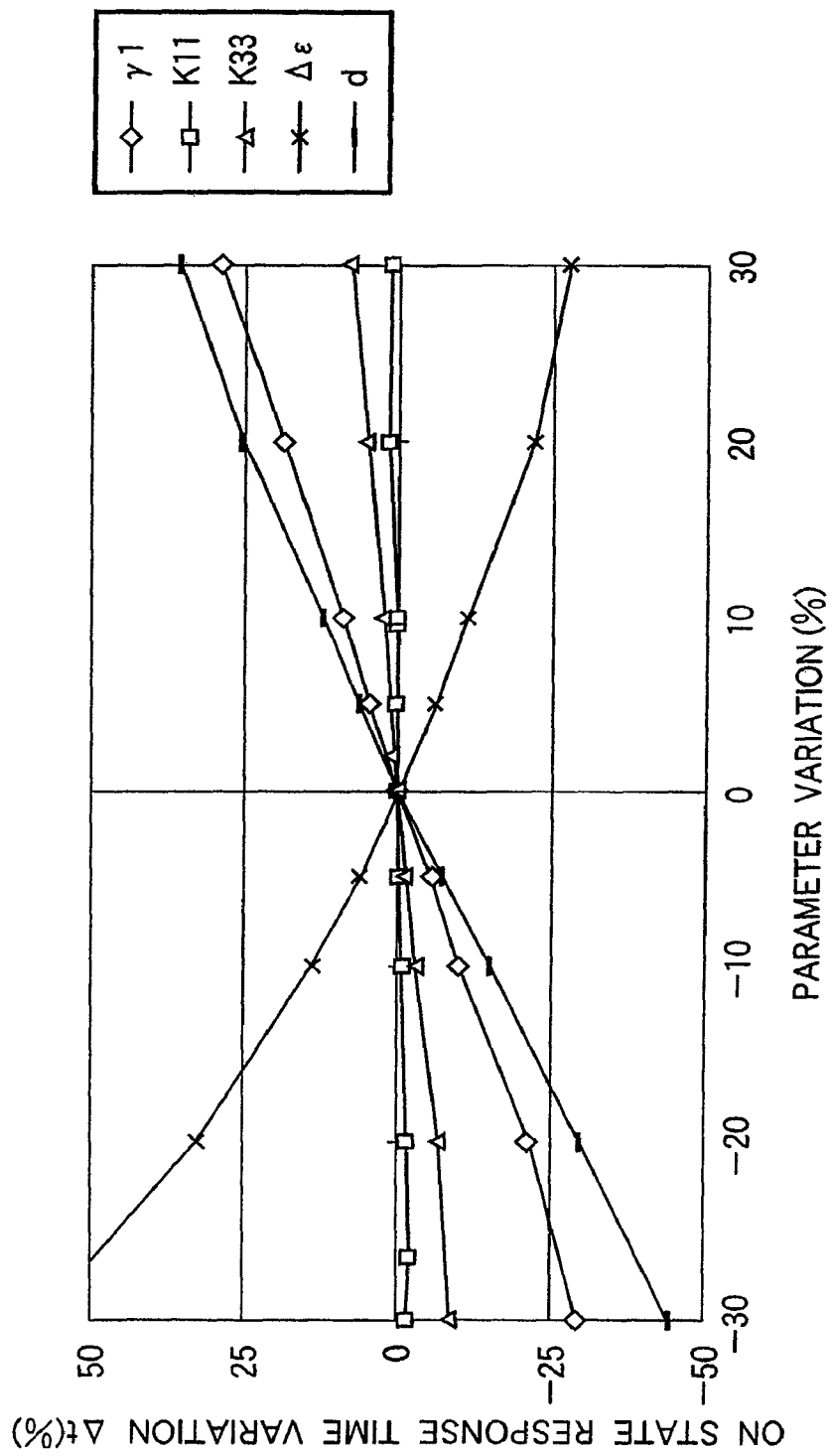
FIG. 66 is a view showing the parameter dependency of an on state response time in a VA system LCD in the ninth embodiment of the present invention.

With respect to the response time of a VA system LCD, the dependency on rotational viscosity $\gamma_1$ of a liquid crystal material, elastic constant $K_{11}$ of a spray, elastic constant $K_{33}$ of a bend, dielectric anisotropy $\Delta\in$, and a liquid crystal layer thickness d was simulated. FIG. 66 shows parameter dependency of an on state response time in the VA system LCD. The horizontal axis indicates the parameter variation (%), and the vertical axis indicates the on state response time variation $\Delta t$(%). As reference values of $\gamma_1$, $K_{11}$, $K_{33}$, $\Delta\in$ and d, typical values of a liquid crystal material having a negative dielectric anisotropy shown in Table 10 were used.

TABLE 10

| | | |
|---|---|---|
| $\gamma_1$ | 150 | mPa·s |
| $K_{11}$ | 12 | pN |
| $K_{33}$ | 12 | pN |
| $\Delta\epsilon$ | −3 | |
| d | 4 | μm |

As shown in FIG. 66, the degrees of influence of the respective parameters on the response characteristics are greatly different from one another. Besides, as shown in FIG. 65, under the conditions shown in Table 10, the response time from the halftone level 0 to the halftone level 1, which requires the longest time in the response characteristics of the VA system LCD, was 69.5 ms.

A variation of the response time in the on state by $\gamma_1$ is made $\Delta t(\gamma_1)$. A variation of the response time in the on state by $K_{11}$ is made $\Delta t(K_{11})$, and a variation of the response time in the on state by $K_{33}$ is made $\Delta t(K_{33})$. Besides, a variation of the response time in the on state by $\Delta\in$ is made $\Delta t(\Delta\in)$, and a variation of the response time in the on state by d is made $\Delta t(d)$. When the least square method is used for the results obtained in FIG. 66, $\Delta t(\gamma_1)$, $\Delta t(K_{11})$, $\Delta t(K_{33})$, $\Delta t(\Delta\in)$, and $\Delta t(d)$ are respectively expressed as follows:

$$\Delta t(\gamma_1)=7.4667\times10^{-3}\gamma_1-1.008 \quad \text{(expression 5)}$$

$$\Delta t(K_{11})=4.044\times10^{-3}K_{11}-0.055 \quad \text{(expression 6)}$$

$$\Delta t(K_{33})=1.938\times10^{-2}K_{33}-0.285 \quad \text{(expression 7)}$$

$$\Delta t(\Delta\in)=1.3826\times10^{-3}\Delta\in^4+4.3821\times10^{-2}\Delta\in^3+51.2690\times10^{-2}\Delta\in^2+2.6942\Delta\in+4.9511 \quad \text{(expression 8)}$$

$$\Delta t(d)=0.339d-1.354 \quad \text{(expression 9)}$$

If the response time from the halftone level 0 to the halftone level 1, which is the slowest response time, is 16.7 ms or less, a response in one frame can be realized at all gradations. When the response time variation by all the parameters is considered, a variation f of the response time in the VA system LCD when $\gamma_1$, $K_{11}$, $K_{33}$, $\Delta\in$ and d are changed is expressed as follows:

$$f=[1+\Delta t(\gamma_1)]\cdot[1+\Delta t(K_{11})]\cdot[1+\Delta t(K_{33})]\cdot[1+\Delta t(\Delta\in)]\cdot[1+\Delta t(d)] \quad \text{(expression 10)}$$

Since the response time from the halftone level 0 to the halftone level 1, which is the slowest response time, is 69.5 ms, in order to make this 16.7 ms or less, the following condition must be satisfied.

[Mathematical formula 1]

$$f \leq 1-(69.5-16.7)/69.5 \quad \text{(expression 11)}$$

When the expressions (5) to (10) are substituted for the expression (11), the following expression is obtained.

$$(\gamma_1-1.1)\times(K_{11}+233.7)\times(K_{33}+36.9)\times(d-1.1)\times(\Delta\epsilon^4 + 31.7\Delta\epsilon^3+370.8\Delta\epsilon^2+1948.6\Delta\epsilon+4304.2) \leq 8.8\times 10^8 \quad \text{(expression 12)}$$

Example 9-2

A VA system LCD was fabricated by using a liquid crystal material shown in Table 11. As an alignment film, a vertical alignment film material X was used, and rubbing was performed six times (extrusion amount of 0.2 mm) with nylon. Table 11 shows parameters of the liquid crystal material. In any of liquid crystals 1 to 5 shown in Table 11, the expression (12) is established.

TABLE 11

| | Liquid crystal 1 | Liquid crystal 2 | Liquid crystal 3 | Liquid crystal 4 | Liquid crystal 5 |
|---|---|---|---|---|---|
| $\gamma_1$ (mPa·s) | 178 | 135 | 99 | 99 | 72 |
| $K_{11}$ (pN) | 13.0 | 13.6 | 10.7 | 7.9 | 8.8 |
| $K_{33}$ (pN) | 14.9 | 14.7 | 12.9 | 9.6 | 10.5 |
| $\Delta\epsilon$ | −3.7 | −3.8 | −3.4 | −2.3 | −2.9 |
| d (μm) | 1.6 | 1.7 | 2.0 | 1.5 | 2.0 |

Figure 67:
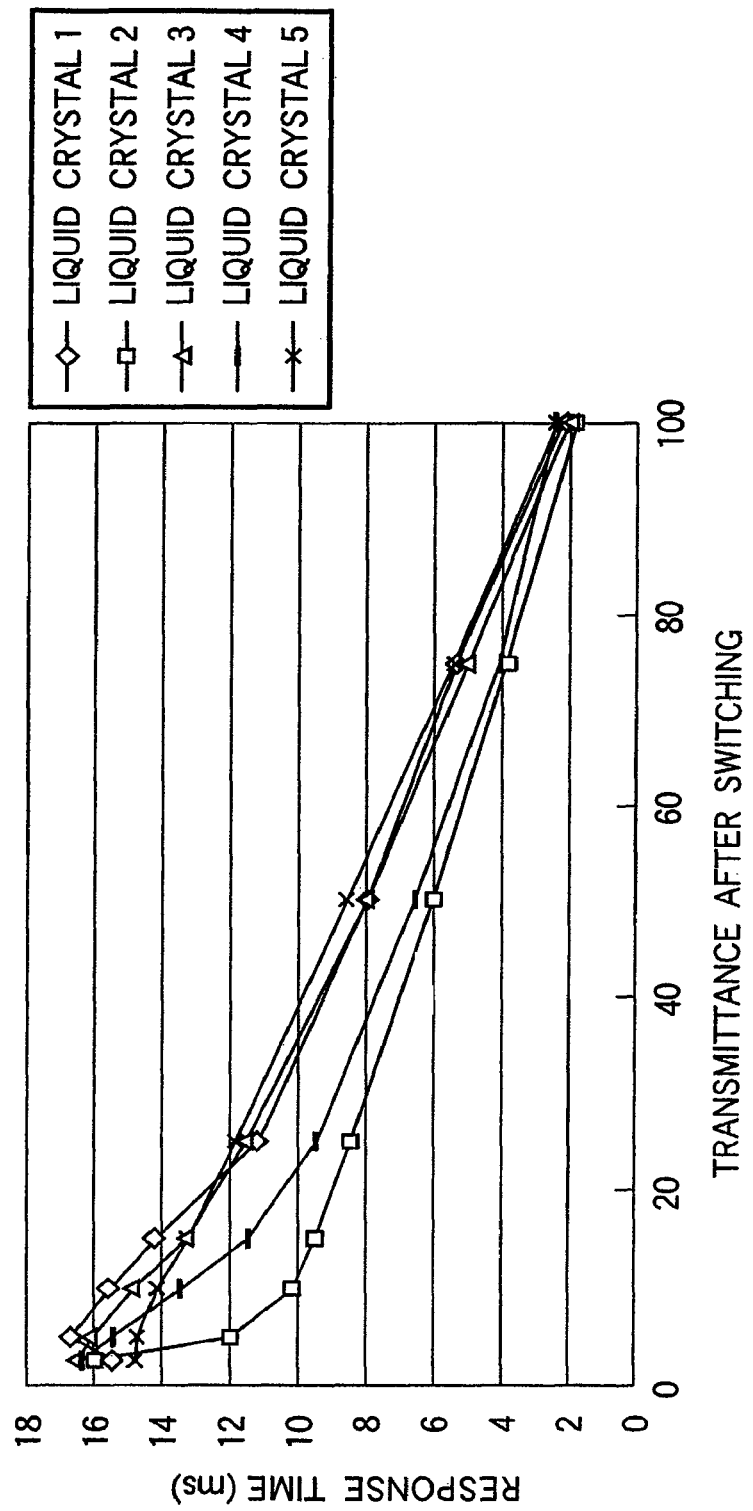
FIG. 67 is a view showing the response characteristics of a VA system LCD using a liquid crystal shown in Table 11 in the ninth embodiment of the present invention.

FIG. 67 shows results obtained when the response characteristics in the on state are measured. FIG. 67 shows the response characteristics of the VA system LCD using the liquid crystals 1 to 5 shown in Table 11 for every liquid crystal material. The horizontal axis indicates the transmittance (%) after switching, and the vertical axis indicates the response time (ms). Here, the transmittance before switching (black display state at an applied voltage of 0 V) is made 0%, and the transmittance when the applied voltage is 5 V is made 100%. As shown in FIG. 67, in any cases, the response characteristics of 16.7 ms or less are realized, and the validity of the expression (12) can be confirmed.

In the liquid crystal materials shown in Table 11, in order to improve the response characteristics, the respective parameters are assumed to be realistic. In the liquid crystal 1, a case where the rotational viscosity $\gamma_1$ is large is assumed, and the cell gap d is made small so that the response characteristics are improved. In the liquid crystal 2, the dielectric anisotropy $\Delta\epsilon$ is made large so that the response characteristics are improved. In the liquid crystal 3, the rotational viscosity $\gamma_1$ is made small so that the response characteristics are improved. In the liquid crystal 4, if $\gamma_1$ is made small in an actual liquid crystal material, the elastic constants $K_{11}$, $K_{33}$ and $\Delta\epsilon$ tend to decrease, and accordingly, the cell gap d is made small so that the response characteristics are improved. In the liquid crystal 5, $\gamma_1$ is made smaller than that of the liquid crystal 3 so that the response characteristics are improved.

Example 9-3

Figure 68:
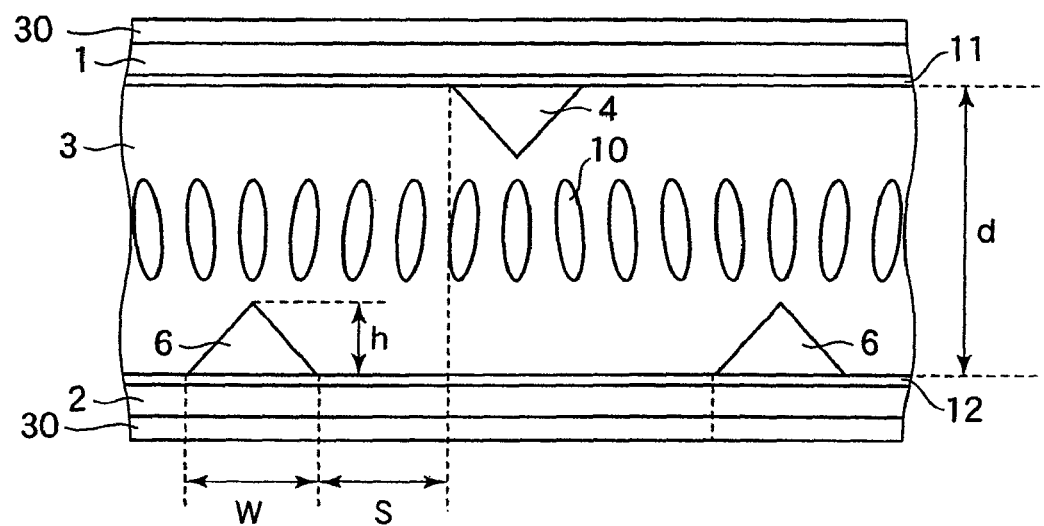
FIG. 68 is a view showing a sectional construction of an MVA-LCD in the ninth embodiment of the present invention.

FIG. 68 shows a sectional construction of an MVA-LCD. A liquid crystal layer 3 is sealed between two glass substrates 1 and 2 which have a predetermined cell gap d and are bonded opposite to each other. Transparent electrodes 11 and 12 made of ITO are respectively formed on opposite surfaces of the two opposite substrates 1 and 2. Besides, polarizing plates 30 arranged in crossed Nicols are formed on outside surfaces of both the substrates. A plurality of linear projections 4 are formed on the transparent electrode 11 of the substrate 1. On the other hand, a plurality of linear projections 6 arranged at the same pitch as the linear projections 4 and shifted from the linear projections 4 by a half pitch are formed on the transparent electrode 12 of the substrate 2. Each of the linear projections 4 and 6 is formed to have a width w and a height h. The linear projections 4 and the linear projections 6 have spaces s in a substrate surface direction.

Figure 69:
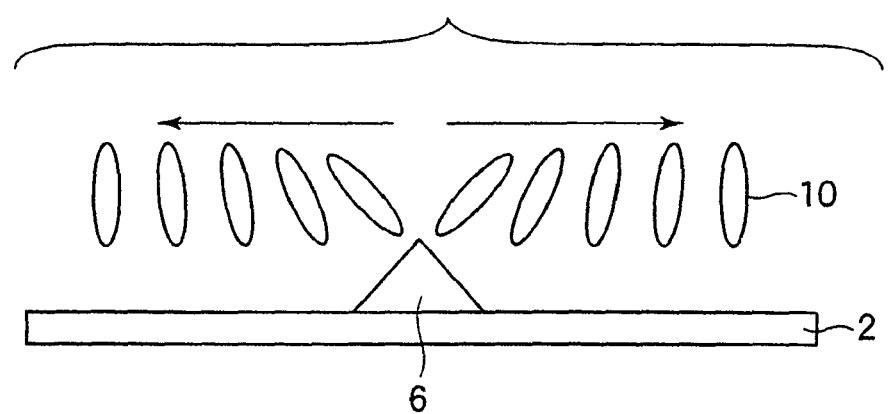
FIG. 69 is a view showing the propagation state of the tilt of liquid crystal molecules in the MVA-LCD in the ninth embodiment of the present invention.

FIG. 69 shows a propagation state of tilts of liquid crystal molecules in the MVA-LCD. As shown in FIG. 69, since the tilt of the liquid crystal molecule in the vicinity of the linear projection 6 in a predetermined orientation is successively propagated to the space s between the linear projections 4 and 6 shown in FIG. 68, the MVA-LCD has response characteristics different from the VA system.

Figure 70:
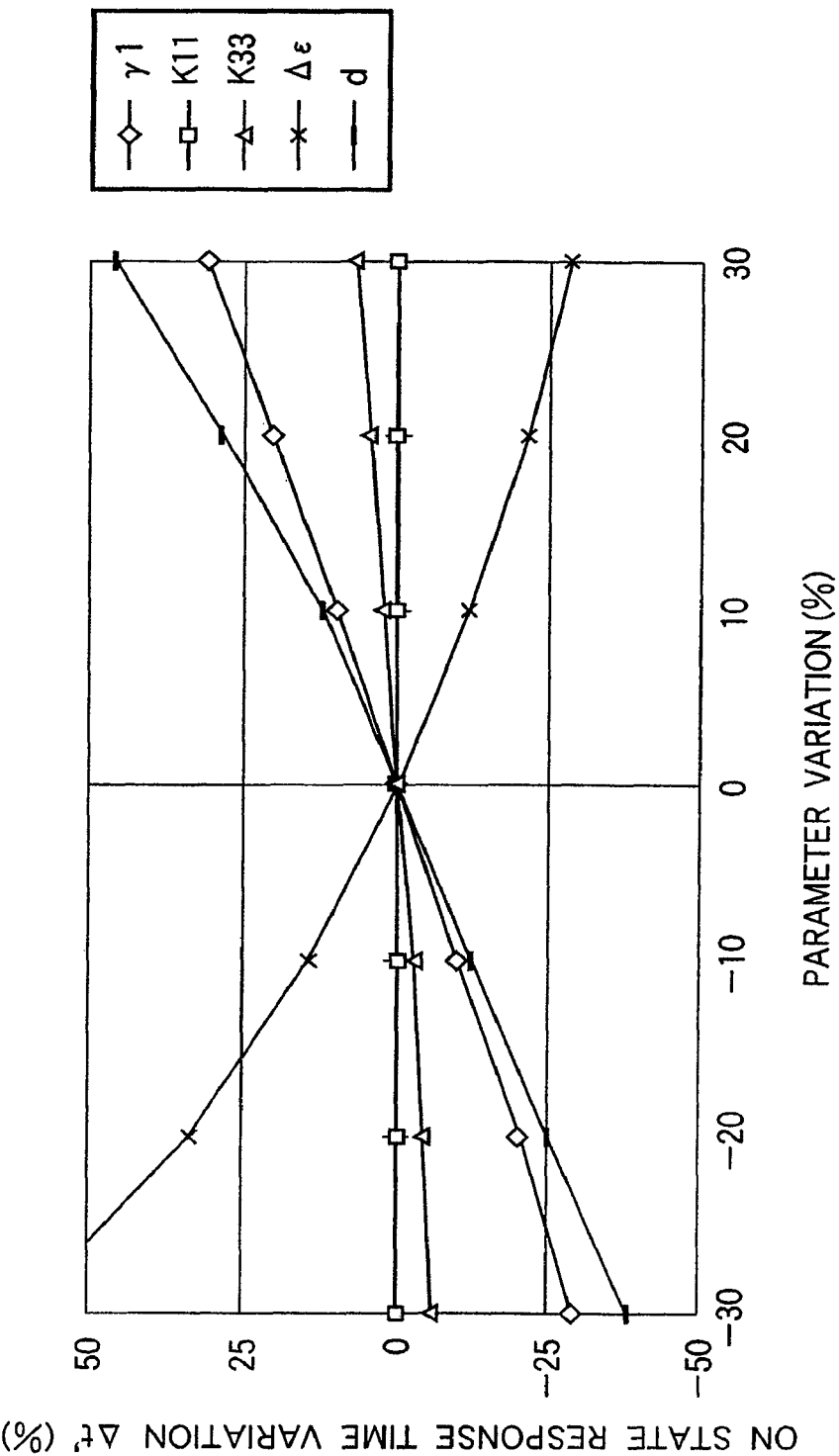
FIG. 70 is a view showing the parameter dependency of an on state response time in the MVA-LCD in the ninth embodiment of the present invention.

With respect to the response time of the MVA-LCD shown in FIG. 68, the dependency on rotational viscosity $\gamma_1$ of a liquid crystal material, elastic constant $K_{11}$ of a spray, elastic constant $K_{33}$ of a bend, dielectric anisotropy $\Delta\epsilon$, and a cell gap d was simulated. Here, the space s between the linear projections 4 and 6 is set to 25 μm, the height h is set to 1 μm, and the width w is set to 5 μm, respectively, and the liquid crystal material shown in Table 10 is used as the standard. FIG. 70 shows the parameter dependency of the on state response time in the MVA-LCD. As shown in FIG. 70, the degrees of influence of the respective parameters on the response characteristics are greatly different from one another. Besides, as shown in FIG. 63, under the conditions shown in Table 10, the response time from the halftone level 0 to the halftone level 1, which required the longest time in the response characteristics of the MVA-LCD, was 91.5 ms.

A variation of the response time in the on state by $\gamma_1$ is made $\Delta t'(\gamma_1)$. A variation of the response time in the on state by $K_{11}$ is made $\Delta t'(K_{11})$, and a variation of the response time in the on state by $K_{33}$ is made $\Delta t'(K_{33})$. Besides, a variation of the response time in the on state by $\Delta\epsilon$ is made $\Delta t'(\Delta\epsilon)$, and a variation of the response time in the on state by d is made $\Delta t'(d)$. When the least square method is used for the results obtained in FIG. 70, $\Delta t'(\gamma_1)$, $\Delta t'(K_{11})$, $\Delta t'(K_{33})$, $\Delta t'(\Delta\epsilon)$ and $\Delta t'(d)$ are respectively expressed as follows:

$$\Delta t'(\gamma_1)=7.4667\times 10^{-3}\gamma_1-1.008 \quad \text{(expression 13)}$$

$$\Delta t'(K_{11})=1.125\times 10^{-3}K_{11}-0.015 \quad \text{(expression 14)}$$

$$\Delta t'(K_{33})=1.531\times 10^{-2}K_{33}-0.225 \quad \text{(expression 15)}$$

$$\Delta t'(\Delta\epsilon)=1.3826\times 10^{-3}\Delta\epsilon^4+4.3821\times 10^{-2}\Delta\epsilon^3+51.2690\times 10^{-2}\Delta\epsilon^2+2.6942\Delta\epsilon+4.9511 \quad \text{(expression 16)}$$

$$\Delta t'(d)=6.5120\times 10^{-4}d^4+1.7511\times 10^{-3}d^3+6.2138\times 10^{-3}d^2+0.28053d-0.65873 \quad \text{(expression 17)}$$

In order to realize a response in one frame at all gradations, if the response time from the halftone level 0 to the halftone level 1, which is the slowest response time, is 16.7 ms or less, the response in one frame can be realized at all gradations. When the variation of the response time by all the parameters is considered, a variation f' of the response time of the MVA-LCD when $\gamma_1$, $K_{11}$, $K_{33}$, $\Delta\epsilon$ and d are changed is expressed as follows:

$$f'=[1+\Delta t'(\gamma_1)]\cdot[1+\Delta t'(K_{11})]\cdot[1+\Delta t'(K_{33})]\cdot[1+\Delta t'(\Delta\epsilon)]\cdot[1+\Delta t'(d)] \quad \text{(expression 18)}$$

Since the response time from the halftone level 0 to the halftone level 1, which is the slowest response time, is 91.5 ms, in order to make this 16.7 ms or less, the following condition has only to be satisfied.

[Mathematical formula 2]

$$f' \le 1-(91.5-16.7)/91.5 \quad \text{(expression 19)}$$

When the expressions (13) to (18) are substituted for the expression (19), the following expression is obtained.

$$(\gamma_1-1.1) \times (K_{11}+875.6) \times (K_{33}+50.6) \times (d^4+2.7d^3+9.5d^2+430.8d+524.1) \times (\Delta\epsilon^4+31.7\Delta\epsilon^3+370.8\Delta\epsilon^2+1948.6\Delta\epsilon+4304.2) \le 1.6 \times 10^{12} \quad \text{(expression 20)}$$

Example 9-4

Figure 71:
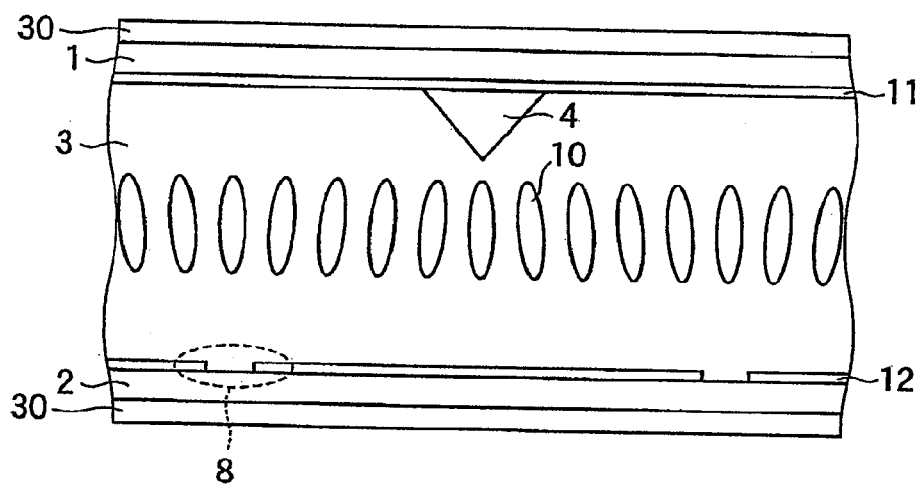
FIG. 71 is a view showing a sectional construction of the MVA-LCD in the ninth embodiment of the present invention.

FIG. 71 shows a sectional construction of an MVA-LCD according to this example. As shown in FIG. 71, in the MVA-LCD according to this example, instead of the linear projections 6 shown in FIG. 68, slits 8 are formed on the glass substrate 2. Besides, in addition to the combination of the linear projections 4 and the slits 8, even if the slits 8 are formed on both the glass substrates 1 and 2, the MVA-LCD can be realized.

Example 9-5

Figure 72A:
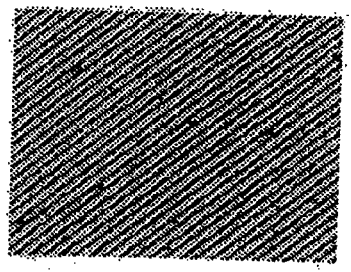
FIGS. 72A to 72D are views showing results of microscopic observation of transient response characteristics of the MVA-LCD in which a space s is changed in the ninth embodiment of the present invention.
Figure 72B:
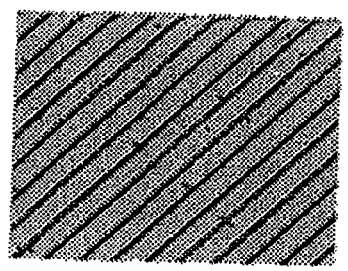
Figure 72C:
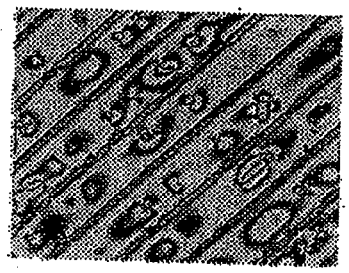
Figure 72D:
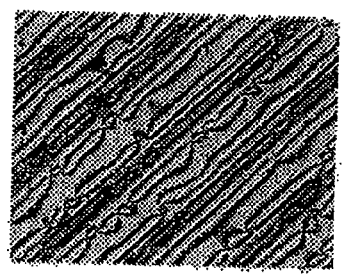
Figure 73A:
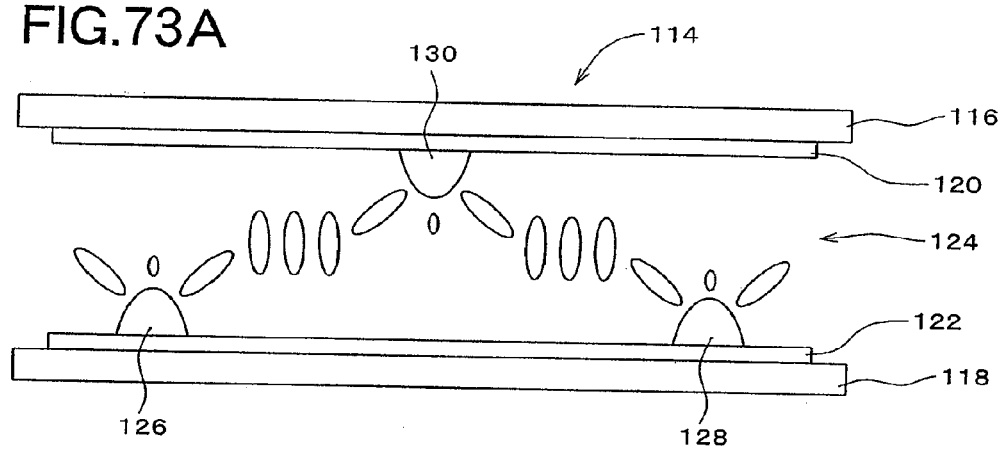
FIGS. 73A to 73C are views for explaining the reason why a halftone response of a conventional MVA-LCD is slow as compared with a conventional TN type LCD.
Figure 73B:
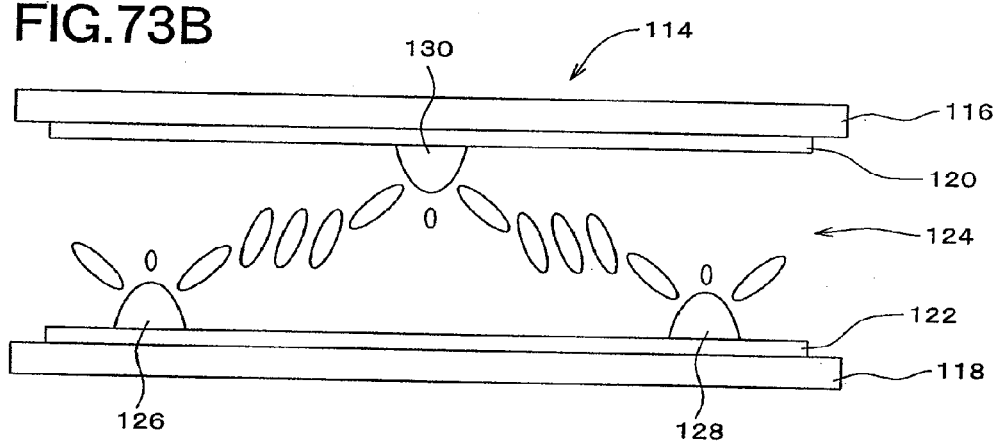
Figure 73C:
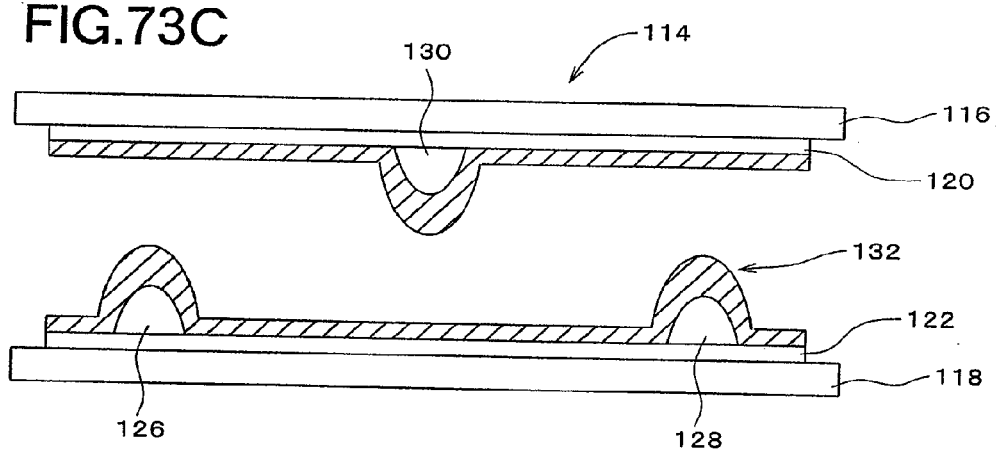
Figure 74A:
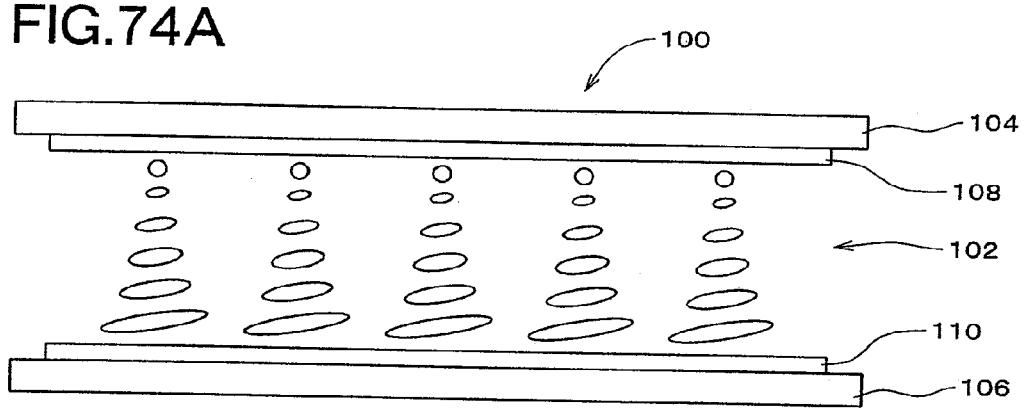
FIGS. 74A to 74C are views for explaining the reason why the halftone response of the conventional MVA-LCD is slow as compared with the conventional TN type LCD.
Figure 74B:
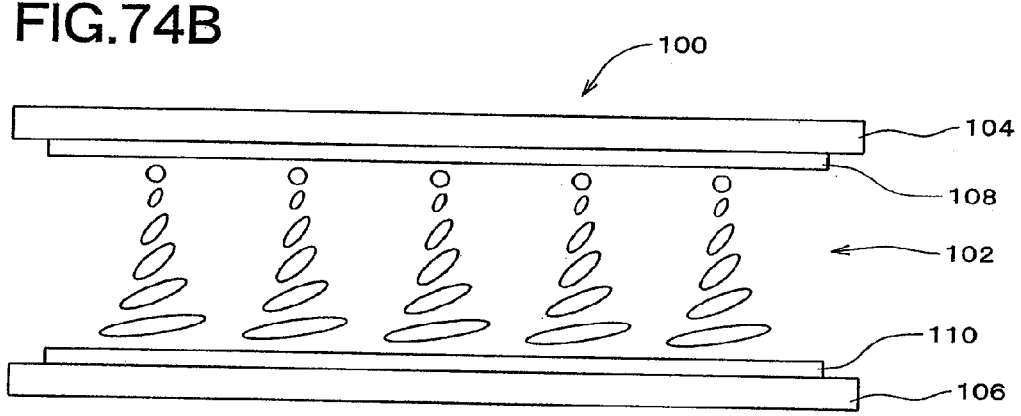
Figure 74C:
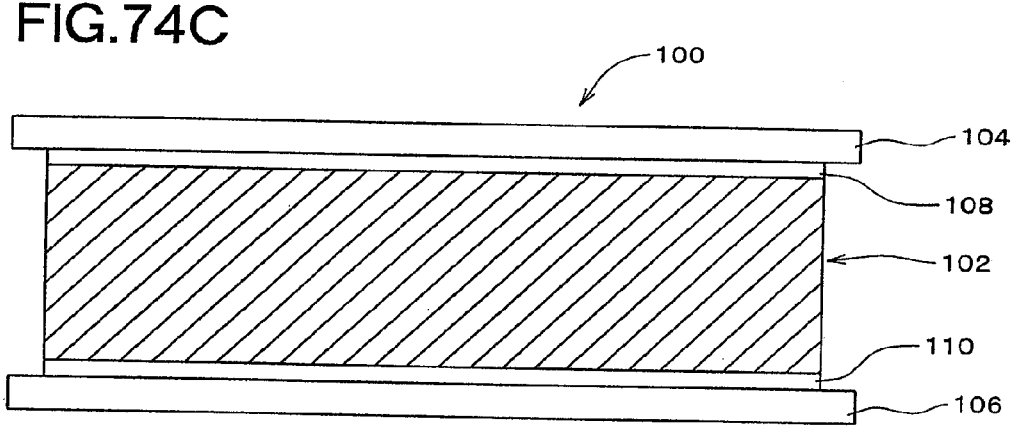

A vertical alignment film material X was used for alignment films 11 and 12, and resist LC-200 of Shipley was used for linear projections 4 and 6, so that an MVA-LCD was fabricated. Each of the linear projections 4 and 6 was formed to have a width of 5 µm and a height of 1 µm. Liquid crystal material A having a negative dielectric anisotropy was used as the liquid crystal material. FIGS. 72A to 72D show results of a microscopic observation of transient response characteristics of the MVA-LCD in which the space s is changed. FIG. 72A shows the result when the space s is 6 µm, and FIG. 72B shows the result when the space is 15 µm. FIG. 72C shows the result when the space s is 30 µm, and FIG. 72D shows the result when the space s is 45 µm. Applied voltage was made 5 V for the respective cases. As shown in FIGS. 72A to 72D, when the space s becomes 30 µm or more, a uniform alignment can not be obtained.

Table 12 and Table 13 show the relation between the space and the alignment state of liquid crystal in this example. Table 12 shows the alignment states when the space s is 15 µm or less, and Table 13 shows the alignment states when the space is 20 µm or more. In the tables, the alignment states are denoted by ○, Δ and x. The symbol ○ denotes that a uniform alignment is obtained, and Δ denotes that a uniform alignment is obtained though several domains are generated. The symbol x denotes that a number of domains are generated and a uniform alignment is not obtained.

TABLE 12

| Space s (µm) | 5 | 6 | 7.5 | 10 | 12.5 | 15 |
|---|---|---|---|---|---|---|
| Alignment state | ○ | ○ | ○ | ○ | ○ | ○ |

TABLE 13

| Space s (µm) | 20 | 25 | 30 | 40 | 50 | 75 |
|---|---|---|---|---|---|---|
| Alignment state | ○ | Δ | x | x | x | x |

As shown in Table 12 and Table 13, if the space s is 25 µm or less, the uniform alignment is obtained. On the other hand, if the space s is larger than 25 µm, a number of domains are generated in the space portion, and the uniform alignment is not obtained.

When the space s is 25 µm or less, as shown in FIG. 69, since the tilt in a predetermined orientation is successively propagated from the linear projection 6, the uniform alignment is obtained. On the other hand, when the space s is larger than 25 µm, there is a region which is tilted in a different orientation before the tilt is propagated from the linear projection 6. Thus, a number of domains are generated and the uniform alignment is not obtained. Accordingly, in the MVA-LCD, it is necessary that the space s is made 25 µm or less.

Example 9-6

In order to improve viewing angle characteristics, it is also possible to provide an optical compensation layer as optical compensation means between a polarizing plate and a glass substrate. As the optical compensation layer, a uniaxial or biaxial phase difference film can be used.

As described above, in the liquid crystal display according to this embodiment, the response speed can be made high, and persistence of vision, display blur or the like, which becomes a problem in display, can be relieved, and this embodiment can contribute to the improvement of display performance of the VA type liquid crystal display.

As described above, according to the present invention, it is possible to suppress the drop in the transmittance and to improve the response characteristics. Besides, according to the present invention, it is possible to suppress the deterioration of the response characteristics and to improve the transmittance.

What is claimed is:
1. A liquid crystal display comprising:
a first substrate and a second substrate arranged opposite to each other to form a gap;
a first alignment film provided on the first substrate at the gap side;
a second alignment film provided on the second substrate at the gap side;
a cured material being provided on at least one of the first alignment film and the second alignment film at the gap side;
a liquid crystal layer of liquid crystal molecules provided in the gap;
a pixel electrode including a plurality of elongated members arranged with spaces therebetween and provided on the first substrate at the gap side, wherein the plurality of elongated members are electrically connected to each other;
a common electrode configured to apply a voltage to the liquid crystal layer in cooperation with the pixel electrode and provided on the second substrate at the gap side,
wherein the plurality of elongated members includes:
first elongated members extending in a first direction in plan view;
second elongated members extending in a second direction in plan view which makes substantially 90 degrees with respect to the first direction;
third elongated members extending in a third direction in plan view which makes substantially 180 degrees with respect to the first direction; and
forth elongated members extending in a fourth direction in plan view which makes substantially 180 degrees with respect to the second direction,
wherein the cured material regulates alignment directions of the liquid crystal molecules.

2. The liquid crystal display of claim 1, wherein:
the first alignment film and the second alignment film are vertical alignment films.

3. The liquid crystal display of claim 1, further comprising:
a pixel region provided in the liquid crystal layer corresponding to the pixel electrode, wherein
the pixel region is divided into a first domain, a second domain, a third domain and a fourth domain at the time of the voltage being applied to the liquid crystal layer; and
the liquid crystal molecules in one of the first, second, third and fourth domains align in substantially the same direction.

4. The liquid crystal display of claim 3, wherein:
the boundary of the pixel region includes at least one edge line extending in a fifth direction which makes substantially 45 degrees with respect to the first, second, third and fourth directions.

5. The liquid crystal display of claim 1, wherein:
the distance between neighboring two of at least one of the first, second, third and fourth elongated members is the same.

6. The liquid crystal display of claim 1, wherein:
the width of each of at least one of the first, second, third and fourth elongated members is different from a width of the space between a pair of the at least one of the first, second, third and fourth elongated members.

7. The liquid crystal display of claim 6, wherein:
the width of each of at least one of the first, second, third and fourth elongated members is larger than the width of the space between a pair of the at least one of the first, second, third and fourth elongated members.

\* \* \* \* \*